United States Patent
Markram et al.

(10) Patent No.: US 12,412,072 B2
(45) Date of Patent: *Sep. 9, 2025

(54) CHARACTERIZING ACTIVITY IN A RECURRENT ARTIFICIAL NEURAL NETWORK

(71) Applicant: INAIT SA, Lausanne (CH)

(72) Inventors: Henry Markram, Lausanne (CH); Ran Levi, Aberdeen (GB); Kathryn Pamela Hess Bellwald, Aigle (CH)

(73) Assignee: INAIT SA, Lausanne (CH)

( * ) Notice: Subject to any disclaimer, the term of this patent is extended or adjusted under 35 U.S.C. 154(b) by 439 days.

This patent is subject to a terminal disclaimer.

(21) Appl. No.: 16/004,796

(22) Filed: Jun. 11, 2018

(65) Prior Publication Data

US 2019/0378000 A1 Dec. 12, 2019

(51) Int. Cl.
*G06N 3/044* (2023.01)
*G06N 3/08* (2023.01)

(52) U.S. Cl.
CPC ............... *G06N 3/044* (2023.01); *G06N 3/08* (2013.01)

(58) Field of Classification Search
None
See application file for complete search history.

(56) References Cited

U.S. PATENT DOCUMENTS

| | | |
|---|---|---|
| 5,822,742 A | 10/1998 | Alkon et al. |
| 7,321,882 B2 | 1/2008 | Herbert |
| 7,412,426 B2 | 8/2008 | Hercus |
| 8,818,923 B1 | 8/2014 | Hoffmann |
| 9,336,239 B1 | 5/2016 | Hoffmann et al. |
| 9,558,442 B2 | 1/2017 | Canoy et al. |
| 9,785,886 B1 | 10/2017 | Andoni et al. |
| 9,875,440 B1 | 1/2018 | Lamport |
| 10,019,506 B1 | 7/2018 | Li et al. |
| 10,153,806 B1 | 12/2018 | Petre et al. |
| 10,417,558 B1 | 9/2019 | Bauer et al. |
| 10,510,000 B1 | 12/2019 | Lamport |
| 10,621,364 B1 | 4/2020 | El Defrawy |
| 10,628,486 B2 | 4/2020 | Chu et al. |

(Continued)

FOREIGN PATENT DOCUMENTS

| | | |
|---|---|---|
| CN | 101669130 | 3/2010 |
| CN | 101719908 A | 6/2010 |

(Continued)

OTHER PUBLICATIONS

Blanco et al. "A genetic algorithm to obtain the optimal recurrent neural network." International Journal of Approximate Reasoning 23 (2000) 67-83 (Year: 2000).*

(Continued)

*Primary Examiner* — Abdullah Al Kawsar
*Assistant Examiner* — Asher H. Jablon
(74) *Attorney, Agent, or Firm* — Fish & Richardson P.C.

(57) ABSTRACT

Methods, systems, and apparatus, including computer programs encoded on a computer storage medium, for characterizing activity in a recurrent artificial neural network. In one aspect, a method includes outputting digits from a recurrent artificial neural network, wherein each digit represents whether or not activity within a particular group of nodes in the recurrent artificial neural network comports with a respective pattern of activity.

18 Claims, 18 Drawing Sheets

(56) References Cited

U.S. PATENT DOCUMENTS

| | | | |
|---|---|---|---|
| 10,650,047 B2 | 5/2020 | Yanagisawa | |
| 10,885,020 B1 | 1/2021 | Ablitt | |
| 10,922,510 B2 | 2/2021 | Tscherepanow et al. | |
| 11,195,038 B2 | 12/2021 | Nunn et al. | |
| 11,218,498 B2 | 1/2022 | Hajimirsadeghi et al. | |
| 11,250,326 B1 | 2/2022 | Ko et al. | |
| 11,278,413 B1 | 3/2022 | Lang | |
| 11,569,978 B2 | 1/2023 | Hess et al. | |
| 11,580,401 B2 | 2/2023 | Markram et al. | |
| 11,615,285 B2 | 3/2023 | Reimann et al. | |
| 11,651,210 B2 | 5/2023 | Henry et al. | |
| 11,652,603 B2 | 5/2023 | Markram et al. | |
| 11,663,478 B2 | 5/2023 | Markram et al. | |
| 11,797,827 B2 | 10/2023 | Markram et al. | |
| 11,816,553 B2 | 11/2023 | Markram et al. | |
| 11,893,471 B2 | 2/2024 | Markram et al. | |
| 11,972,343 B2 | 4/2024 | Markram et al. | |
| 12,020,157 B2 | 6/2024 | Markram et al. | |
| 12,113,891 B2 | 10/2024 | Hess Bellwald et al. | |
| 12,147,904 B2 | 11/2024 | Markram et al. | |
| 12,154,023 B2 | 11/2024 | Markram et al. | |
| 2003/0140020 A1 | 7/2003 | Chen et al. | |
| 2004/0015459 A1 | 1/2004 | Herbert | |
| 2006/0112028 A1 | 5/2006 | Xiao et al. | |
| 2006/0184471 A1 | 8/2006 | Minamino et al. | |
| 2008/0152217 A1 | 6/2008 | Greer | |
| 2008/0267188 A1 | 10/2008 | Furber et al. | |
| 2009/0006060 A1* | 1/2009 | Rhodes | G06N 3/047 703/11 |
| 2009/0012581 A1 | 1/2009 | Rhodes | |
| 2009/0187736 A1 | 7/2009 | Raichelgauz et al. | |
| 2014/0156901 A1 | 6/2014 | Raichelgauz et al. | |
| 2015/0058352 A1 | 2/2015 | Brand | |
| 2015/0206049 A1 | 7/2015 | Canoy et al. | |
| 2015/0280906 A1 | 10/2015 | Shany et al. | |
| 2015/0310303 A1 | 10/2015 | Andreopoulos et al. | |
| 2015/0347870 A1 | 12/2015 | Andreopoulos et al. | |
| 2015/0363689 A1 | 12/2015 | Henry et al. | |
| 2015/0371132 A1 | 12/2015 | Gemello et al. | |
| 2016/0048756 A1 | 2/2016 | Hall et al. | |
| 2016/0350648 A1 | 12/2016 | Gilad-Bachrach et al. | |
| 2017/0024661 A1 | 1/2017 | Hunsberger et al. | |
| 2017/0124452 A1 | 5/2017 | Tucker et al. | |
| 2017/0139759 A1* | 5/2017 | Bandara | G06F 11/0706 |
| 2017/0213131 A1 | 7/2017 | Hammond et al. | |
| 2017/0229117 A1 | 8/2017 | van der Made et al. | |
| 2017/0249536 A1 | 8/2017 | Hillar et al. | |
| 2018/0005111 A1 | 1/2018 | Chaudhari et al. | |
| 2018/0018553 A1 | 1/2018 | Bach et al. | |
| 2018/0053108 A1 | 2/2018 | Olabiyi et al. | |
| 2018/0053114 A1 | 2/2018 | Adjaoute | |
| 2018/0082171 A1 | 3/2018 | Merity et al. | |
| 2018/0107922 A1 | 4/2018 | Paul et al. | |
| 2018/0136912 A1 | 5/2018 | Venkataramani et al. | |
| 2018/0157973 A1 | 6/2018 | El-Yaniv et al. | |
| 2018/0165547 A1 | 6/2018 | Huang et al. | |
| 2018/0197069 A1 | 7/2018 | Reimann et al. | |
| 2018/0197076 A1 | 7/2018 | Paik et al. | |
| 2018/0247198 A1 | 8/2018 | Vasudevan et al. | |
| 2018/0336453 A1 | 11/2018 | Merity et al. | |
| 2018/0373985 A1 | 12/2018 | Yang et al. | |
| 2019/0012574 A1 | 1/2019 | Anthony et al. | |
| 2019/0036678 A1 | 1/2019 | Ahmed | |
| 2019/0042988 A1 | 2/2019 | Brown et al. | |
| 2019/0044916 A1 | 2/2019 | Jones | |
| 2019/0050726 A1 | 2/2019 | Azaria et al. | |
| 2019/0122096 A1 | 4/2019 | Husain | |
| 2019/0122140 A1 | 4/2019 | Sen | |
| 2019/0171187 A1 | 6/2019 | Cella et al. | |
| 2019/0171929 A1 | 6/2019 | Abadi et al. | |
| 2019/0180187 A1 | 6/2019 | Rawal et al. | |
| 2019/0197410 A1 | 6/2019 | Berry, II | |
| 2019/0228300 A1 | 7/2019 | Cao et al. | |
| 2019/0244348 A1 | 8/2019 | Buckler et al. | |
| 2019/0265950 A1 | 8/2019 | Heeger et al. | |
| 2019/0266246 A1 | 8/2019 | Wang et al. | |
| 2019/0286074 A1 | 9/2019 | Hoffmann | |
| 2019/0304568 A1 | 10/2019 | Wei et al. | |
| 2019/0312898 A1 | 10/2019 | Verma et al. | |
| 2019/0335192 A1* | 10/2019 | Otto | H04N 19/137 |
| 2019/0354846 A1 | 11/2019 | Mellempudi et al. | |
| 2019/0370647 A1 | 12/2019 | Doshi et al. | |
| 2019/0377976 A1 | 12/2019 | Markram et al. | |
| 2019/0377999 A1 | 12/2019 | Markram et al. | |
| 2019/0378007 A1 | 12/2019 | Markram et al. | |
| 2019/0378008 A1 | 12/2019 | Markram et al. | |
| 2019/0392303 A1 | 12/2019 | Cherubini et al. | |
| 2020/0011668 A1 | 1/2020 | Derhy et al. | |
| 2020/0012927 A1 | 1/2020 | Raichelgauz et al. | |
| 2020/0098135 A1 | 3/2020 | Ganjineh et al. | |
| 2020/0117690 A1 | 4/2020 | Tran | |
| 2020/0126126 A1 | 4/2020 | Briancon et al. | |
| 2020/0134016 A1 | 4/2020 | Cao et al. | |
| 2020/0184055 A1 | 6/2020 | Storm et al. | |
| 2020/0210764 A1 | 7/2020 | Hamedi et al. | |
| 2020/0228336 A1 | 7/2020 | Streit | |
| 2020/0242444 A1 | 7/2020 | Zhang et al. | |
| 2020/0285944 A1 | 9/2020 | Lee et al. | |
| 2020/0302297 A1 | 9/2020 | Jaganathan et al. | |
| 2020/0304284 A1 | 9/2020 | Markram et al. | |
| 2020/0304285 A1 | 9/2020 | Hess et al. | |
| 2020/0310400 A1 | 10/2020 | Jha et al. | |
| 2020/0367810 A1 | 11/2020 | Shouldice et al. | |
| 2020/0380335 A1 | 12/2020 | Neznal | |
| 2020/0402497 A1 | 12/2020 | Semonov et al. | |
| 2021/0027163 A1 | 1/2021 | Baker | |
| 2021/0049441 A1 | 2/2021 | Bronstein | |
| 2021/0049446 A1 | 2/2021 | Gurumurthi et al. | |
| 2021/0058547 A1 | 2/2021 | Puttamalla et al. | |
| 2021/0097578 A1 | 4/2021 | Holmes et al. | |
| 2021/0110115 A1 | 4/2021 | Hermann et al. | |
| 2021/0182604 A1 | 6/2021 | Anthony et al. | |
| 2021/0182653 A1 | 6/2021 | Markram et al. | |
| 2021/0182654 A1 | 6/2021 | Markram et al. | |
| 2021/0182655 A1 | 6/2021 | Markram et al. | |
| 2021/0182657 A1 | 6/2021 | Markram et al. | |
| 2021/0182681 A1 | 6/2021 | Markram et al. | |
| 2021/0271319 A1 | 9/2021 | Lussier et al. | |
| 2021/0319098 A1 | 10/2021 | Pogorelik et al. | |
| 2021/0338007 A1 | 11/2021 | Choi et al. | |
| 2021/0398621 A1 | 12/2021 | Stojevic et al. | |
| 2022/0005332 A1 | 1/2022 | Metzler et al. | |
| 2022/0012877 A1 | 1/2022 | Buckler et al. | |
| 2022/0147760 A1 | 5/2022 | Dutta et al. | |
| 2022/0148454 A1 | 5/2022 | Jaramaz et al. | |
| 2022/0157436 A1 | 5/2022 | Harley et al. | |
| 2022/0187847 A1 | 6/2022 | Cella et al. | |
| 2022/0197306 A1 | 6/2022 | Cella et al. | |
| 2022/0261593 A1 | 8/2022 | Yu et al. | |
| 2022/0269346 A1 | 8/2022 | Hussami et al. | |
| 2023/0019839 A1 | 1/2023 | Markram | |
| 2023/0024925 A1 | 1/2023 | Markram et al. | |
| 2023/0028511 A1 | 1/2023 | Markram et al. | |
| 2023/0085384 A1 | 3/2023 | Lütgehetmann et al. | |
| 2023/0171086 A1 | 6/2023 | Hess et al. | |
| 2023/0297808 A1 | 9/2023 | Reimann et al. | |
| 2023/0316077 A1 | 10/2023 | Henry et al. | |
| 2023/0351196 A1 | 11/2023 | Markram et al. | |
| 2023/0370244 A1 | 11/2023 | Markram et al. | |
| 2024/0046077 A1 | 2/2024 | Markram et al. | |
| 2024/0111994 A1 | 4/2024 | Markram et al. | |
| 2024/0176985 A1 | 5/2024 | Markram et al. | |
| 2024/0362480 A1 | 10/2024 | Markram et al. | |
| 2024/0386265 A1 | 11/2024 | Markram et al. | |
| 2025/0070956 A1 | 2/2025 | Hess Bellwald et al. | |
| 2025/0117628 A1 | 4/2025 | Markram et al. | |

FOREIGN PATENT DOCUMENTS

| | | |
|---|---|---|
| CN | 102859538 | 1/2013 |
| CN | 103988203 | 8/2014 |
| CN | 104318304 | 1/2015 |
| CN | 104335219 | 2/2015 |
| CN | 105095966 | 11/2015 |

(56) References Cited

FOREIGN PATENT DOCUMENTS

| CN | 105787561 A | 7/2016 |
|---|---|---|
| CN | 106156845 | 11/2016 |
| CN | 107247989 | 10/2017 |
| CN | 107423814 | 12/2017 |
| CN | 107743630 A | 2/2018 |
| CN | 107844830 | 3/2018 |
| CN | 108348750 | 7/2018 |
| CN | 112567388 | 3/2021 |
| CN | 112567389 | 3/2021 |
| EP | 1283496 | 2/2003 |
| EP | 3340121 | 6/2018 |
| EP | 3803707 | 4/2021 |
| EP | 3803708 | 4/2021 |
| KR | 20210008418 | 1/2021 |
| KR | 20210008419 | 1/2021 |
| TW | 201437945 | 10/2014 |
| TW | 201535277 | 9/2015 |
| TW | 201725519 | 7/2017 |
| TW | I608429 | 12/2017 |
| TW | 201928789 | 7/2019 |
| TW | 201935326 | 9/2019 |
| TW | 201937392 | 9/2019 |
| WO | WO 2007/137047 | 11/2007 |
| WO | WO 2016/206765 | 12/2016 |
| WO | WO 2017/083399 | 5/2017 |
| WO | WO 2017/197375 | 11/2017 |
| WO | WO 2017/200971 | 11/2017 |
| WO | WO 2018/058426 | 4/2018 |
| WO | WO 2018/175400 | 9/2018 |
| WO | WO 2019/238522 | 12/2019 |
| WO | WO 2019/238523 | 12/2019 |
| WO | WO 2020/187676 | 9/2020 |
| WO | WO 2020/187694 | 9/2020 |
| WO | WO 2021/116071 | 6/2021 |
| WO | WO 2021/116075 | 6/2021 |
| WO | WO 2021/116140 | 6/2021 |
| WO | WO 2021/116147 | 6/2021 |
| WO | WO 2021/116250 | 6/2021 |
| WO | WO 2021/116379 | 6/2021 |
| WO | WO 2021/116402 | 6/2021 |
| WO | WO 2021/116404 | 6/2021 |
| WO | WO 2021/116407 | 6/2021 |

OTHER PUBLICATIONS

Lee et al. "Detecting highly overlapping community structure by greedy clique expansion," arXiv preprint (arXiv:1002.1827v2), 2010, 10 pages (Year: 2010).*

Dlotko et al. "Topological analysis of the connectome of digital reconstructions of neural microcircuits," arXiv preprint, 2016, 28 pages (IDS Oct. 4, 2019, doc. 2) (Year: 2016).*

Zhang et al., "Ternary weight networks," arXiv preprint (arXiv:1605.04711v2), 2016, 5 pages (Year: 2016).*

Masulli et al. The topology of the directed clique complex as a network invariant. Springerplus. 2016;5:388. Published Mar. 31, 2016. 12 pages. (Year: 2016).*

Paweł Dlotko, "Directed clique topology" (slides are titled "Directed Complexes"), May 11, 2017, BIRS, Topological Methods in Brain Network Analysis (17w5043), Accessed from http://www.birs.ca/events/2017/5-day-workshops/17w5043/videos/watch/201705111127-Dlotko.html (Year: 2017).*

TW Office Action in Taiwanese Appln. No. 108119813, dated Jun. 29, 2020, 17 pages (with machine translation).

Dlotko et al., "Topological analysis of the connectome of digital reconstructions of neural microcircuits," arXiv preprint, 2016, 28 pages.

Paugam-Moisy et al, "Delay learning and polychronization for reservoir computing," Neurocomputing, Mar. 2008, 71(7-9):1143-1158.

PCT International Search Report and Written Opinion in International Appln. No. PCT/EP2019/064593, dated Sep. 6, 2019, 18 pages.

PCT International Search Report and Written Opinion in International Appln. No. PCT/EP2019/064740, dated Sep. 6, 2019, 18 pages.

PCT International Search Report and Written Opinion in International Appln. No. PCT/EP2019/064741, dated Sep. 6, 2019, 16 pages.

PCT International Search Report and Written Opinion in International Appln. No. PCT/EP2019/064773, dated Sep. 6, 2019, 17 pages.

PCT International Search Report and Written Opinion in International Appln. No. PCT/EP2019/064776, dated Sep. 6, 2019, 17 pages.

Reimann et al, "Cliques of Neurons Bound into Cavities Provide a Missing Link between Structure and Function," Frontiers in Computational Neuroscience, Jun. 2017, 11:48:16 pages.

Sun et al, "Runtime detection of activated polychronous neuronal group towards its spatiotemporal analysis," 2015 International Joint Conference on Neural Networks, Jul. 2015, 1-8.

Woodward & Ikegami, "A Reservoir Computing approach to Image Classification using Coupled Echo State and Back-Propagation Neural Networks," International conference image and vision computing, Auckland, New Zealand, Nov. 29, 2011, 6 pages.

PCT International Preliminary Report on Patentability in International Appln. No. PCT/EP2019/064741, dated Dec. 24, 2020, 9 pages.

PCT International Preliminary Report on Patentability in International Appln. No. PCT/EP2019/064773, dated Dec. 24, 2020, 11 pages.

PCT International Preliminary Report on Patentability in International Appln. No. PCT/EP2019/064776, dated Dec. 24, 2020, 11 pages.

PCT International Preliminary Report on Patentability in International Appln. No. PCT/EP2019/064740, dated Dec. 24, 2020, 13 pages.

PCT International Preliminary Report on Patentability in International Appln. No. PCT/EP2019/064593, dated Dec. 24, 2020, 11 pages.

Abbas et al., "Artificial Intelligence Conquering the next frontier of the digital world," Research Gate, Dec. 17, 2017, 15 pages.

Aharoni et al. "Eigenvalues and homology of flag complexes and vector representations of graphs," Geom. Funct. Anal., Jul. 28, 2005, 15:555-566.

Angeli, "Symmetric functions for fast image retrieval with persistent homology," Math Meth Appl Sci., Apr. 24, 2018, 41:9567-9577.

Bale et al., "Efficient population coding of naturalistic whisker motion in the ventro-posterior medial thalamus based on precise spike timing," Front. Neural Circuits, Sep. 25, 2015, 9: 1-14.

Bassett et al., "Network Neuroscience," Network Neuroscience, Nat. Neurosci., Mar. 20, 2017, 20:353-364.

Bauer et al., "PHAT—Persistent Homology Algorithms Toolbox," J. Symb. Comput., Jan. 1, 2017, 78: 76-90.

Bergomi et al., "Topological Graph persistence," Mathematics, Jul. 20, 2017, pp. 1-15.

Bienenstock et al., "A model of neocortex," Network Comput. Neural Syst., Jul. 27, 1994, 6:179-224.

Brody et al., "Correlations without synchrony," Neural Comput. 11, Oct. 1, 1999, 11:1537-1551.

Bullmore et al., "Complex brain networks: graph theoretical analysis of structural and functional systems," Nat. Rev. Neurosci., Mar. 10, 2009, 10:186-198.

Chella et al., "Representational Issues in the Debate on the Standard Model of the Mind, "Association for the Advancement of Artificial Intelligence, Nov. 12, 2017, pp. 1-6.

Chklovskii et al., "Cortical rewiring and information storage," Nature, Oct. 14, 2004, 431:782-788.

Choi et al., "A Survey of Binary Similarity and distance measures," Systemic, Cybernetics, and Informatics, Jan. 8, 2010, 8:43-48.

Choudhary, "Approximation algorithms for Vietoris-Rips and Čech filtrations," Doctoral Thesis of Computer Science, Faculty of Mathematics and Computer Science, Heidelberg University, Dec. 14, 2017, 140 pages.

Courtney et al., "Dense Power-law Networks and Simplicial Complexes," ArXiv, Apr. 23, 2018, pp. 1-16.

(56) References Cited

OTHER PUBLICATIONS

Crawford et al., "A theory on the role of π-electrons of docosahexaenoic acid in brain function: The six methylene-interrupted double bonds and the precision of neural signaling," Oilseeds & fats Crops and Lipids, May 21, 2018, pp. 1-14.

Davydov et al., "Neural Network Structures: Current and Future States," Research Gate, Feb. 2, 2018, pp. 1-6.

Engel et al., "Temporal binding and the neural correlates of sensory awareness," Trends Cogn. Sci., Jan. 1, 2001, 5: 16-25.

Erdős et al., "On the evolution of random graphs," Publ. Math. Inst. Hung. Acad. Sci., Jan. 1960, 17-60.

Github.com [online] "pytorch-tutorial/tutorials/03-advanced/image_captioning/," Oct. 2007, retrieved on Jan. 21, 2020, retrieved from UR: <https://github.com/yunjey/pytorch-tutorial/tree/master/tutorials/03-advanced/image_captioning>, 3 pages.

Giusti et al., "Clique topology reveals intrinsic geometric structure in neural correlations," Proc. Natl. Acad. Sci. U.S.A., Apr. 28, 2015, 112: 13455-13460.

Gong, "Evolution to a small-world network with chaotic units," Europhysics Letters (EPL), Jul. 15, 2004, 67:328-333.

Harris et al. "The neocortical circuit: themes and variations," Nat. Neurosci., Jan. 27, 2015, 18:170-181.

Hastings et al., "Challenges in the analysis of complex systems: introduction and overview," The European Physical Journal Special Topics, Dec. 28, 2017, 226:3185-3197.

Haun et al., "Conscious Perception as Integrated Information Patterns in Human Electrocorticography," eNeuro: Cognition and Behavior, Sep. 19, 2017, 4:2-18.

Hebb, "The Organization of Behavior: A Neuropsychological Theory," New York, NY: Wiley & Sons, 1949, pp. 1-365.

Holtmaat et al., "Experience-dependent structural synaptic plasticity in the mammalian brain, " Nat. Rev. Neurosci., Sep. 10, 2009, 10: 647-658.

Ivancevic et al., "Tensor-Centric Warfare II: Entropic Uncertainty Modeling," Intelligent Control and Automation, May 30, 2018, 9:30-51.

Judge, "Prefix "Re-Congition" as prelude to fixing sustainability—"pro" vs. "con"? Speculative review of missing emphasis potentially vital for psychosocial balance," Research Gate, Jul. 16, 2017, pp. 1-22.

Knoblauch et al., "Memory capacities for synaptic and structural plasticity," Neural Comput., Feb. 2010, 22:289-341.

Kulakov, "Features of a Simple Psychophysiological Reaction," Human Physiology, Jun. 15, 2017, 44:412-417.

Latora et al., "Efficient behavior of small-world networks," Phys. Rev. Lett., Oct. 17, 2001, 87:1-4.

Le Be et al., "Spontaneous and evoked synaptic rewiring in the neonatal neocortex," Proc. Natl. Acad. Sci. U.S.A., Aug. 29, 2006 103:13214-13219.

Levi, "A short course on Algebraic topology geared towards applications to Neuroscience," University of Aberdeen, Jul. 18, 2017, pp. 1-14.

Luczak et al., "Packetbased communication in the cortex," Nat. Rev. Neurosci., Oct. 28, 2015, 16:745-755.

Markram et al., "Reconstruction and simulation of neocortical microcircuitry," Cell, Oct. 8, 2015, 163:456-492.

McCoss, Agency of Life, Entropic Gravity and Phenomena Attributed to "Dark Matter," Journal of Quantum Information Science, Jun. 15, 2017, 7:67-75.

McCoss, "Lithium Quantum Consciousness," Journal of Quantum Information Science, Nov. 8, 2017, 7:125-139.

Meyer et al., "Cell type-specific thalamic innervation in a col. of rat vibrissal cortex," Cereb. Cortex, Jun. 9, 2010, 20: 2287-2303.

Miller et al., "Visual stimuli recruit intrinsically generated cortical ensembles," Proc. Natl. Acad. Sci. U.S.A., Sep. 8, 2014, pp. E4053-E4061.

Miura et al., "Sparse Parallel Algorithms for Recognizing Touch Topology on Curved Interactive Screens," IEEE Access, Jul. 31, 2017, 5:14889-14897.

Munkres, "Elements of Algebraic Topology," Massachusetts Institute of Technology, 1984, Addison-Wesley Publishing Company, 233 pages.

Opris et al., "What Is the Evidence for Inter-laminar Integration in a Prefrontal Cortical Minicolumn?," Frontiers in Neuroanatomy, Dec. 14, 2017, 11: 1-11.

Pajevic et al., "The organization of strong links in complex networks," Nat. Phys., Mar. 11, 2012, 8:429-436.

Palm et al., "On the significance of correlations among neuronal spike trains," Biol. Cybern., Jun. 1, 1988, 59:1-11.

Patel et al., "Generative Design of Electromagnetic Structures Through Bayesian Learningm," IEEE Transactions on Magnetics, Oct. 20, 2017, 54:1-4.

Pedregosa et al., "Scikit-learn: machine learning in Python," J. Mach. Learn. Res., Oct. 2010, 12:2825-2830.

Perin et al., "A synaptic organizing principle for cortical neuronal groups," Proc. Natl. Acad. Sci. U.S.A., Mar. 29, 2011, 108:5419-5424.

Peters et al., "The projection of the lateral geniculate nucleus to area 17 of the rat cerebral cortex. I General description.," J. Neurocytol., Feb. 1976, 5:63-84.

Petlevski, "Modeling the Model: the World Beyond the Immediate Sensorium, " Proceedings of the 20th International Multiconference Information Society, Oct. 18, 2017, pp. 44-47.

Petri et al., "Homological scaffolds of brain functional networks," J. R. Soc. Interface, Dec. 6, 2014, 1:1-11.

Planas et al., "Accelerating Data Analysis in Simulation Neuroscience with Big Data Technologies," International Conference on Computational Science, Jun. 1, 2018, pp. 363-377.

Ramaswamy et al., "The neocortical microcircuit collaboration portal: a resource for rat somatosensory cortex," Front. Neural Circuits, Oct. 8, 2015, 9:1-14.

Reimann et al. "An algorithm to predict the connectome of neural microcircuits," Front. Comput. Neurosci., Oct. 8, 2015, 9:1-18.

Renart et al., "The asynchronous state in cortical circuits," Science 327, Jan. 29, 2010, 587-590.

Rosenbaum et al., "The spatial structure of correlated neuronal variability," Nat. Neurosci., Oct. 21, 2016, 20:107-114.

SciPy.org [online], " SciPy: Open Source Scientific Tools for Python," available on or before Mar. 9, 2001, via Internet Achieve: Wayback Machine URL <https://web.archive.org/web/20010309040805/http://www.scipy.org/>, retrieved on Jan. 17, 2020, <https://www.scipy.org/citing.html>.

See et al., "Coordinated neuronal ensembles in primary auditory cortical columns," Elife Sciences, Jun. 5, 2018, pp. 1-33.

Shepherd et al., "Geometric and functional organization of cortical circuits," Nat. Neurosci., May 8, 2005, 8:782-790.

Song et al. "Highly nonrandom features Of synaptic connectivity in local cortical circuits," PLoS Biol., Mar. 1, 2005, 3:0507-0519.

Stepanyants et al., "Neurogeometry and potential synaptic connectivity," Trends in Neurosci., Jun. 2, 2005, 28:387-394.

Suarez, "The interaction between task goals and the representation of choice options in decision-making," Thesis for the degree of Doctor of Philosophy, University College of London, Sep. 2017, pp. 1-176.

Tozzi et al., "Brain Projective Reality: Novel Clothes for the Emperor, Reply to comments of "Topodynamics of metastable brains," by Tozzi et al." Physics of Life Reviews, Jun. 28, 2017, pp. 1-11.

Tyukin et al., "High-Dimensional Brain: A Tool for Encoding and Rapid Learning of Memories by Single Neurons," Bull Math Biol., Mar. 19, 2018, 11:4856-4888.

Varshney et al., "Structural properties of the caenorhabditis elegans neuronal network," PLoS Comput. Biol., Feb. 3, 2011, 7:1-22.

Wijaya et al., "Finding an appropriate equation to measure similarity between binary vectors: case studies on Indonesian and Japanese herbal medicines," BMC bioinformatics, Dec. 2016,17:1-19.

Willshaw et al., "Nonholographic associative memory," Nature 222, Jun. 7, 1969, pp. 960-963.

Guerreiro et al., "A Neural Key Generator for a Public Block Cipher," IEEE Ninth Brazilian Symposium on Neural Networks (SBRN '06), Oct. 23-27, 2006, Ribeirao Preto, BR, 143-147.

(56) References Cited

OTHER PUBLICATIONS

PCT International Search Report and Written Opinion in International Appln. No. PCT/EP2020/056588, dated May 26, 2020, 12 pages.
PCT International Search Report and Written Opinion in International Appln. No. PCT/EP2020/056686, dated May 26, 2020, 13 pages.
Bahraini et al., "Topological pattern selection in recurrent networks," Neural Networks, Feb. 9, 2012, 31:22-32.
PCT International Search Report and Written Opinion in International Appln. No. PCT/EP2020/085007, dated Mar. 24, 2021, 15 pages.
PCT International Search Report and Written Opinion in International Appln. No. PCT/EP2020/085016, dated Mar. 24, 2021, 18 pages.
PCT International Search Report and Written Opinion in International Appln. No. PCT/EP2020/085169, dated Mar. 18, 2021, 15 pages.
PCT International Search Report and Written Opinion in International Appln. No. PCT/EP2020/085200, dated Apr. 4, 2021, 15 pages.
PCT International Search Report and Written Opinion in International Appln. No. PCT/EP2020/085434, dated Mar. 24, 2021, 16 pages.
Salnikov et al., "Simplicial complexes and complex systems," arxiv.org, Cornell University Library, Jul. 20, 2018, 8 pages.
Yang et al., "Road Detection and Centerline Extraction via Deep Recurrent Convolutional Neutral Network U-Net," IEEE Transactions on Geoscience and Remote Sensing, Sep. 2019, 57(9):7209-7220.
Cai et al., "Path-level network transformation for efficient architecture search," InInternational Conference on Machine Learning, Jul. 3, 2018 PMLR, 10 pages.
Ludermir et al., "An optimization methodology for neural network weights and architectures," IEEE Transactions on Neural Networks, Nov. 13, 2006, 17(6):1452-9.
Rawal et al., "From nodes to networks: Evolving recurrent neural networks," arXiv preprint arXiv:1803.04439, Mar. 12, 2018, 8 pages.
Lena et al., "Deep spatio-temporal architectures and learning for protein structure prediction," Advances in neural information processing systems, 25, 2012, 9 pages.
Park et al., "CNN (Convolutional Neural Network) based in-loop filter in HEVC," In Proceedings of the Korean Society of Broadcast Engineers Conference 2016, The Korean Institute of Broadcast and Media Engineers, 2016, pp. 369-372 (with English Abstract).
Wang et al., "Topological recurrent neural network for diffusion prediction," In2017 IEEE International Conference on Data Mining (ICDM), Nov. 18, 2017, pp. 475-484.
Masulli et al., "Dynamics of evolving feed-forward neural networks and their topological invariants," Network and Parallel Computing, Aug. 13, 2016, pp. 99-106.
Bauer et al., "Real-time ultra-low power ECG anomaly detection using an event-driven neuromorphic processor," IEEE transactions on biomedical circuits and systems, Nov. 11, 2019, 13(6):1575-82.
Goodman et al., "Brian: a simulator for spiking neural networks in python," Frontiers in neuroinformatics, 2008:5, 10 pages.
International Preliminary Report on Patentability in International Appln. No. PCT/EP2020/085007, dated Jun. 23, 2022, 8 pages.
International Preliminary Report on Patentability in International Appln. No. PCT/EP2020/085016, dated Jun. 23, 2022, 11 pages.
International Preliminary Report on Patentability in International Appln. No. PCT/EP2020/085169, dated Jun. 23, 2022, 8 pages.
International Preliminary Report on Patentability in International Appln. No. PCT/EP2020/085200, dated Jun. 23, 2022, 9 pages.
International Preliminary Report on Patentability in International Appln. No. PCT/EP2020/085434, dated Jun. 23, 2022, 9 pages.
International Preliminary Report on Patentability in International Appln. No. PCT/EP2020/085716, dated Jun. 23, 2022, 11 pages.
International Search Report and Written Opinion in International Appln. No. PCT/EP2020/085716, dated Mar. 25, 2021, 18 pages.
Minkovich et al. "Programming time-multiplexed reconfigurable hardware using a scalable neuromorphic compiler," IEEE transactions on neural networks and learning systems, Apr. 11, 2012, 23(6):889-901.
U.S. Appl. No. 17/783,961, filed Jun. 9, 2022, Markram.
Andersen et al., "Overlapping clusters for distributed computation," In Proceedings of the Fifth ACM International Conference on Web Search and Data Mining, Feb. 8, 2012, 9 pages.
Baskararaja et al., "Subgraph matching using graph neural network," Journal of Intelligent Learning Systems and Applications, Nov. 28, 2012, 4(04):274-278.
Bauer et al., "Clear and Compress: Computing Persistent Homology in Chunks," Topological Methods in Data Analysis and Visualization III., 2014, pp. 103-117.
Cormen et al., "Introduction to Algorithms," Copyright 2001 by The Massachusetts Institute of Technology, 984 pages.
Erdos and Renyi, "On random graphs, I," Math. Debrecen., 1959, 6:290-297.
Gros, "Cognitive computation with autonomously active neural networks: an emerging field," Cognitive Computation, Mar. 2009, 1(1):77-90.
Gros, "Neural networks with transient state dynamics," New Journal of Physics, Apr. 30, 2007, 9(4):109, 21 pages.
Gros, "Self-sustained thought processes in a dense associative network," In Annual Conference on Artificial Intelligence, Sep. 11, 2005, Springer, Berlin, Heidelberg, 14 pages.
Hatcher, "Algebraic Topology," Cambridge University Press, Feb. 2002, 556 pages.
Kahle, "Sharp vanishing thresholds for cohomology of random flag complexes," Ann. of Math., May 2014, 179(3):1085-1107.
Lin et al., "Organizing principles of real-time memory encoding: neural clique assemblies and universal neural codes," TRENDS in Neurosciences, Jan. 2006, 29(1):48-57.
Maria, "Algorithms and data structures in computational topology" (Doctoral dissertation, Université Nice Sophia Antipolis), Oct. 28, 2014, 205 pages.
mathworld.wolfram.com [online], "Adjacency Matrix," 2016, retrieved via Internet Archive on Apr. 8, 2022, retrieved from <https://web.archive.org/web/20160311204902/https://mathworld.wolfram.com/AdjacencyMatrix.html>, 2 pages.
Milo et al., "Network Motifs: Simple Building Blocks of Complex Networks," Science, Oct. 25, 2002, 298(5594):824-827.
Peters et al., "The projection of the lateral geniculate nucleus to area 17 of the rat cerebral cortex. V. Degenerating axon terminals synapsing with Golgi impregnated neurons," J Neurocytol., 1979, 8:331-357.
Srivastava et al., "Dropout: a simple way to prevent neural networks from overfitting," The journal of machine learning research, Jan. 2014, 15(1):1929-58.
TW Office Action in Taiwanese Appln. No. 10943863, dated Mar. 1, 2022, 13 pages (with machine translation).
U.S. Appl. No. 16/004,635, filed Jun. 11, 2018, Henry Markram.
U.S. Appl. No. 16/004,837, filed Jun. 11, 2018, Henry Markram.
U.S. Appl. No. 16/004,757, filed Jun. 11, 2018, Henry Markram.
U.S. Appl. No. 16/004,671, filed Jun. 11, 2018, Henry Markram.
U.S. Appl. No. 16/356,391, filed Mar. 18, 2019, Henry Markram.
U.S. Appl. No. 16/356,478, filed Mar. 18, 2019, Kathryn Hess.
U.S. Appl. No. 16/710,266, filed Dec. 11, 2019, Henry Markram.
U.S. Appl. No. 16/710,058, filed Dec. 11, 2019, Henry Markram.
U.S. Appl. No. 16/710,205, filed Dec. 11, 2019, Henry Markram.
U.S. Appl. No. 16/710,176, filed Dec. 11, 2019, Henry Markram.
U.S. Appl. No. 16/710,080, filed Dec. 11, 2019, Henry Markram.
U.S. Appl. No. 15/864,146, filed Jan. 8, 2018, Michael Wolfgang Reimann.
Baker et al., "Designing neural network architectures using reinforcement learning," arXiv preprint, arXiv:1611.02167, Nov. 7, 2016, 18 pages.
Chambers et al., "Higher-order synaptic interactions coordinate dynamics in recurrent networks," PLoS computational biology, Aug. 19, 2016, 12(8):e1005078, 23 pages.

(56) References Cited

OTHER PUBLICATIONS

EP Extended European Search Report in EP Appln. No. 17174314. 9, dated Dec. 14, 2017, 11 pages.
Garcia et al., "Unsupervised classification of neural spikes with a hybrid multilayer artificial neural network," Journal of Neuroscience Methods, 1998, 82:59-73.
Giusti et al., "Two's company, three (or more) is a simplex," Journal of computational neuroscience, Aug. 2016, 41(1):1-14.
Graves, "Adaptive computation time for recurrent neural networks," arXiv preprint arXiv: 1603.08983, Mar. 29, 2016, 19 pages.
Gros et al., "Semantic learning in autonomously active recurrent neural networks," Logic Journal of IGPL, Oct. 1, 2010, 18(5):686-704.
International Preliminary Report on Patentability in International Appln. No. PCT/EP2020/056588, dated Sep. 30, 2021, 8 pages.
International Preliminary Report on Patentability in International Appln. No. PCT/EP2020/056686, dated Sep. 30, 2021, 10 pages.
Sizemore et al., "Cliques and cavities in the human connectome," Journal of computational neuroscience, Feb. 2018, 44(1):115-45.
Achard et al., "A Resilient, Low-Frequency, Small-World Human Brain Functional Network with Highly Connected Association Cortical Hubs," Journal of Neuroscience, Jan. 4, 2006, 26(1):63-72.
Arai et al., "The Effects of Theta Precession on Spatial Learning and Simplicial Complex Dynamics in a Topological Model of the Hippocampal Spatial Map," PLOS Computational Biology, Jun. 19, 2014, 10(6):r1003651.
Astrivis [online], "Demo Scan Church Dec. 2016," Dec. 2, 2016, retrieved on Nov. 27, 2022, retrieved from URL <https://www.youtube.com/watch?v=xCgQ4aaB1Go>, 2 pages [Video Submission].
Bassett et al., "Dynamic reconfiguration of human brain networks during learning," PNAS, Apr. 18, 2011, 108(18):7641-7646.
Brown et al., "Structure of the Afferent Terminals in Terminal Ganglion of a Cricket and Persistent Homology," PLOS One, May 23, 2012, 7(5):e37278.
Chen et al., "Neural Representation of Spatial Topology in the Rodent Hippocampus," Neural Computation, Jan. 2014, 26(1):1-39.
Choi et al., "Abnormal metabolic connectivity in the pilocarpine-induced epilepsy rat model: A multiscale network analysis based on persistent homology," NeuroImage, Oct. 1, 2014, 99:226-236.
Chung et al., "Persistence Diagrams of Cortical Surface Data," Information Processing in Medical Imaging, 2009, pp. 386-397.
Crossley et al., "Cognitive relevance of the community structure of the human brain functional coactivation network," PNAS, Jun. 24, 2013, 110(28):11583-11588.
Dongjiang et al., "DXSLAM: A Robust and Efficient Visual SLAM System with Deep Features," ArXiv, Aug. 12, 2020, 8 pages.
Drakesmith et al., "Overcoming the effects of false positives and threshold bias in graph theoretical analyses of neuroimaging data," NeuroImage, Sep. 2015, 118:313-333.
Ellis et al., "Describing High-Order Statistical Dependence Using "Concurrence Topology," With Application to Functional MRI Brain Data," Homology, Homotopy and Applications, 2014, 16(1):245-264.
Garrison et al., "The (in)stability of functional brain network measures across thresholds," NeuroImage, Sep. 2015, 118:651-661.
Ginestet et al., "Brain Network Analysis: Separating Cost from Topology Using Cost-Integration," PLOS One, Jul. 28, 2018, 2011, 6(7):e21570.
International Search Report and Written Opinion in International Appln. No. PCT/EP2022/073852, mailed on Dec. 9, 2022, 18 pages.
Khalid et al., "Tracing the evolution of multi-scale functional networks in a mouse model of depression using persistent brain network homology," NeuroImage, Nov. 1, 2014, 101:351-363.
Kim et al., Morphological brain network assessed using graph theory and network filtration in deaf adults, Hearing Research, Sep. 2014, 315:88-98.
Langer et al., "The Problem of Thresholding in Small-World Network Analysis," PLOS One, Jan. 3, 2013, 8(1):e53199.

Lee et al., "Discriminative persistent homology of brain networks," 2011 IEEE International Symposium on Biomedical Imaging: From Nano to Macro, Mar. 30, 2011, pp. 841-844.
Lucky Robot [online], "ORB SLAM3: Ar demo," Feb. 23, 2021, retrieved on Nov. 27, 2022, retrieved from URL <https://www.youtube.com/watch?v=c1ExX_IA5tM>, 2 pages [Video Submission].
Medaglia et al., "Cognitive Network Neuroscience," Journal of Cognitive Neuroscience, Aug. 1, 2015, 27(8):1471-1491.
Mur-Artal et al., "ORB-SLAM2: an Open-Source SLAM System for Monocular, Stereo and RGB-D Cameras," IEEE Transactions on Robotics, Oct. 5, 2015, 31(5):1147-1163.
Pirino et al., "A topological study of repetitive co-activation networks in in vitro cortical assemblies," Physical Biology, Jan. 5, 2015, 12(1):016007.
Singh et al., "Topological analysis of population activity in visual cortex," Journal of Vision, Jun. 2008, 8(8):11, 18 pages.
Stolz, "Computational Topology in Neuroscience," Dissertation for the Degree of Master of Science in Mathematical Modelling & Scientific Computing at the University of Oxford, Sep. 2014, 77 pages.
Alaniz, "Machiavellian Playbook for Artificial General Intelligence (AGI), Early Doctrine for AGI power," Research Gate, Aug. 2018, pp. 1-42.
Alaniz, "Remaking Einstein with a Dynamical Graph Rich Person Object Avatar Extraction Markup Language (intelligence as topological algebraic invariants, graph entropies, and dynamics)," Mar. 16, 2019, 14 pages.
Allswede et al., "Prenatal inflammation and risk for schizophrenia: A role for immune proteins in neurodevelopment," Development and Psychopathology, Aug. 2, 2018, 30: 1157-1178.
Antonopoulos et al., "Evaluating performance of neural codes in neural communication networks," Neural Networks, Sep. 24, 2018, pp. 1-17.
Baptiste-Bardin et al., "Topological exploration of artificial neuronal network dynamics," Network Neuroscience, Jan. 24, 2019, pp. 1-28.
Basset et al., "Network models in neuroscience," arXiv, Jul. 21, 2018, pp. 1-12.
Basset et al., "On the nature and use of models in network neuroscience," Nature Reviews, Jul. 12, 2018, 19:566-578.
Baudot et al., "Topological Information Data Analysis," Entropy, Sep. 2019, 21:1-38.
Betzel, "Stability of spontaneous, correlated activity in mouse auditory cortex," PLOS: Computational Biology, Dec. 9, 2019, 1-25.
Bianconi et al., "Topological percolation on hyperbolic simplicial complexes," Phys. Rev. E, Nov. 21, 2018, 5:1-18.
Busch et al., "Intrinsic temporal tuning of neurons in the optic tectum is shaped by multisensory experience," Journal of Neurophysiology, Sep. 5, 2019, pp. 1-23.
Chacholski et al., "On the topology of complexes of injective words," Journal of Applied and Computational Topology, Aug. 16, 2019, 21:1-16.
Chowdhury et al., "Path homologies of deep feedforward networks," Arxiv, Oct. 16, 2019, pp. 1-6.
Coggan et al., "A Process for Digitizing and Simulating Biologically Realistic Oligocellular Networks Demonstrated for the Neuro-Glio-Vascular Ensemble," Neurosci, Sep. 25, 2018, 12:1-21.
Collins, "The case for emulating insect brains using anatomical "wiring diagrams" equipped with biophysical models of neuronal activity," Biological cybernetics, Dec. 1, 2019, 113: 465-75.
Curto et al., "Cell groups reveal structure of stimulus space," Plos Comput. Biol., Oct. 2008, 4(10):e100205.
Curto, "Relating network connectivity to dynamics: opportunities and challenges for theoretical neuroscience," Current Opinion in Neurobiology, Oct. 1, 2019, 58:11-20.
Curto, "What Can Topology Tell US About the Neural Code?," The American Mathematical Society, Jan. 2017, 54(1):63-78.
Dabaghian et al., "A topological paradigm for hippocampal spatial map formation using persistent homology," Plos Comput. Biol., Aug. 2012, 8(8):e1002581.

(56) References Cited

OTHER PUBLICATIONS

Dabaghian et al., "Reconceiving the hippocampal map as a topological template," Elife, Aug. 20, 2014, 3:e03476.
DeCharms et al., "Primary cortical representation of sounds by the coordination of action-potential timing," Nature, Jun. 13, 1996, 381(6583):610-613.
Doborjeh et al., "Spiking Neural Network Modelling Approach Reveals How Mindfulness Training Rewires the Brain," Scientific Reports, Apr. 23, 2019, 9:1-15.
Ebli, "A Notion of Harmonic Clustering in Simplicial Complexes," Laboratory for Topology and Neuroscience, École Polytechnique Fédérale de Lausanne, 1015 Lausanne, Switzerland, Oct. 17, 2019, 9 pages.
Fan et al., "A Brief History of Simulation Neuroscience," Front. Neuroinform., May 7, 2019, 13:1-28.
Feldbrugge et al., "Stochastic homology of Gaussian vs. non-Gaussian random fields: graphs towards Betti Nos. and persistence diagrams," Journal of Cosmology and Astroparticle Physics, Sep. 24, 2019, 49 pages.
Feng et al., "Persistent Homology of Geospatial Data: A Case Study with Voting," Jan. 30, 2019, pp. 1-29.
Garcia et al., "Reconfigurations within resonating communities of brain regions following TMS reveal different scales of processing," BioRxiv, Jan. 9, 2020, pp. 1-39.
Guerreno, "The sleep onset transition: a connectivity investigation built on EEG source localization," University of Zurich, Facult of Science, Aug. 6, 2018, pp. 1-292.
Hu et al., "Local paths to global coherence: cutting networks down to size," Phys. Rev. E, Mar. 10, 2014, 89: 1-16.
Ibanze-Marcelo et al., "Topology highlights mesoscopic functional equivalence between imagery and perception: The case of hypnotizability," NeuroImage, Jun. 19, 2019, 437-449.
Ignacio et al., "Classification of Single-lead Electrocardiograms: TDA Informed Machine Learning," ArXiv, Nov. 25, 2019, pp. 1-6.
Ivancevic et al., "Tensor-Centric Warfare V: Topology of Systems Confrontation," Intelligent Control Automation, Feb. 28, 2019, 10:13-45.
Jozefowicz et al., "An Empirical Exploration of Recurrent Network Architectures," Proceedings of the 32nd International Conference on Machine Learning, 2015, 37:1-9.
Kanari et al., "A Topological Representation of Branching Neuronal Morphologies," Neuroinformatics, Oct. 3, 2017, 11 pages.
Kanari et al, "Quantifying topological invariants of neuronal morphologies," ArXiv, Mar. 28, 2016, 15 pages.
Kartun-Giles, "Beyond the clustering coefficient: A topological analysis of node neighborhoods in complex networks," Chaos, Solitons & Fractals: X, Feb. 16, 2019, 1:1-12.
Kastanenka et al., "A roadmap to integrate astrocytes into Systems Neuroscience," Gila, Wiley Periodicals, Apr. 9, 2019, pp. 1-22.
Khajezade et al., "A Game-Theoretical Network Formation Model for C. elegans Neural Network," Frontiers in Computational Neuroscience, Jul. 9, 2019, 13:1-12.
Kumarashinghe, "Deep learning and deep knowledge representation in Spiking Neural Networks for Brain-Computer Interface, "Neural Networks, Sep. 20, 2019, 121:169-185.
Kumbhar et al., "CoreNeuron: An Optimized Compute Engine for the NEURON Simulator," Frontiers in Neuroinformatics, Sep. 4, 2019, pp. 1-27.
Kvam, "A geometric framework for modeling dynamic decisions among arbitrarily many alternatives," Journal of Mathematical Psychology, Aug. 1, 2019, 91:14-37.
Luccioli et al., "Modeling driver cells in developing neural networks," PLOS Computational Biology, Nov. 2, 2018, pp. 1-31.
Lutgehetmann et al., "Computing Persistent Homology of Directed Flag Complexes," Algorithms, Jan. 7, 2020, 1:1-18.
Lynn et al., "The physics of brain network structure, function, and control," Nature Reviews, May 27, 2019, 1:318-332.
Mardones, "Persistence Steenrod modules," ArXiv Mathematics, Dec. 12, 2018, pp. 1-10.
Mehta, "Storing and retrieving long-term memories: cooperation and competition in synaptic dynamics," Advances in Physics: X, Jul. 19, 2018, 3:756-790.
Millán et al., "Complex Network Geometry and Frustrated Synchronization," Scientific Reports, Jul. 2, 2018, 8:1-10.
Millan et al., "Synchronization in network geometries with finite spectral dimension," ArXiv, Jan. 31, 2019, pp. 1-15.
Muller et al., "Neocortical plasticity: an unsupervised cake but No. free lunch," 33rd Conference on Neural Information Processing Systems, Vancouver, Canada, Nov. 2019, 6 pages.
Nolte, "Cortical reliability amid noise and chaos," Nature Communications, Aug. 22, 2019, 10:1-15.
Norton, "Dynamics of Reaction-Diffusion Oscillators in Star and other Networks with Cyclic Symmetries Exhibiting Multiple Clusters," Physical Review Letters, Oct. 4, 2019, 123: 1-6.
Office Action in U.S. Appl. No. 16/004,671, dated Oct. 27, 2022, 40 pages.
Office Action in US Appln. No. 16/710,2056, dated Oct. 26, 2022, 51 pages.
Peng, "High-throughput microcircuit analysis of individual human brains through next-generation multineuron patch-clamp," BioRxiv, Jan. 1, 2019, pp. 1-49.
Petri et al., "Simplicial Activity Driven Model," Phys. Rev. Lett., Nov. 29, 2018, 121:1-5.
Popa, "Psychology 2.0: The Emergence of Individuality," Sep. 2019, pp. 1-6.
Prentner, "Consciousness and Topologically Structured Phenomenal Spaces," Consciousness and Cognition, Feb. 26, 2019, 70:25-38.
Santos et al., "Topological phase transitions in functional brain networks," Physical Review E, Sep. 30, 2019, 100: 1-17.
Saucan et al., "Forman's Ricci Curvature—From Networks to Hypernetworks," vol. 1, Proceedings The 7th International Conference on Complex Networks and Their Applications, ArXiv, Oct. 17, 2018, 13 pages.
Schoenberg et al., "Mapping Meditative States and Stages with Electrophysiology: Concepts, Classifications, and Methods," Current Opinion in Psychology, Oct. 18, 2018, 28:211-217.
Sizemore et al., "The importance of the whole: Topological data analysis for the network neuroscientist," Network Neuroscience, Oct. 17, 2018, 3:1-18.
Skardal et al., "Abrupt Desynchronization and Extensive Multistability in Globally Coupled Oscillator Simplexes," Physical Review Letters 122, Jun. 19, 2019, pp. 1-6.
Timsit et al., "Nervous-Like Circuits in the Ribosome Facts, Hypotheses and Perspectives," Int. J. Mol. Sci, Jun. 14, 2019, 20:1-22.
Tran et al., "Scale-variant topological information for characterizing the structure of complex networks," Physical Review E. Sep. 18, 2019, 100:1-18.
Turner, "Rips filtrations for quasimetric spaces and asymmetric functions with stability results," Algebraic & Geometric Topology, May 21, 2019, 19:1135-1170.
Velazquez et al., "On a Simple General Principle of Brain Organization," Frontiers in Neuroscience, Oct. 15, 2019, 13:1-16.
Young, "Standard Laterality Models: Neo-Eriksonian Perspectives," Chapter 8, Causality and Development, Jan. 2019, pp. 147-179.
Office Action in U.S. Appl. No. 16/710,266, dated Nov. 17, 2022, 32 pages.
Office Action in U.S. Appl. No. 16/004,635, dated Jan. 23, 2023, 24 pages.
Djurfeldt et al., "Efficient generation of connectivity in neuronal networks from simulator-independent descriptions," Fronteriers in Neuroinformatics, Mar. 28, 2014, 8(43):1-11.
docs.opencv.org [online], "Camera Calibration and 3D Reconstruction," Apr. 14, 2020, retrieved on Oct. 5, 2022, retrieved from URL <https://docs.opencv.org/4.4.0/d9/d0c/group_calib3d.html#ga549c2075fac14829ff4a58bc931c033d)>, 78 pages.
docs.opencv.org [online], "Pose Estimation," available no later than Sep. 13, 2021, retrieved on Oct. 5, 2022, retrieved from URL <https://docs.opencv.org/4.x/d7/d53/tutorial_py_pose.html>, 3 pages.
Extended European Search Report in European Appln. No. 17174316.4, dated Dec. 14, 2017, 11 pages.

(56) References Cited

OTHER PUBLICATIONS

Extended European Search Report in European Appln. No. 17174317.2, dated Dec. 14, 2017, 11 pages.
Github.com [online], "facebookresearch/detectron2," 2019, retrieved on Oct. 5, 2022, retrieved from URL <https://github.com/facebookresearch/detectron2>, 4 pages.
Gleeson et al., "Open Source Brain: A Collaborative Resource for Visualizing, Analyzing, Simulating, and Developing Standardized Models of Neurons and Circuits," Neuron, Aug. 7, 2019, 103(3):395-411.e5.
Gripon et al., "Sparse Neural Networks with Large Learning Diversity," IEEE Transactions on Neural Networks, Jul. 2011, 22(7):1087-1096.
International Preliminary Report on Patentability in International Appln. No. PCT/EP2020/085750, mailed on Jun. 23, 2022, 8 pages.
International Preliminary Report on Patentability in International Appln. No. PCT/EP2020/085754, mailed Jun. 23, 2022, 12 pages.
International Preliminary Report on Patentability in International Appln. No. PCT/EP2020/085762, mailed on Jun. 23, 2022, 7 pages.
International Search Report and Written Opinion in International Appln. No. PCT/EP2020/085716, mailed on Mar. 25, 2021, 13 pages.
International Search Report and Written Opinion in International Appln. No. PCT/EP2020/085750, mailed on Apr. 6, 2021, 10 pages.
International Search Report and Written Opinion in International Appln. No. PCT/EP2020/085754, mailed Apr. 6, 2021, 14 pages.
International Search Report and Written Opinion in International Appln. No. PCT/EP2020/085762, mailed Apr. 6, 2021, 9 pages.
Liang et al., "Interpretable Structure-Evolving LSTM," 2017 IEEE Conference on Computervision and Pattern Recognition (CVPR), 2017, pp. 2175-2184.
Office Action in Korean Appln. No. 2020/7035845, dated Feb. 16, 2022, 9 pages (with English translation).
Office Action in Korean Appln. No. 2020-7035843, dated Jan. 27, 2022, 9 pages (with English translation).
Office Action in Korean Appln. No. 2020-7035844, dated Feb. 17, 2022, 6 pages (with English translation).
Office Action in Korean Appln. No. 2020-7035846, dated Feb. 15, 2022, 6 pages (with English translation).
Office Action in Korean Appln. No. 2020-7035847, dated Aug. 10, 2022, 5 pages (with English translation).
Office Action in Korean Appln. No. 2020-7035847, dated Feb. 15, 2022, 11 pages (with English translation).
Office Action in Taiwanese Appln. No. 108119813, dated May 19, 2021, 8 pages (with machine translation).
Office Action in Taiwanese Appln. No. 109143238, dated Dec. 1, 2021, 18 pages (with machine translation).
Office Action in Taiwanese Appln. No. 109143239, dated Nov. 30, 2021, 22 pages (with machine translation).
Office Action in Taiwanese Appln. No. 109143240, dated Dec. 24, 2021, 13 pages (with machine translation).
Office Action in Taiwanese Appln. No. 109143242, dated Nov. 26, 2021, 24 pages (with machine translation).
Office Action in Taiwanese Appln. No. 109143863, dated Mar. 1, 2022, 11 pages (with machine translation).
Office Action in U.S. Appl. No. 15/864,146, dated Dec. 8, 2021, 73 pages.
Office Action in U.S. Appl. No. 15/864,146, dated Jan. 13, 2021, 37 pages.
Office Action in U.S. Appl. No. 15/864,146, dated Jun. 3, 2021, 55 pages.
Office Action in U.S. Appl. No. 16/004,635, dated Aug. 3, 2022, 24 pages.
Office Action in U.S. Appl. No. 16/004,635, dated Jun. 3, 2021, 44 pages.
Office Action in U.S. Appl. No. 16/004,635, dated Nov. 24, 2021, 34 pages.
Office Action in U.S. Appl. No. 16/004,671, dated May 26, 2022, 43 pages.
Office Action in U.S. Appl. No. 16/004,671, dated Nov. 17, 2021, 40 pages.
Office Action in U.S. Appl. No. 16/004,757, dated Dec. 20, 2021, 31 pages.
Office Action in U.S. Appl. No. 16/004,757, dated Jul. 14, 2022, 30 pages.
Office Action in U.S. Appl. No. 16/004,757, dated Jun. 8, 2021, 26 pages.
Office Action in U.S. Appl. No. 16/004,837, dated Jun. 6, 2022, 8 pages.
Office Action in U.S. Appl. No. 16/356,391, dated Mar. 8, 2022, 10 pages.
Office Action in U.S. Appl. No. 16/356,391, dated Nov. 9, 2021, 13 pages.
Office Action in U.S. Appl. No. 16/356,478, dated Mar. 3, 2022, 5 pages.
Office Action in U.S. Appl. No. 16/710,058, dated Sep. 9, 2022, 14 pages.
Office Action in U.S. Appl. No. 16/710,176, dated Jun. 9, 2022, 7 pages.
Panda et al., "Learning to Recognize Actions from Limited Training Examples Using a Recurrent Spiking Neural Model", arXiv, Oct. 19, 2017, 17 pages.
Paredes-Valles et al., "Unsupervised Learning of a Hierarchical Spiking Neural Network for Optical Flow Estimation: From Events to Global Motion Perception," IEEE Transactions on Pattern Analysis and Machine Intelligence, Mar. 5, 2019, 42(8):2051-2064.
wikipedia.org [online], "DBSCAN," Mar. 31, 2008, retrieved on Oct. 5, 2022, retrieved from URL <https://en.wikipedia.org/wiki/DBSCAN>, 8 pages.
wikipedia.org [online], "Harris corner detector," Apr. 21, 2019, retrieved on Oct. 5, 2022, retrieved on Oct. 5, 2022, retrieved from URL <https://en.wikipedia.org/wiki/Harris_corner_detector>, 6 pages.
wikipedia.org [online], "OPTICS algorithm," Jun. 12, 2010, retrieved Oct. 5, 2022, retrieved from URL <https://en.wikipedia.org/wiki/OPTICS_algorithm>, 6 pages.
wikipedia.org [online], "Scale-invariant feature transform," Apr. 15, 2005, retrieved on Oct. 5, 2022, retrieved from URL <https://en.wikipedia.org/wiki/Scale-invariant_feature_transform>, 19 pages.
Yang et al., "Convolutional Neural Networks with Alternately Updated Clique," 2018 IEEE/CVF Conference on Computer Vision and Pattern Recognition, 2018, pp. 2413-2422.
Ghosh et al., "Design and Construction of a Brain-like computer: A New class of Frequency-Fractal Computing Using Wireless Communication in a Supramolecular Organic, Inorganic System," Information, 2014, 5, 28-100: doi: 10.339/info5010028.
Masulli et al., "Algebro-topological invariants in network theory," Int. J. Complex Systems in Science, Sep. 2015, 5(1):13-17.
Office Action in U.S. Appl. No. 16/004,757, dated Mar. 29, 2023, 37 pages.
Office Action in U.S. Appl. No. 16/710,266, dated Apr. 12, 2023, 42 pages.
Office Action in U.S. Appl. No. 16/710,205, dated May 10, 2023, 37 pages.
U.S. Appl. No. 18/295,959, filed Apr. 5, 2023, Henry.
Office Action in European Appln. No. 19728992.9, mailed on Jan. 24, 2023, 8 pages.
Office Action in European Appln. No. 19728993.7, mailed Jan. 24, 2023, 8 pages.
Office Action in European Appln. No. 20829805.9, mailed Sep. 14, 2023, 10 pages.
U.S. Appl. No. 18/480,927, filed Oct. 20, 2023, Markram et al.
Office Action in U.S. Appl. No. 16/004,671, dated Jun. 28, 2023, 39 pages.
International Preliminary Report on Patentability in International Appln. No. PCT/EP2022/073852, mailed on Mar. 28, 2024, 12 pages.
Mur-Artal et al., "ORB-SLAM: a versatile and accurate monocular SLAM system," IEEE transactions on robotics, Aug. 24, 2015, 31(5):1147-63.
Mur-Artal et al., "ORB-SLAM2: An open-source slam system for monocular, stereo, and rgb-d cameras," IEEE transactions on robotics, Jun. 12, 2017, 33(5):1255-62.

(56) References Cited

OTHER PUBLICATIONS

Office Action in Chinese Appln. No. 202080035412.2, mailed on Jan. 30, 2024, 22 pages (with English translation).
Office Action in U.S. Appl. No. 16/710,266, dated Jan. 29, 2024, 35 pages.
Office Action in U.S. Appl. No. 18/161,414, dated Dec. 21, 2023, 33 pages.
Office Action in U.S. Appl. No. 18/167,958, dated Feb. 15, 2024, 7 pages.
U.S. Appl. No. 17/454,347, filed Nov. 10, 2021, Lütgebetmann.
Office Action in Chinese Appln. No. 201980053140.6, mailed on Apr. 29, 2024, 12 pages (with English translation).
Office Action in Chinese Appln. No. 201980053141.0, mailed on Apr. 30, 2024, 19 pages (with English translation).
Office Action in Chinese Appln. No. 201980053463.5, mailed on May 23, 2024, 7 pages (with English translation).
Office Action in Chinese Appln. No. 201980053465.4, mailed on May 23, 2024, 7 pages (with English translation).
Office Action in Chinese Appln. No. 201980054063.6, mailed on May 23, 2024, 7 pages (with English translation).
U.S. Appl. No. 16/004,635, filed Jun. 11, 2018, Markram.
U.S. Appl. No. 16/004,837, filed Jun. 11, 2018, Markram.
U.S. Appl. No. 16/004,757, filed Jun. 11, 2018, Markram.
U.S. Appl. No. 16/004,671, filed Jun. 11, 2018, Markram.
U.S. Appl. No. 18/611,781, filed Mar. 21, 2024, Markram.
U.S. Appl. No. 16/356,391, filed Mar. 18, 2019, Markram.
U.S. Appl. No. 18/295,959, filed Apr. 5, 2023, Markram.
U.S. Appl. No. 16/356,478, filed Mar. 18, 2019, Hess.
U.S. Appl. No. 18/161,414, filed Jan. 30, 2023, Hess.
U.S. Appl. No. 16/710,266, filed Dec. 11, 2019, Markram.
U.S. Appl. No. 16/710,058, filed Dec. 11, 2019, Markram.
U.S. Appl. No. 18/490,927, filed Oct. 20, 2023, Markram et al.
U.S. Appl. No. 16/710,205, filed Dec. 11, 2019, Markram.
U.S. Appl. No. 18/487,566, filed Oct. 16, 2023, Markram et al.
U.S. Appl. No. 16/710,176, filed Dec. 11, 2019, Markram.
U.S. Appl. No. 18/167,958, filed Feb. 13, 2023, Markram.
U.S. Appl. No. 16/710,080, filed Dec. 11, 2019, Markram.
U.S. Appl. No. 18/295,969, filed Apr. 5, 2023, Henry.
U.S. Appl. No. 18/656,669, filed May 7, 2024, Markram.
U.S. Appl. No. 17/783,976, filed Jun. 9, 2022, Markram.
U.S. Appl. No. 17/783,978, filed Jun. 9, 2022, Markram.
U.S. Appl. No. 17/783,981, filed Jun. 9, 2022, Markram.
U.S. Appl. No. 17/454,347, filed Nov. 10, 2021, Lütgehetmann.
U.S. Appl. No. 15/864,146, filed Jan. 8, 2018, Reimann.
U.S. Appl. No. 18/188,888, filed Mar. 23, 2023, Reimann.
Nazeran et al., "Neural Networks in Processing and Analysis of Biomedical Signals," Nonlinear Biomedical Signal Processing, Fuzzy Logic, Neural Networks, and New Algorithms, IEEE, Metin Akay (. ed), Jul. 2000, Chapter 4, pp. 69-97.
Office Action in U.S. Appl. No. 16/710,266, mailed on Aug. 9, 2024, 33 pages.
Timotheou, "The random neural network: a survey," The Computer Journal, Mar. 2010, 53(3):251-67.
U.S. Appl. No. 18/527,555, filed Dec. 4, 2023, Markram.
Google.com [online], "Search Query: Cliques simplices cavities," available on or before Feb. 19, 2025, retrieved on Feb. 19, 2025, retrieved from URL <https://www.google.com/search?udm=36&q=cliques+simplices+cavities>, 4 pages.
Office Action in Chinese Appln. No. 202080036778.1, mailed on Dec. 30, 2024, 26 pages (with English translation).
Office Action in U.S. Appl. No. 16/710,266, mailed on Feb. 13, 2025, 33 pages.
Office Action in U.S. Appl. No. 18/295,959, mailed on Nov. 18, 2024, 14 pages.
Office Action in U.S. Appl. No. 18/527,555, mailed on Nov. 21, 2024, 52 pages.
Chatzis et al., "The copula echo state network," Pattern Recognition, Jan. 2012, 45(1):570-7.
Khan et al., "Learning from Privacy Preserved Encrypted Data on Cloud Through Supervised and Unsupervised Machine Learning," Presented at Proceedings of the 2019 2nd International Conference on Computing, Mathematics and Engineering Technologies, Sukkur, Sindh, Pakistan, Jan. 30-31, 2019, 5 pages.
Office Action in Chinese Appln. No. 202080035412.2, mailed on Sep. 24, 2024, 9 pages (with Machine translation).
Office Action in European Appln. No. 20711136.0, mailed on Sep. 17, 2024, 8 pages.
Office Action in European Appln. No. 20711154.3, mailed on Sep. 13, 2024, 6 pages.
Office Action in U.S. Appl. No. 17/454,347, mailed on Oct. 16, 2024, 25 pages.
Office Action in Chinese Appln. No. 201980053465.4, mailed on Mar. 21, 2025, 11 pages (with English translation).
Office Action in U.S. Appl. No. 18/295,959, mailed on Mar. 5, 2025, 12 pages.

\* cited by examiner

| WINDOW N | |
|---|---|
| DIMENSION | COUNT |
| 2 | 2032 |
| 3 | 877 |
| 4 | 133 |
| 5 | 66 |
| 6 | 48 |
| ... | ... |

CHARACTERIZING ACTIVITY IN A RECURRENT ARTIFICIAL NEURAL NETWORK

BACKGROUND

This specification relates to the characterization of activity in a recurrent artificial neural network. The characterization of activity can be used, e.g., in the identification of decision moments, as well as in encoding/decoding signals in contexts such as transmission, encryption, and data storage.

Artificial neural networks are devices that are inspired by the structure and functional aspects of networks of biological neurons. In particular, artificial neural networks mimic the information encoding and other processing capabilities of networks of biological neurons using a system of interconnected constructs called nodes. The arrangement and strength of connections between nodes in an artificial neural network determines the results of information processing or information storage by the artificial neural network.

Neural networks can be trained to produce a desired signal flow within the network and achieve desired information processing or information storage results. In general, training a neural network will change the arrangement and/or strength of connections between nodes during a learning phase. A neural network can be considered trained when sufficiently appropriate processing results are achieved by the neural network for given sets of inputs.

Artificial neural networks can be used in a variety of different devices to perform non-linear data processing and analysis. Non-linear data processing does not satisfy the superposition principle, i.e., the variables that are to be determined cannot be written as a linear sum of independent components. Examples of contexts in which non-linear data processing is useful include pattern and sequence recognition, speech processing, novelty detection and sequential decision making, complex system modelling, and systems and techniques in a variety of other contexts.

SUMMARY

This specification describes technologies relating to the characterization of activity in an artificial neural network.

For example, a method for identifying decision moments in a neural network includes determining a complexity of patterns of activity in the recurrent artificial neural network, wherein the activity is responsive to input into the recurrent artificial neural network, determining a timing of activity having a complexity that is distinguishable from other activity that is responsive to the input, and identifying the decision moments based on the timing of the activity that has the distinguishable complexity.

As another example, a method for characterizing activity in a recurrent artificial neural network includes identifying clique patterns of activity of the recurrent artificial neural network. The method is performed by data processing apparatus.

As another example, a method can include outputting a binary sequence of zeros and ones from a recurrent artificial neural network, wherein each digit in the sequence represents whether or not a particular group of nodes in the recurrent artificial neural network displays a respective pattern of activity.

As another example, a method of structuring a recurrent artificial neural network can include characterizing a complexity of patterns of activity that can arise in the recurrent artificial neural network that comprises a structured collection of nodes and links between the nodes, and evolving the structure of the recurrent artificial neural network to increase the complexity of the patterns of activity. This method of structuring can also be used, e.g., a part of a method of training the recurrent artificial neural network.

Other embodiments of these aspects include corresponding systems, apparatus, and computer programs, configured to perform the actions of the methods, encoded on computer storage devices.

Particular embodiments of the subject matter described in this specification can be implemented so as to realize one or more of the following advantages. For example, traditional data processing devices such as, e.g., digital and other computers are programmed to follow a pre-defined logic sequence when processing information. The moment when a computer arrives at a result is thus relatively easy to identify. Namely, the completion of the logic sequence embodied in the programming indicates when information processing is complete and the computer has "reached a decision." The result can be held at the output of the computer's data processor in a relatively long-lived form by, e.g., a memory device, a set of buffers, or the like, and accessed for a variety of purposes.

In contrast, as described herein, decision moments in artificial recurrent neural networks can be identified based on characteristics of the dynamic properties of the neural network during information processing. Rather than waiting for the artificial neural network to reach a pre-defined end of a logic sequence, decision moments in artificial neural networks can be identified based on characteristics of the functional states of the artificial neural network in the midst of information processing.

Further, the characteristics of the dynamic properties of recurrent artificial neural networks during information processing—including characteristics such as the activity comporting with clique patterns and directed clique patterns—can be used in a variety of signalling operations, including signal transmission, encoding, encryption, and storage. In particular, the characteristics of the activity in a recurrent artificial neural network during information processing reflects the input and can be considered to be an encoded form of the input (i.e., the "output" of a recurrent artificial neural network in encoding processes). These characteristics can be, e.g., transmitted to a remote receiver which could decode the transmitted characteristics to reconstitute the input or a portion of the input.

Moreover, in some cases, activity in different groups of nodes a recurrent artificial neural network (e.g., activity that comports with clique patterns and directed clique patterns) can be represented as a binary sequence of zeros and ones, each digit indicating whether or not that activity comports with a pattern. Since the activity can be the output of a recurrent artificial neural network in some contexts, the output of a recurrent artificial neural network can be represented as a vector of binary digits and compatible with digital data processing.

Further, in some cases, such characterization of the dynamic properties of a recurrent artificial neural network can be used prior to and/or during training to increase the likelihood of complex patterns of activity arising during information processing. For example, before or during training, the links between nodes in a recurrent neural network can be intentionally evolved to increase the complexity of activity patterns. For example, the links between nodes in a recurrent artificial neural network can be intentionally evolved to increase the likelihood that, e.g., clique patterns and directed clique patterns of activity arise during information processing. This can reduce the time and effort needed to train a recurrent artificial neural network.

As another example, such characterization of the dynamic properties of a recurrent artificial neural network can be used to determine a degree of completeness in the training of a recurrent neural network. For example, a recurrent artificial neural network that displays particular types of ordering in the activity (e. g, clique patterns and directed clique patterns) can be considered more highly trained than a recurrent artificial neural network that does not display such ordering. Indeed, in some cases, the extent of training can be quantified by quantifying the degree of ordering of the activity in the recurrent artificial neural network.

The details of one or more implementations described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
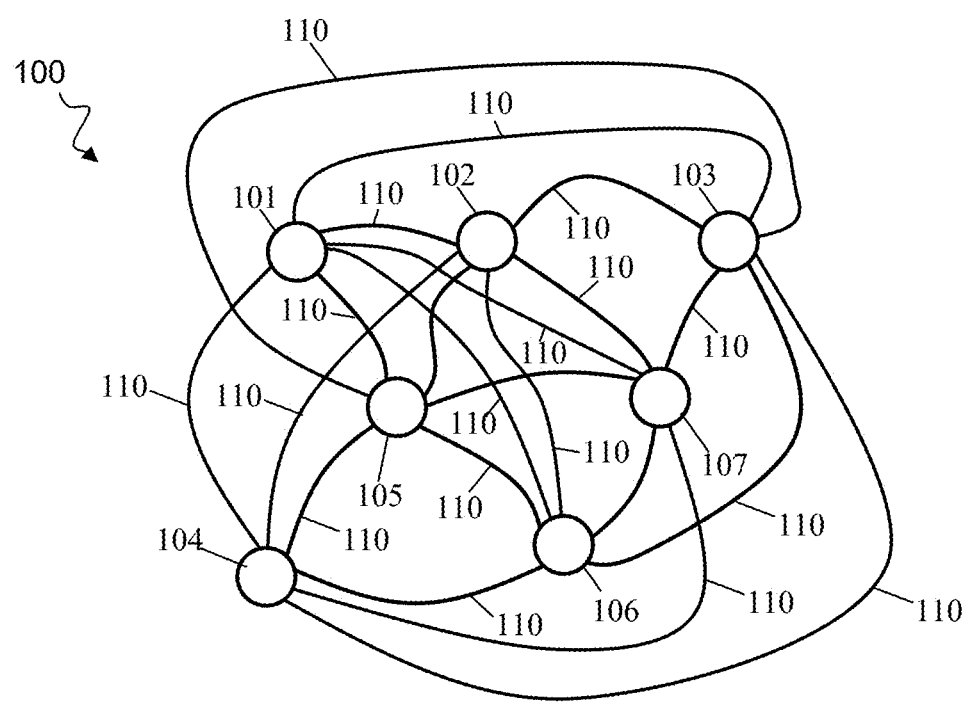
FIG. 1 is a schematic illustration of the structure of recurrent artificial neural network device.

FIG. 1 is a schematic illustration of the structure of a recurrent artificial neural network device 100. Recurrent artificial neural network device 100 is a device that mimics the information encoding and other processing capabilities of networks of biological neurons using a system of interconnected nodes. Recurrent artificial neural network device 100 can be implemented in hardware, in software, or in combinations thereof.

The illustration of recurrent artificial neural network device 100 includes a plurality of nodes 101, 102, . . . , 107 that are interconnected by a plurality of structural links 110. Nodes 101, 102, . . . , 107 are discrete information processing constructs that are analogous to neurons in biological networks. Nodes 101, 102, . . . , 107 generally process one or more input signals received over one or more of links 110 to produce one or more output signals that are output over one or more of links 110. For example, in some implementations, nodes 101, 102, . . . , 107 can be artificial neurons that weight and sum multiple input signals, pass the sum through one or more non-linear activation functions, and output one or more output signals.

Nodes 101, 102, . . . , 107 can operate as accumulators. For example, nodes 101, 102, . . . , 107 can operate in accordance with an integrate-and-fire model in which one or more signals accumulate in a first node until a threshold is reached. After the threshold is reached, the first node fires by transmitting an output signal to a connected, second node along one or more of links 110. In turn, the second node 101, 102, . . . , 107 accumulates the received signal and, if a threshold is reached, then the second node 101, 102, . . . , 107 transmits yet another output signal to a further connected node.

Structural links 110 are connections that are capable of transmitting signals between nodes 101, 102, . . . , 107. For the sake of convenience, all structural links 110 are treated herein as identical bidirectional links that convey a signal from every first of nodes 101, 102, . . . , 107 to every second of nodes 101, 102, . . . , 107 in identically the same manner as a signal is conveyed from the second to the first. However, this is not necessarily the case. For example, some portion or all of structural links 110 can be unidirectional links that convey a signal from a first of nodes 101, 102, . . . , 107 to a second of nodes 101, 102, . . . , 107 without conveying signals from the second to the first.

As another example, in some implementations, structural links 110 can have diverse properties other than or in addition to directionality. For example, in some implementations, different structural links 110 can carry signals of different magnitudes—resulting in a different strengths of interconnection between respective of nodes 101, 102, . . . , 107. As another example, different structural links 110 can carry different types of signal (e.g., inhibitory and/or excitatory signals). Indeed, in some implementations, structural links 110 can be modelled on the links between soma in biological systems and reflect at least a portion of the enormous morphological, chemical, and other diversity of such links.

In the illustrated implementation, recurrent artificial neural network device 100 is a clique network (or subnetwork) in that every node 101, 102, . . . , 107 is connected to every other node 101, 102, . . . , 107. This is not necessarily the case. Rather, in some implementations, each node 101, 102, . . . , 107 can be connected to a proper subset of nodes 101, 102, . . . , 107 (by identical links or diverse links, as the case may be).

For the sake of clarity of illustration, recurrent artificial neural network device 100 is illustrated with only seven nodes. In general, real-world neural network devices will include significantly larger numbers of nodes. For example, in some implementations, neural network devices can include hundreds of thousands, millions, or even billions of nodes. Thus, recurrent neural network device 100 can be a fraction of a larger recurrent artificial neural network (i.e., a subnetwork).

In biological neural network devices, accumulation and signal transmission processes require the passage of time in the real world. For example, the soma of a neuron integrates input received over time, and signal transmission from neuron to neuron requires times that are determined by, e.g., the signal transmission velocity and the nature and length of the links between neurons. Thus, the state of a biological neural network device is dynamic and changes over time.

In artificial recurrent neural network devices, time is artificial and represented using mathematical constructs. For example, rather than requiring a real world passage of time for signals to transmit from node to node, such signals can be represented in terms of artificial units that are generally unrelated to the real world passage of time—as measured in computer clock cycles or otherwise. Nevertheless, the state of an artificial recurrent neural network device can be described as "dynamic" in that it changes with respect to these artificial units.

Please note that, for the sake of convenience, these artificial units are referred to herein as "time" units. Nevertheless, it is to be understood that these units are artificial and generally do not correspond to the real world passage of time.

Figure 2:
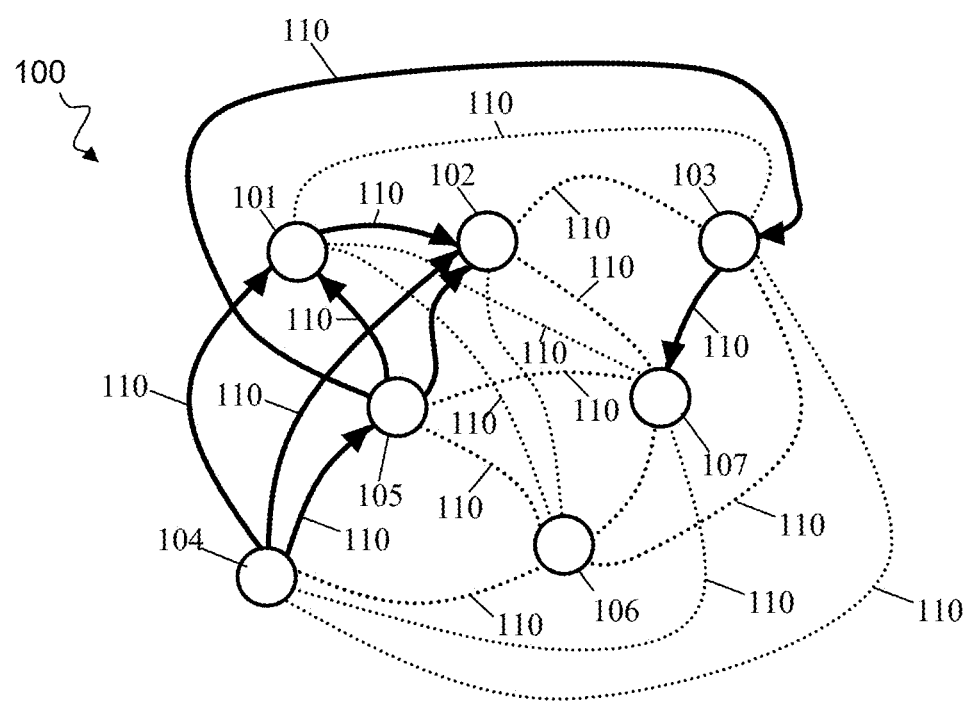
FIGS. 2 and 3 are schematic illustrations of the function of recurrent artificial neural network device in different windows of time.
Figure 3:
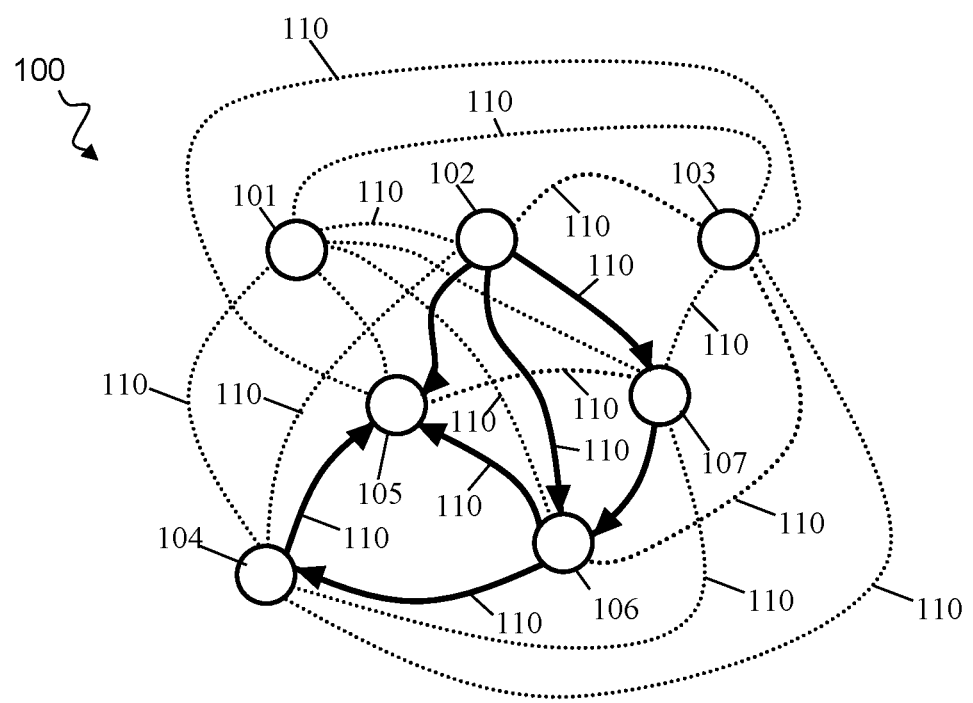

FIGS. 2 and 3 are schematic illustrations of the function of recurrent artificial neural network device 100 in different windows of time. Because the state of device 100 is dynamic, the functioning of device 100 can be represented using the signal transmission activity that occurs within a window. Such a functional illustration generally shows activity in only a fraction of links 110. In particular, since in general not every link 110 conveys a signal within a particular window, not every link 110 is illustrated as actively contributing to the functioning of the device 100 in these illustrations.

In the illustrations of FIGS. 2 and 3, an active link 110 is illustrated as a relatively thick solid line connecting a pair of nodes 101, 102, . . . , 107. In contrast, inactive links 110 are illustrated as dashed lines. This is for the sake of illustration only. In other words, the structural connections formed by links 110 exist whether or not links 110 are active. However, this formalism highlights activity and the functioning of device 100.

In addition to schematically illustrating the existence of activity along a link, the direction of the activity is also schematically illustrated. In particular, the relatively thick solid lines that illustrate active of links 110 also include arrow heads that denote the direction of signal transmission along the link during the relevant window. In general, the direction of signal transmission in a single window does not conclusively constrain the link to being a unidirectional link having the indicated directionality. Rather, in a first functional illustration for a first window of time, a link can be active in a first direction. In a second functional illustration for a second window, a link can be active in the opposite direction. However, in some cases such as, e.g., in a recurrent artificial neural network device 100 that exclusively includes unidirectional links, the directionality of signal transmission will conclusively indicate the directionality of the link.

In feedforward neural network devices, information moves exclusively in a single direction (i.e., forward) to an output layer of nodes that is at the end of the network. Feedforward neural network devices indicate that a "decision" has been reached and that information processing is complete by the propagation of the signals through the network to the output layer.

In contrast, in recurrent neural networks, the connections between nodes form cycles and the activity of the network dynamically progresses without a readily identifiable decision. For example, even in a three-node recurrent neural network, the first node can transmit a signal to the second node, which in response can transmit a signal to the third. In response, the third node can transmit a signal back to the first. The signals received by the first node can be responsive—at least in part—to the signals transmitted from that same node.

The schematic functional illustrations FIGS. 2 and 3 illustrate this in a network that is only slightly larger than a three-node recurrent neural network. The functional illustrations shown in FIG. 2 can be illustrative of activity within a first window and FIG. 3 can be illustrative of activity within a second, immediately following. As shown, a collection of signal transmission activity appears to originate in node 104 and progress in a generally clockwise direction through device 100 during the first window. In the second window, at least some of the signal transmission activity generally appears to return to node 104. Even in such a simplistic illustration, signal transmission does not proceed in a manner that yields a clearly identifiable output or end.

When a recurrent neural network of, e.g., thousands of nodes or more is considered, it can be recognized that signal propagation can occur over a huge number of paths and that these signals lack a clearly identifiable "output" location or time. Although the network may by design return to a quiescent state in which only background or even no signal transmission activity occurs, the quiescent state itself does not indicate the results of information processing. The recurrent neural network always returns to the quiescent state regardless of the input. The "output" or the result of the information processing is thus encoded in the activity that occurs within the recurrent neural network in response to a particular input.

Figure 4:
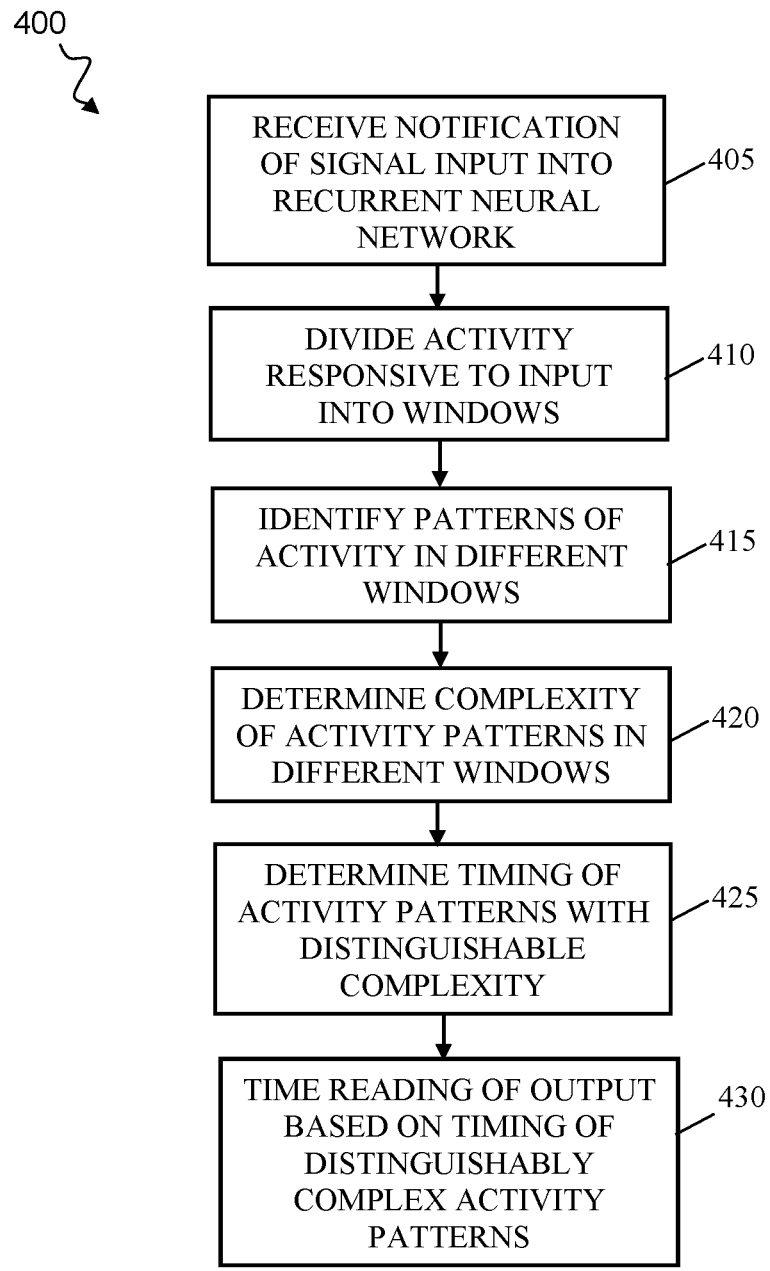
FIG. 4 is a flowchart of a process for identifying decision moments in a recurrent artificial neural network based on characterization of the activity in the network.

FIG. 4 is a flowchart of a process 400 for identifying decision moments in a recurrent artificial neural network based on characterization of the activity in the network. A decision moment is a point of time when the activity in a recurrent artificial neural network is indicative of the results of information processing by the network in response to an input. Process 400 can be performed by a system of one or more data processing apparatus that perform operations in accordance with the logic of one or more sets of machine-readable instructions. For example, process 400 can be performed by that same system of one or more computers that executes software for implementing the recurrent artificial neural network used in process 400.

The system performing process 400 receives a notification that a signal has been input into the recurrent artificial neural network at 405. In some cases, the input of the signal is a discrete injection event in which, e.g., information is injected into one or more nodes and/or one or more links of the neural network. In other cases, the input of the signal is a stream of information that is injected into the one or more nodes and/or links of the neural network over a period of time. The notification indicates that the artificial neural network is actively processing information and not, e.g., in a quiescent state. In some cases, the notification is received from the neural network itself, e.g., such as when the neural network exits an identifiable quiescent state.

The system performing process 400 divides the responsive activity in the network into a collection of windows at 410. In cases where injection is a discrete event, the windows can subdivide the time between injection and a return to a quiescent state into a number of periods during which the activity displays variable complexities. In cases where injection is a stream of information, the duration of the injection (and optionally the time to return to a quiescent state after injection is complete) can be subdivided into windows during which the activity displays variable complexities. Various approaches to determining the complexity of activity are discussed further below.

In some implementations, the windows all have the same duration, but this is not necessarily the case. Rather, in some implementations, the windows can have different durations. For example, in some implementations, duration can increase as time since a discrete injection event has occurred increases.

In some implementations, the windows can be a successive series of separate windows. In other implementations, the windows overlap in time so that one window begins before a previous window ends. In some cases, the windows can be a moving window that moves in time.

In some implementations, different durations of windows are defined for different determinations of the complexity of activity. For example, for activity patterns that define activity occurring between relatively larger numbers of nodes, the windows can have a relatively longer duration than windows that are defined for activity patterns that define activity occurring between relatively smaller numbers of nodes. For example, in the context of patterns 500 of activity (FIG. 5), a window that is defined for identifying activity that comports with pattern 530 can be longer than a window that is defined for identifying activity that comports with pattern 505.

The system performing process 400 identifies patterns in the activity in the network in the different windows at 415. As discussed further below, patterns in the activity can be identified by treating a functional graph as a topological space with nodes as points. In some implementation, the activity patterns that are identified are cliques, e.g., directed cliques, in a functional graph of the network.

The system performing process 400 determines the complexity of the activity patterns in different windows at 420. The complexity can be a measure of the likelihood that an ordered pattern of activity arises within a window. Thus, activity patterns that arise randomly would be relatively simple. On the other hand, activity patterns that show non-random order are relatively complex. For example, in some implementations, the complexity of an activity pattern can be measured using, e.g., the simplex counts or the Betti numbers of the activity pattern.

The system performing process 400 determines the timing of activity patterns having a distinguishable complexity at 425. A particular activity pattern can be distinguishable based on a complexity that deviates upwards or deviates downward, e.g., from a fixed or a variable baseline. In other words, the timing of activity patterns that indicate particularly high levels or particularly low levels of non-random order in the activity can be determined.

For example, in cases where signal input is a discrete injection event, deviations, e.g., from a stable baseline or from a curve that is characteristic of the neural network's average response to a variety of different discrete injection events can be used to determine the timing of distinguishable complex activity patterns. As another example, in cases where information is input in a stream, large changes in complexity during streaming can be used to determine the timing of distinguishable complex activity patterns.

The system performing process 400 times the reading of the output from the neural network based on the timing of distinguishably complex activity patterns at 430. For example, in some implementations, the output of the neural network can be read at the same time that distinguishable complex activity patterns arise. In implementations where the complexity deviations indicate a relatively high non-random order in the activity, the observed activity patterns themselves can also be taken as the output of the recurrent artificial neural network.

Figure 5:
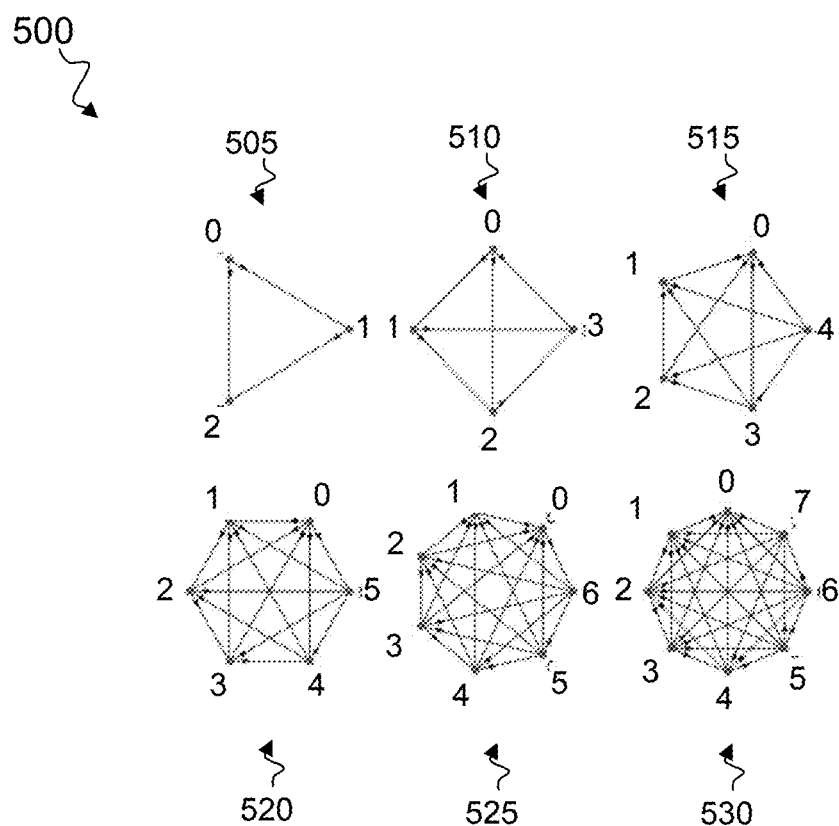
FIG. 5 is a schematic illustration of patterns of activity that can be identified and used for identifying decision moments in a recurrent artificial neural network.

FIG. 5 is an illustration of patterns 500 of activity that can be identified and used for identifying decision moments in a recurrent artificial neural network. For example, patterns 500 can be identified at 415 in process 400 (FIG. 4).

Patterns 500 are illustrations of activity within a recurrent artificial neural network. During the application of patterns 500, a functional graph is treated as a topological space with nodes as points. Activity in nodes and links that comports with patterns 500 can be recognized as ordered regardless of the identity of the particular nodes and/or links that participate in the activity. For example, first pattern 505 can represent the activity between nodes 101, 104, 105 in FIG. 2, with point 0 in pattern 505 as node 104, point 1 as node 105, and point 2 as node 101. As another example, first pattern 505 can also represent the activity between nodes 104, 105, 106 in FIG. 3, with point 0 in pattern 505 as node 106, point 1 as node 104, and point 2 as node 105. The order of activity in the directed cliques is also specified. For example, in pattern 505, activity between point 1 and point 2 occurs after the activity between point 0 and point 1.

In the illustrated implementation, patterns 500 are all directed cliques or directed simplices. In such patterns, activity originates from a source node that transmits signals to every other node in the pattern. In patterns 500, such source nodes are designated as point 0 whereas the other nodes are designated as points 1, 2, . . . . Further, in directed cliques or simplices, one of the nodes acts a sink and receives signals transmitted from every other node in the pattern. In patterns 500, such sink nodes are designated as the highest numbered point in the pattern. For example, in pattern 505, the sink node is designated as point 2. In pattern 510, the sink node is designated as point 3. In pattern 515, the sink node is designated as point 3, and so on. The activity represented by patterns 500 is thus ordered in a distinguishable manner.

Each of patterns 500 has a different number of points and reflects ordered activity in a different number of nodes. For example, pattern 505 is a 2D-simplex and reflects activity in three nodes, pattern 510 is a 3D-simplex and reflects activity in four nodes, and so on. As the number of points in a pattern increases, so does the degree of ordering and the complexity of the activity. For example, for a large collection of nodes that have a certain level of random activity within a window, some of that activity may comport with pattern 505 out of happenstance. However, it is progressively more unlikely that random activity will comport with the respective of patterns 510, 515, 520 . . . . The presence of activity that comports with pattern 530 indicates a relatively higher degree of ordering and complexity in the activity that the presence of activity that comports with pattern 505.

As discussed previously, in some implementations, different duration windows can be defined for different determinations of the complexity of activity. For example, when activity that comports with pattern 530 is to be identified, longer duration windows can be used than when activity that comports with pattern 505 is to be identified.

Figure 6:
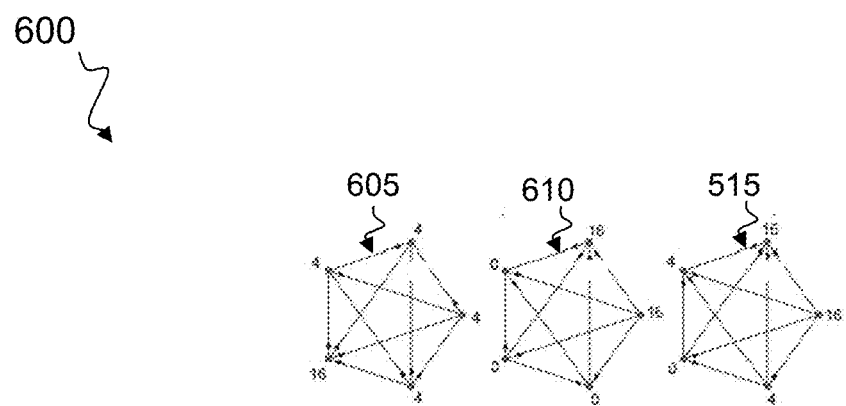
FIG. 6 is a schematic illustration of patterns of activity that can be identified and used for identifying decision moments in a recurrent artificial neural network.

FIG. 6 is an illustration of patterns 600 of activity that can be identified and used for identifying decision moments in a recurrent artificial neural network. For example, patterns 600 can be identified at 415 in process 400 (FIG. 4).

Like patterns 500, patterns 600 are illustrations of activity within a recurrent artificial neural network. However, patterns 600 depart from the strict ordering of patterns 500 in that patterns 600 are not all directed cliques or directed simplices. In particular, patterns 605, 610 have a lower directionality than pattern 515. Indeed, pattern 605 lacks a sink node altogether. Nevertheless, patterns 605, 610 indicate degree of ordered activity that exceeds that expected through random happenstance and can be used to determine the complexity of activity in a recurrent artificial neural network.

Figures 7, 8:
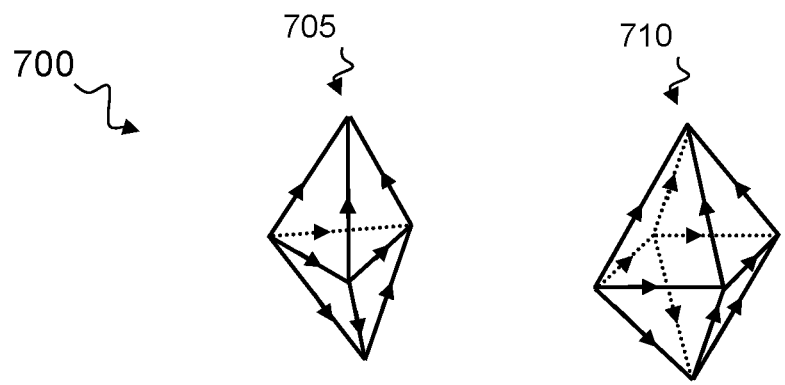
FIG. 7 is a schematic illustration of patterns of activity that can be identified and used for identifying decision moments in a recurrent artificial neural network.
FIG. 8 is a schematic illustration of a data table that can be used in a determination of the complexity or degree of ordering in the activity patterns in a recurrent artificial neural network device.

FIG. 7 is an illustration of patterns 700 of activity that can be identified and used for identifying decision moments in a recurrent artificial neural network. For example, patterns 700 can be identified at 415 in process 400 (FIG. 4).

Patterns 700 are groups of directed cliques or directed simplices of the same dimension (i.e., have the same number of points) that define patterns involving more points than the individual cliques or simplices and enclose cavities within the group of directed simplices.

By way of example, pattern 705 includes six different three point, 2-dimensions patterns 505 that together define a homology class of degree two, whereas pattern 710 includes eight different three point, 2-dimensions patterns 505 that together define a second homology class of degree two. Each of the three point, 2-dimensions patterns 505 in patterns 705, 710 can be thought of as enclosing a respective cavity. The $n^{th}$ Betti number associated with a directed graph provides a count of such homology classes within a topological representation.

The activity illustrated by patterns such as patterns 700 illustrates a relatively high degree of ordering of the activity within a network that is unlikely to arise by random happenstance. Patterns 700 can be used to characterize the complexity of that activity.

In some implementations, only some patterns of activity are identified and/or some portion of the patterns of activity that are identified are discarded or otherwise ignored during the identification of decision moments. For example, with reference to FIG. 5, activity that comports with the five point, 4-dimensional simplex pattern 515 inherently includes activity that comports with the four point, 3-dimensional and three point, 2-dimension simplex patterns 510, 505. For example, points 0, 2, 3, 4 and points 1, 2, 3, 4 in 4-dimensional simplex pattern 515 of FIG. 5 both comport with 3-dimensional simplex pattern 510. In some implementations, patterns that include fewer points—and hence are of a lower dimension—can be discarded or otherwise ignored during the identification of decision moments.

As another example, only some patterns of activity need be identified. For example, in some implementations only patterns with odd number of points (3, 5, 7, . . . ) or even numbers of dimensions (2, 4, 6, . . . ) are used in the identification of decision moments.

The complexity or degree of ordering in the activity patterns in a recurrent artificial neural network device in different windows can be determined in a variety of different ways. FIG. 8 is a schematic illustration of a data table 800 that can be used in such a determination. Data table 800 can be used to determine the complexity of the activity patterns in isolation or in conjunction with other activities. For example, data table 800 can be used at 420 in process 400 (FIG. 4).

In further detail, table 800 includes a number count of pattern occurrences during a window "N," where the number counts of activity that matches patterns of different dimensions are presented in different rows. For example, in the illustrated example, row 805 includes a number count (i.e., "2032") of the occurrences of activity that matches one or more three point, 2-dimensional patterns, whereas row 810 includes a number count (i.e., "877") of the occurrences of activity that matches one or more four point, 3-dimensional patterns. Since an occurrence of the patterns indicates that the activity has an order which is non-random, the number counts also provide generalized characterization of the overall complexity of the activity patterns. A table that is analogous to table 800 can be formed for each window that is defined, e.g., at 410 in process 400 (FIG. 4).

Although table 800 includes a separate row 805, 810, 815, 820, 825 and a separate entry for every type of activity pattern, this is not necessarily the case. For example, one of more counts can be omitted (e.g., counts of simpler patterns) can be omitted from table 800 and from a determination of the complexity. As another example, some implementations, a single row or entry can include counts of occurrences of multiple activity patterns.

Although FIG. 8 presents the number count in a table 800, this is not necessarily the case. For example, the number count can be presented as a vector (e.g., <2032, 877, 133, 66, 48, . . . >). Regardless of how the count is presented, in some implementations, the counts can be expressed in binary and can be compatible with digital data processing infrastructure.

In some implementations, number counts of the occurrences of the patterns can be weighted or combined to determine the degree or complexity of the ordering, e.g., at 420 in process 400 (FIG. 4). For example, the Euler characteristic can provide an approximation of the complexity of the activity and is given by:

$$S_0 - S_1 + S_2 - S_3 + \ldots \qquad \text{EQUATION 1}$$

where $S_n$ is number of occurrences of a pattern of n points (i.e., a pattern of dimensionality n−1). The patterns can be, e.g., the directed clique patterns 500 (FIG. 5).

As another example of how number counts of the occurrences of the patterns can be weighted to determine the degree or complexity of the ordering, in some implementations pattern occurrences can be weighted based on the weights of the links that are active. In further detail, as discussed previously, the strength of connection between nodes in an artificial neural network can vary, e.g., as a consequence of how active the connection was during training. An occurrence of a pattern of activity along a collection of relatively stronger links can be weighted differently from the occurrence of that same pattern of activity along a collection of relatively weaker links. For example, in some implementations, the sum of the weight of the links that are active can be used to weight the occurrence.

In some implementations, the Euler characteristic or other measure of complexity can be normalized by the total number of patterns that are matched within a particular window and/or the total number of patterns that it is possible for a given network to form given its structure. An example of a normalization with regard to the total number of patterns that it is possible for a network to form is given below in Equations 2, 3.

In some implementations, occurrences of higher dimension patterns involving larger numbers of nodes can be weighted more heavily than occurrences of lower dimension patterns involving smaller numbers of nodes. For example, the probability of forming directed cliques decreases rapidly with increasing dimension. In particular, to form an n-clique from n+1 nodes, one needs (n+1)n/2 edges all oriented correctly. This probability can be reflected in the weighting.

In some implementations, both the dimension and the directionality of patterns can be used to weight occurrences of patterns and determine the complexity of the activity. For example, with reference to FIG. 6, occurrences of five point, 4-dimensional pattern 515 can be weighted more heavily than occurrences of five point, 4-dimensional patterns 605, 610 in accordance with the differences in directionality of those patterns.

An example of the use of both the directionality and the dimension of patterns to determine the degree of ordering or complexity of the activity can be given by $$\frac{S_0^{active}(n_0)^3 - S_1^{active}(n_1)^3 + S_2^{active}(n_2)^3 - S_3^{active}(n_3)^3 \ldots}{ERN} \bigg/ SC \quad \text{EQUATION 2}$$

where $S_x^{active}$ indicates the number of active occurrences of a pattern of n points and ERN is the calculation for an equivalent random network, i.e., a network with the same number of nodes randomly connected. Further, SC is given by $$SC = \frac{S_0^{silent}(n_0)^3 - S_1^{silent}(n_1)^3 + S_2^{silent}(n_2)^3 - S_3^{silent}(n_3)^3 \ldots}{ERN} \quad \text{EQUATION 3}$$

where $S_x^{silent}$ indicates the number of occurrences of a pattern of n points when the recurrent artificial neural network is silent and can be thought of as embodying the total number of patterns that it is possible for the network to form. In Equations 2, 3, the patterns can be, e.g., the directed clique patterns 500 (FIG. 5).

Figure 9:
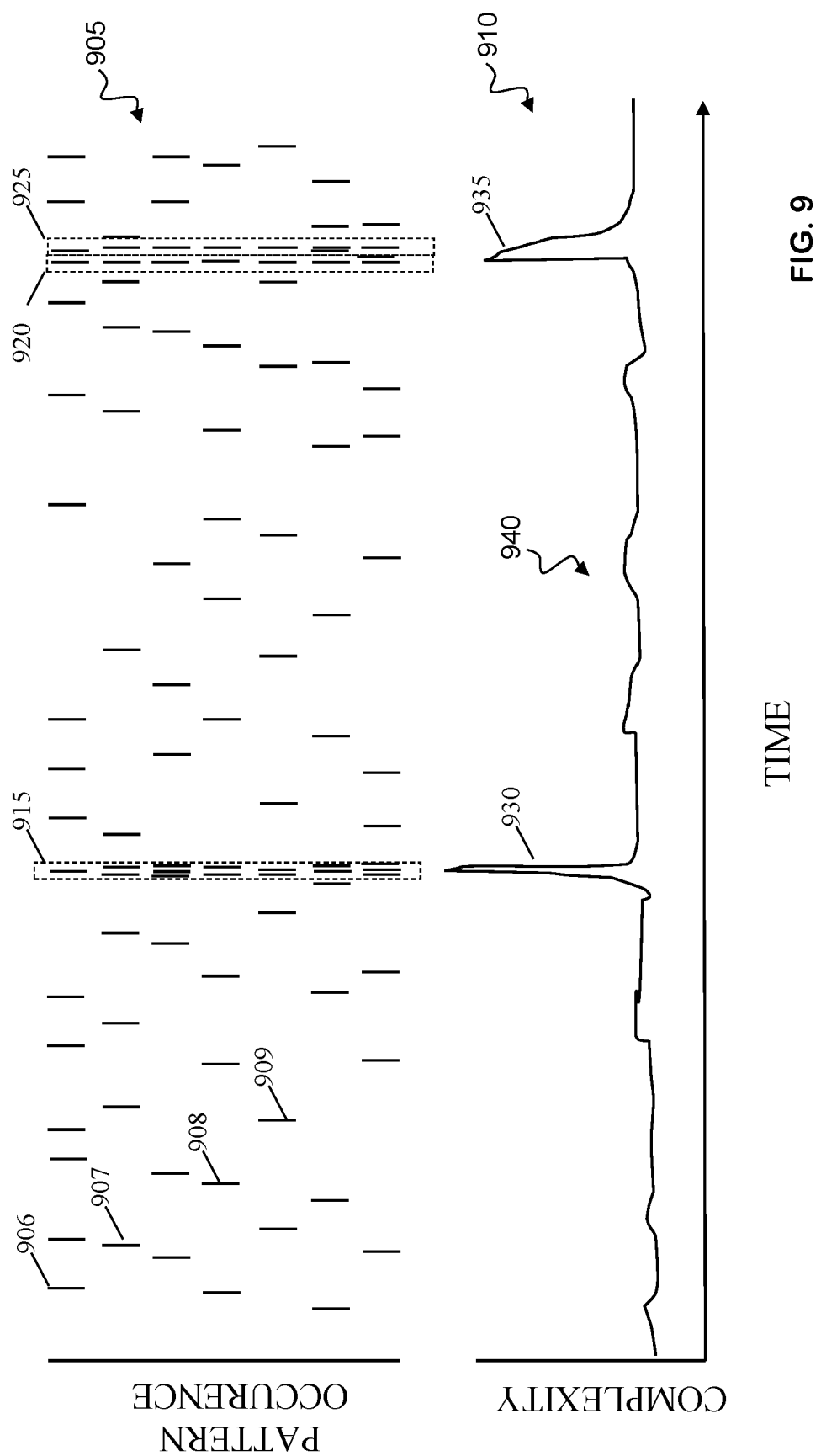
FIG. 9 is a schematic illustration of a determination of the timing of activity patterns that have a distinguishable complexity.

FIG. 9 is a schematic illustration of a determination of the timing of activity patterns that have a distinguishable complexity. The determination illustrated in FIG. 9 can be performed in isolation or in conjunction with other activities. For example, the determination can be performed at 425 in process 400 (FIG. 4).

FIG. 9 includes a graph 905 and a graph 910. Graph 905 illustrates occurrences of patterns as a function of time along the x-axis. In particular, individual occurrences are illustrated schematically as vertical lines 906, 907, 908, 909. Each row of occurrences can be instances where activity matches a respective pattern or class of pattern. For example, the top row of occurrences can be instances where activity matches pattern 505 (FIG. 5), the second row of occurrences can be instances where activity matches pattern 510 (FIG. 5), the third row of occurrences can be instances where activity matches pattern 515 (FIG. 5), and so on.

Graph 905 also includes dashed rectangles 915, 920, 925 that schematically delineate different windows of time when the activity patterns have a distinguishable complexity. As shown, the likelihood that activity in the recurrent artificial neural network matches a pattern indicative of complexity is higher during the windows delineated by dashed rectangles 915, 920, 925 than outside those windows.

Graph 910 illustrates the complexity associated with these occurrences as a function of time along the x-axis. Graph 910 includes a first peak 930 in complexity that coincides with the window delineated by dashed rectangle 915 and a second peak 935 in complexity that coincides with the window delineated by dashed rectangles 920, 925. As shown, the complexity illustrated by peaks 930, 925 is distinguishable from what can be considered to be a baseline level 940 of complexity.

In some implementations, the times at which the output of a recurrent artificial neural network is to be read coincide with the occurrences of activity patterns that have a distinguishable complexity. For example, in the illustrative context of FIG. 9, the output of a recurrent artificial neural network can be read at peaks 930, 925, i.e., during the windows delineated by dashed rectangles 915, 920, 925.

The identification of distinguishable levels of complexity in a recurrent artificial neural network is particularly beneficial when the input is a stream of data. Examples of data streams include, e.g., video or audio data. Although data streams have a beginning, it is generally desirable to process information in the data stream that does not have a predefined relationship with the beginning of the data stream. By way of example, a neural network could perform object recognition such as, e.g., recognizing bicyclists in the vicinity of an automobile. Such a neural networks should be able to recognizing bicyclists regardless of when those bicyclists appear in the video stream, i.e., without regard to time since the beginning of the video. Continuing with this example, when a data stream is input into an object recognition neural network, any patterns of activity in the neural network will generally display a low or quiescent level of complexity. These low or quiescent level of complexity are displayed regardless of the continuous (or nearly continuous) input of streaming data into the neural network device. However, when an object of interest appears in the video stream, the complexity of the activity will become distinguishable and indicate the time at which an object is recognized in the video stream. Thus, the timing of a distinguishable level of complexity of the activity can also act as a yes/no output as to whether the data in the data stream satisfies certain criteria.

In some implementations, not only the timing but also the content of the output of the recurrent artificial neural network is given by the activity patterns that have a distinguishable complexity. In particular, the identity and activity of the nodes that participate in activity that comports with the activity patterns can be considered the output of the recurrent artificial neural network. The identified activity patterns can thus illustrate the result of processing by the neural network, as well as the timing when this decision is to be read.

The content of the decision can be expressed in a variety of different forms. For example, in some implementations and as discussed in further detail below, the content of the decision can be expressed as a binary vector or matrix of ones and zeros. Each digit can indicate whether or not a pattern of activity is present or not, e.g., for a pre-defined group of nodes and/or a predefined duration. In such implementations, the content of the decision is expressed in binary and can be compatible with traditional digital data processing infrastructure.

Figure 10:
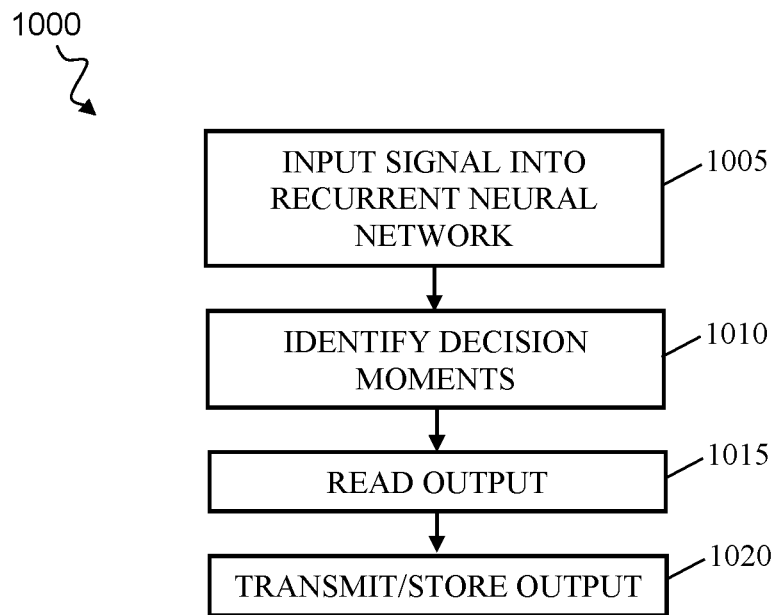
FIG. 10 is a flowchart of a process for encoding signals using a recurrent artificial neural network based on characterization of the activity in the network.

FIG. 10 is a flowchart of a process 1000 for encoding signals using a recurrent artificial neural network based on characterization of the activity in the network. Signals can be encoded in a variety of different contexts such as, e.g., transmission, encryption, and data storage. Process 1000 can be performed by a system of one or more data processing apparatus that perform operations in accordance with the logic of one or more sets of machine-readable instructions. For example, process 1000 can be performed by that same system of one or more computers that executes software for implementing the recurrent artificial neural network used in process 1000. In some instances, process 1000 can be performed by the same data processing apparatus that performs process 400. In some instances, process 1000 can be performed by an encoder that includes a computer system, e.g., the encoder in a signal transmission system or the encoder of a data storage system. In some examples the encoder is a video encoder.

The system performing process 1000 inputs a signal into a recurrent artificial neural network at 1005. In some cases, the input of the signal is a discrete injection event. In others, the input signal is streamed into the recurrent artificial neural network.

The system performing process 1000 identifies one or more decision moments in the recurrent artificial neural network at 1010. For example, the system can identify one or more decision moments by performing process 400 (FIG. 4).

The system performing process 1000 reads the output of the recurrent artificial neural network at 1015. As discussed above, in some implementations, the content of the output of the recurrent artificial neural network is the activity in the neural network that matches the patterns used to identify the decision point(s).

In some implementations, individual "reader nodes" can be added to a neural network to identify occurrences of a particular pattern of activity at a particular collection of nodes and hence to read the output of the recurrent artificial neural network at 1015. The reader nodes can fire if and only if the activity at a particular collection of nodes satisfies timing (and possibly magnitude, as well) criteria. For example, in order to read an occurrence of pattern 505 (FIG. 5) at nodes 104, 105, 106 (FIGS. 2, 3), a reader node could be connected to nodes 104, 105, 106 (or the links 110 between them). The reader node would itself only become active if a pattern of activity involving nodes 104, 105, 106 (or their links) occurred.

The use of such reader nodes would eliminate the need to define windows of time for the recurrent artificial neural network as a whole. In particular, individual reader nodes can be connected to different nodes and/or numbers of nodes (or the links between them). The individual reader nodes can be set to have tailored responses (e.g., different decay times in an integrate-and-fire model) to identify different activity patterns. The system performing process 1000 transmits or stores the output of the recurrent artificial neural network at 1020. The particular action performed at 1020 can reflect the context in which process 1000 is being used. For example, in contexts where secure or compressed communications are desired, the system performing process 1000 can transmit the output of the recurrent neural network to a receiver that has access to the same or to a similar recurrent neural network. As another example, in contexts where secure or compressed data storage is desired, the system performing process 1000 can record the output of the recurrent neural network in one or more machine-readable data storage devices for later access.

In some implementations, the complete output of the recurrent neural network is not transmitted or stored. For example, in implementations where the content of the output of the recurrent neural network is the activity in the neural network that matches the patterns indicative of complexity in the activity, only activity that matches relatively more complex or higher dimensional activity may be transmitted or stored. By way of example, in reference to patterns 500 (FIG. 5), in some implementations only activity that matches patterns 515, 520, 525, and 530 is transmitted or stored whereas activity that matches patterns 505, 510 is ignored or discarded. In this way, a lossy process allows the volume of data that is transmitted or stored to be reduced at the cost of the completeness of the information being encoded.

Figure 11:
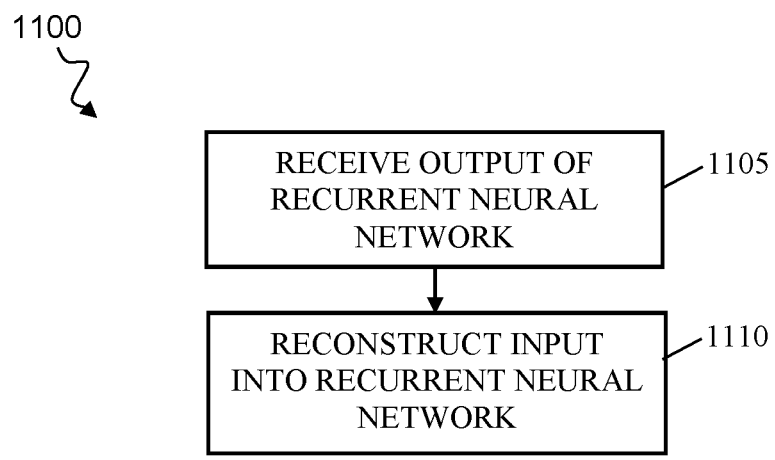
FIG. 11 is a flowchart of a process for decoding signals using a recurrent artificial neural network based on characterization of the activity in the network.

FIG. 11 is a flowchart of a process 1100 for decoding signals using a recurrent artificial neural network based on characterization of the activity in the network. Signals can be decoded in a variety of different contexts such as, e.g., signal reception, decryption, and reading data from storage. Process 1100 can be performed by a system of one or more data processing apparatus that perform operations in accordance with the logic of one or more sets of machine-readable instructions. For example, process 1100 can be performed by that same system of one or more computers that executes software for implementing the recurrent artificial neural network used in process 1100. In some instances, process 1100 can be performed by the same data processing apparatus that performs process 400 and/or process 1000. In some instances, process 1100 can be performed by, e.g., the decoder in a signal reception system or the decoder of a data storage system.

The system performing process 1100 receives at least a portion of the output of a recurrent artificial neural network at 1105. The particular action performed at 1105 can reflect the context in which process 1100 is being used. For example, the system performing process 1000 can receive a transmitted signal that includes the output of the recurrent artificial neural network or read a machine-readable data storage device that stores the output of the recurrent artificial neural network.

The system performing process 1100 reconstructs the input of the recurrent artificial neural network from the received output at 1110. Reconstruction can proceed in a variety of different ways. For example, in some implementations, a second artificial neural network (recurrent or not) can be trained to reconstruct the input into the recurrent neural network from the output received at 1105.

As another example, in some implementations, a decoder that has been trained using machine learning (including but not limited to deep learning) can be trained to reconstruct the input into the recurrent neural network from the output received at 1105.

As yet another example, in some implementations, input into the same recurrent artificial neural network or into a similar recurrent artificial neural network can be iteratively permuted until the output of that recurrent artificial neural network matches, to some degree, the output received at 1105.

In some implementations, process 1100 can include receiving user input specifying an extent to which the input is to be reconstructed and, in response, adjust the reconstruction at 1110 accordingly. For example, the user input could specify that a complete reconstruction is not needed. In response, the system performing process 1100 adjusts the reconstruction. For example, in implementations where the content of the output of the recurrent neural network is the activity in the neural network that matches the patterns indicative of complexity in the activity, only the output that characterizes activity that matches relatively more complex or higher dimensional activity would be used to reconstruct the input. By way of example, in reference to patterns 500 (FIG. 5), in some implementations only activity that matches patterns 515, 520, 525, and 530 could be used to reconstruct the input, whereas activity that matches patterns 505, 510 could be ignored or discarded. In this way, a lossy reconstruction can proceed in selected circumstances.

In some implementations, processes 1000, 1100 can be used for peer-to-peer encrypted communications. In particular, both the sender (i.e., the encoder) and the receiver (i.e., the decoder) can be provided with the same recurrent artificial neural network. There are several ways in which the shared recurrent artificial neural network can be tailored to ensure that a third party cannot reverse-engineer it and decrypt the signal, including:

the structure of the recurrent artificial neural network
the functional settings of the recurrent artificial neural network, including node states and edge weights,
the size (or dimension) of the patterns, and
the fraction of patterns in each dimension.

These parameters can be thought of multiple layers that together ensure transmission security. Further, in some implementations, the decision moment time points can be used as keys to decrypt the signal.

Although processes 1000, 1100 are presented in terms of encoding and decoding a single recurrent artificial neural network, processes 1000, 1100 can also be applied in systems and processes that rely upon multiple recurrent artificial neural networks. These recurrent artificial neural networks can operate either in parallel or in series.

As an example of series operation, the output of a first recurrent artificial neural network can serve as the input of a second recurrent artificial neural network. The resultant output of the second recurrent artificial neural network is a twice encoded (or twice encrypted) version of the input into the first recurrent artificial neural network. Such a series arrangement of recurrent artificial neural networks can be useful in circumstances where different parties have different levels of access to information, e.g., in medical record systems where patient identity information may not be accessible to a party that will be using and have access to the remainder of the medical record.

As an example of parallel operation, the same information can be input into multiple, different recurrent artificial neural networks. The different outputs of those neural networks can be used, e.g., to ensure that the input can be reconstructed with high fidelity.

Although many implementations have been described, various modifications may be made. For example, although the application implies generally that activity within a recurrent artificial neural network should match a pattern indicative of ordering, this is not necessarily the case. Rather, in some implementations, activity within a recurrent artificial neural network can comport with a pattern without necessarily displaying activity that matches the pattern. For example, an increase in the likelihood that a recurrent neural network is to display activity that would match a pattern can be treated as non-random ordering of the activity.

As yet another example, in some implementations, different groups of patterns can be tailored for use in characterizing the activity in different recurrent artificial neural networks. The patterns can be tailored, e.g., according to the effectiveness of the patterns in characterizing the activity of the different recurrent artificial neural networks. Effectiveness can be quantified, e.g., based on the size of a table or vector that represents the occurrence counts of different patterns.

As yet another example, in some implementations, the patterns used to characterize the activity in a recurrent artificial neural networks can consider the strength of a connection between nodes. In other words, the patterns described previously herein treat all signal transmission activity between two nodes in a binary manner, i.e., either the activity exists or it doesn't. This is not necessarily the case. Rather, in some implementations, comporting with a pattern can require activity of a certain level or strength of connection to be taken as indicative of ordered complexity in the activity of a recurrent artificial neural network.

As yet another example, the content of the output of the recurrent artificial neural network can include activity patterns that occur outside windows of time in which the activity in a neural network has a distinguishable level of complexity. For example, the output of the recurrent artificial neural network that is read at 1015 and transmitted or stored at 1020 (FIG. 10) can include information encoding activity patterns that occur, e.g., outside dashed rectangles 915, 920, 925 in graph 905 (FIG. 9). By way of example, the output of the recurrent artificial neural network could characterize only the highest dimensional patterns of activity, regardless of when those patterns of activity occur. As another example, the output of the recurrent artificial neural network could characterize only patterns of activity that enclose cavities, regardless of when those patterns of activity occur.

Figure 12:
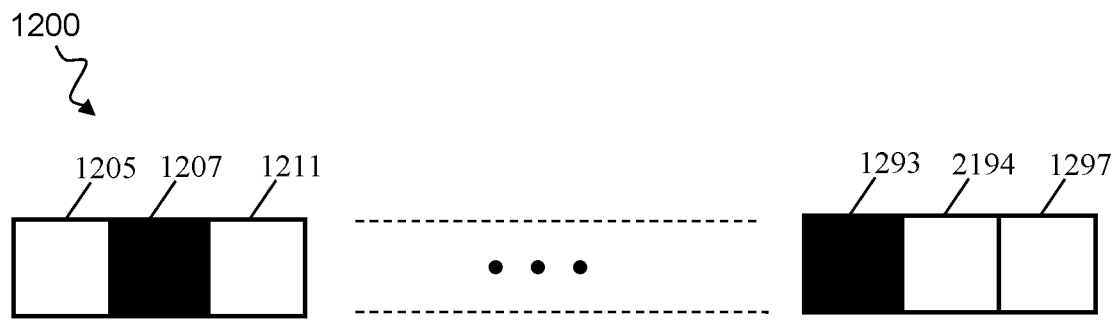
FIGS. 12, 13, and 14 are schematic illustrations of an identical binary form or representation of topological structures.
Figure 13:
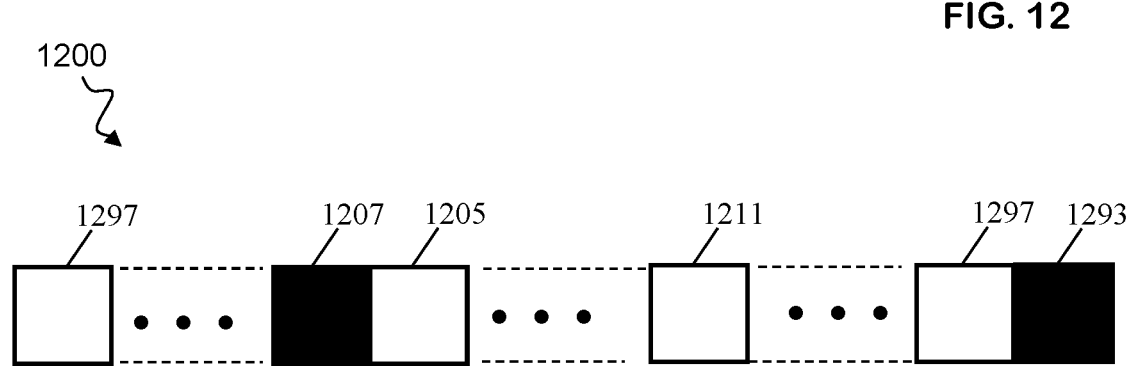
Figure 14:
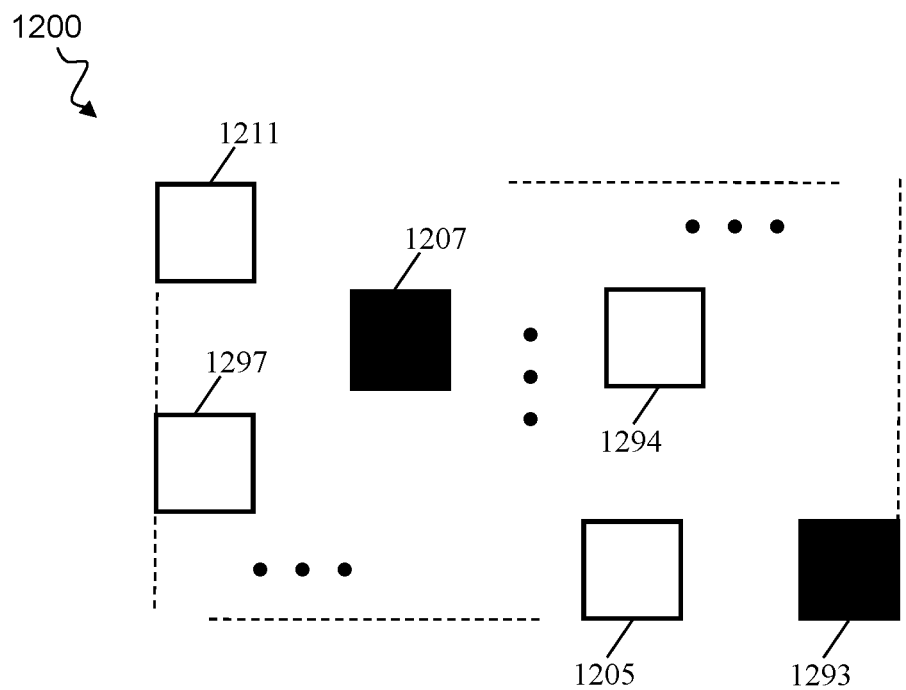

FIGS. 12, 13, and 14 are schematic illustrations of an identical binary form or representation 1200 of topological structures such as, e.g., patterns of activity in a neural network. The topological structures illustrated in FIGS. 12, 13, and 14 all include the same information, namely, an indication the presence or absence of features in a graph. The features can be, e.g., activity in a neural network device. In some implementations, the activity is identified based on or during periods of time in which the activity in the neural network has a complexity that is distinguishable from other activity that is responsive to an input.

As shown, binary representation 1200 includes bits 1205, 1207, 1211, 1293, 1294, 1297 and an additional, arbitrary number of bits (represented by the ellipses " . . . "). For didactic purposes, bits 1205, 1207, 1211, 1293, 1294, 1297 . . . are illustrated as discrete rectangular shapes that are either filled or unfilled to indicate the binary value of the bit. In the schematic illustrations, representation 1200 superficially appears to be either a one-dimensional vector of bits (FIGS. 12, 13) or a two-dimensional matrix of bits (FIG. 14). However, representation 1200 differs from a vector, from a matrix, or from other ordered collection of bits in that the same information can be encoded regardless of the order of the bits—i.e., regardless of the location of individual bits within the collection.

For example, in some implementations, each individual bit 1205, 1207, 1211, 1293, 1294, 1297 . . . can represent the presence or absence of a topological feature-regardless of the location of that feature in the graph. By way of example, referring to FIG. 12, a bit such as bit 1207 can indicate the presence of a topological feature that comports with pattern 505 (FIG. 5), regardless of whether that activity occurs between nodes 104, 105, 101 or between nodes 105, 101, 102. Thus, although each individual bit 1205, 1207, 1211, 1293, 1294, 1297, . . . can be associated with a particular feature, the location of that feature in the graph need not be encoded, e.g., by a corresponding location of the bit in representation 1200. In other words, in some implementations, representation 1200 may only provide an isomorphic topological reconstruction of the graph.

As an aside, in other implementations, it is possible that the location of individual bits 1205, 1207, 1211, 1293, 1294, 1297, . . . does indeed encode information such as, e.g., the location of a feature in the graph. In these implementations, the source graph can be reconstructed using representation 1200. However, such an encoding is not necessarily present.

In view of the ability of a bit to represent the presence or absence of a topological feature regardless of the location of that feature in the graph, in FIG. 12, bit 1205 appears before bit 1207, which appears before bit 1211 at the start of representation 1200. In contrast, in FIGS. 13 and 14, the order of bits 1205, 1207, and 1211 within representation 1200—and the position of bits 1205, 1207, and 1211 relative to other bits within representation 1200—has changed. Nevertheless, binary representation 1200 remains the same—as does the set of rules or algorithm that defines the process for encoding information in binary representation 1200. So long as the correspondence between the bit and the feature is known, the location of the bits in the representation 1200 is irrelevant.

In further detail, each bit 1205, 1207, 1211, 1293, 1294, 1297 . . . individually represents the presence or absence of a feature in a graph. A graph is a set of nodes and a set of edges between those nodes. The nodes can correspond to objects. Examples of objects can include, e.g., artificial neurons in a neural network, individuals in a social network, or the like. Edges can correspond to some relation between the objects. Examples of relations include, e.g., a structural connection or activity along the connection. In the context of a neural network, artificial neurons can be related by a structural connection between neurons or by transmission of information along a structural connection. In the context of a social network, individuals can be related by a "friend" or other relational connection or by transmission of information (e.g., a posting) along such a connection. Edges can thus characterize relatively long-lived structural characteristics of the set of nodes or relatively transient activity characteristics that occur within a defined time frame. Further, edges can either be directed or bidirectional. Directed edges indicate directionality of the relation between the objects. For example, the transmission of information from a first neuron to a second neuron can be represented by a directed edge that denotes the direction of transmission. As another example, in a social network, a relational connection may indicate that second user is to receive information from the first but not that the first is to receive information from the second. In topological terms, a graph can be expressed as a set of unit intervals [0, 1] where 0 and 1 are identified with respective nodes that are connected by an edge.

The features whose presence or absence is indicated by bits 1205, 1207, 1211, 1293, 1294, 1297 can be, e.g., a node, a set of nodes, a set of sets of nodes, a set of edges, a set of sets of edges, and/or additional hierarchically-more-complex features (e.g., a set of sets of sets of nodes). Bits 1205, 1207, 1211, 1293, 1294, 1297 generally represent the presence or absence of features that are at different hierarchical levels. For example, bit 1205 may represent the presence or absence of a node, whereas bit 1207 may represent the presence or absence of a set of nodes.

In some implementations, bits 1205, 1207, 1211, 1293, 1294, 1297 may represent features in a graph that have a threshold level of some characteristic. For example, bits 1205, 1207, 1211, 1293, 1294, 1297 can represent not only that there is activity in a set of edges, but also that this activity is weighted either above or below a threshold level. The weights can, e.g., embody the training of a neural network device to a particular purpose or can be an innate characteristic of the edges.

FIGS. 5, 6, and 8 above illustrate features whose presence or absence can be represented by bits 1205, 1207, 1211, 1293, 1294, 1297 . . . .

The directed simplices in collections 500, 600, 700 treat functional or structural graphs as a topological space with nodes as points. Structure or activity involving one or more nodes and links that comports with simplices in collection 500, 600, 700 can be represented in a bit regardless of the identity of the particular nodes and/or links that participate in the activity.

In some implementations, only some patterns of structure or activity are identified and/or some portion of the patterns of structure or activity that are identified are discarded or otherwise ignored. For example, with reference to FIG. 5, structure or activity that comports with the five point, 4-dimensional simplex pattern 515 inherently includes structure or activity that comports with the four point, 3-dimensional and three point, 2-dimension simplex patterns 510, 505. For example, points 0, 2, 3, 4 and points 1, 2, 3, 4 in 4-dimensional simplex pattern 515 of FIG. 5 both comport with 3-dimensional simplex pattern 510. In some implementations, simplex patterns that include fewer points—and hence are of a lower dimension—can be discarded or otherwise ignored.

As another example, only some patterns of structure or activity need be identified. For example, in some implementations only patterns with odd number of points (3, 5, 7, . . . ) or even numbers of dimensions (2, 4, 6, . . . ) are used.

Returning to FIGS. 12, 13, 14, the features whose presence or absence is represented by bits 1205, 1207, 1211, 1293, 1294, 1297 . . . may not be independent of one another. By way of explanation, if bits 1205, 1207, 1211, 1293, 1294, 1297 represent the presence or absence of 0D-simplices that each reflect the existence or activity of a single node, then bits 1205, 1207, 1211, 1293, 1294, 1297 are independent of one another. However, if bits 1205, 1207, 1211, 1293, 1294, 1297 represent the presence or absence of higher-dimensional simplices that each reflect the existence or activity of multiple nodes, then the information encoded by the presence or absence of each individual feature may not be independent of the presence or absence of the other features.

Figure 15:
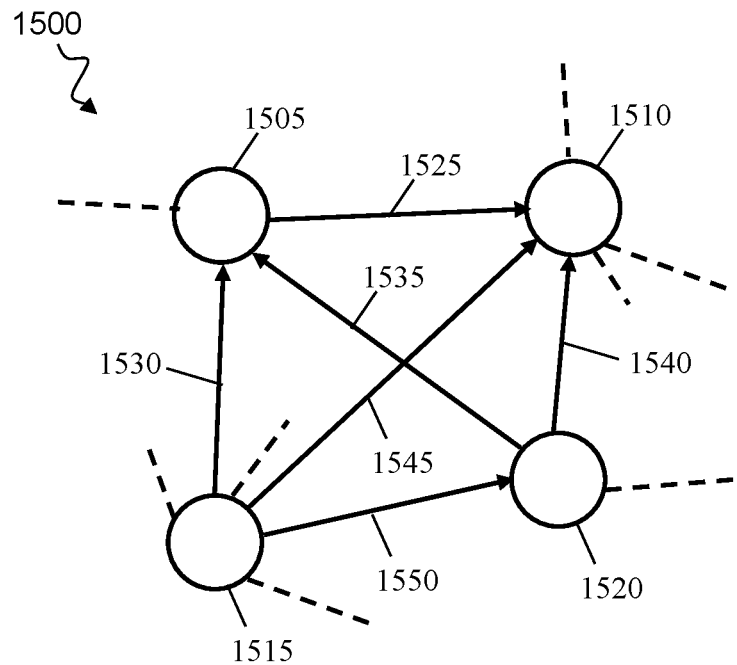
FIGS. 15 and 16 schematically illustrate an example of how the presence or absence of features that correspond to different bits are not independent of one another.

FIG. 15 schematically illustrates an example of how the presence or absence of features that correspond to different bits are not independent of one another. In particular, a subgraph 1500 that includes four nodes 1505, 1510, 1515, 1520 and six directed edges 1525, 1530, 1535, 1540, 1545, 1550 is illustrated. In particular, edge 1525 is directed from node 1525 to node 1510, edge 1530 is directed from node 1515 to node 1505, edge 1535 is directed from node 1520 to node 1505, edge 1540 is directed from node 1520 to node 1510, edge 1545 is directed from node 1515 to node 1510, edge 1550 is directed from node 1515 to node 1520.

A single bit in representation 1200 (e.g., filled bit 1207 in FIGS. 12, 13, 14) may indicate the presence of a directed 3D-simplex. For example, such a bit could indicate the presence of the 3D-simplex formed by nodes 1505, 1510, 1515, 1520 and edges 1525, 1530, 1535, 1540, 1545, 1550. A second bit in representation 1200 (e.g., filled bit 1293 in FIGS. 12, 13, 14) may indicate the presence of a directed 2D-simplex. For example, such a bit could indicate the presence of the 2D-simplex formed by nodes 1515, 1505, 1510 and edges 1525, 1530, 1545. In this simple example, the information encoded by bit 1293 is completely redundant with the information encoded by bit 1207.

Please note that the information encoded by bit 1293 may also be redundant with the information encoded by still further bit. For example, the information encoded by bit 1293 would be redundant with both a third bit and a fourth bit that indicates the presence of additional directed 2D-simplices. Examples of those simplices are formed by nodes 1515, 1520, 1510 and edges 1540, 1545, 1550 and nodes 1520, 1505, 1510 and edges 1525, 1535, 1540.

Figure 16:
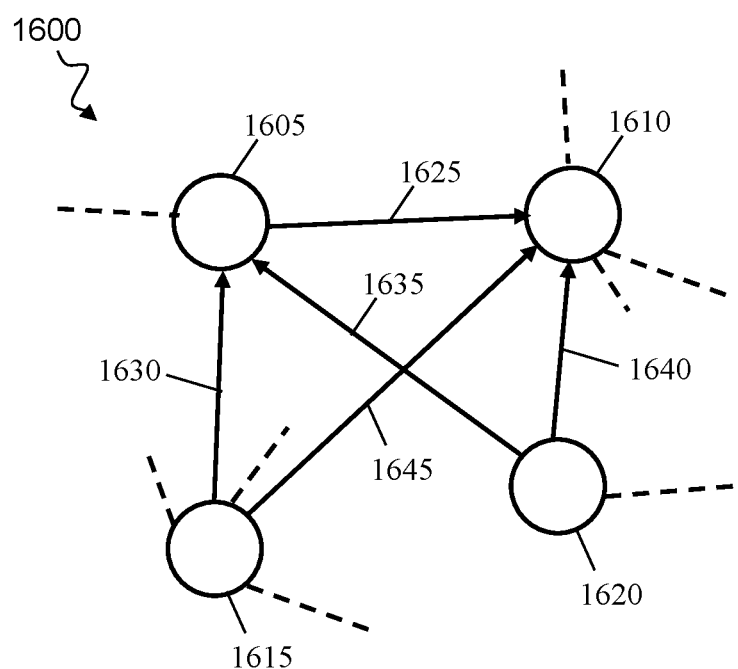

FIG. 16 schematically illustrates another example of how the presence or absence of features that correspond to different bits are not independent of one another. In particular, a subgraph 1600 that includes four nodes 1505, 1510, 1515, 1520 and five directed edges 1625, 1630, 1635, 1640, 1645 is illustrated. Nodes 1505, 1510, 1515, 1520 and edges 1625, 1630, 1635, 1640, 1645 generally correspond to nodes 1505, 1510, 1515, 1520 and edges 1525, 1530, 1535, 1540, 1545 in subgraph 1500 (FIG. 15). However, in contrast with subgraph 1500 in which nodes 1515, 1520 are connected by edge 1550, nodes 1615, 1620 are not connected by an edge.

A single bit in representation 1200 (e.g., unfilled bit 1205 in FIGS. 12, 13, 14) may indicate the absence of a directed 3D-simplex, such as, e.g., the directed 3D-simplex that encompasses nodes 1605, 1610, 1615, 1620. A second bit in representation 1200 (e.g., filled bit 1293 in FIGS. 12, 13, 14) may indicate the presence of a 2D-simplex. An example directed 2D-simplex is formed by nodes 1615, 1605, 1610 and edges 1625, 1630, 1645. This combination of a filled bit 1293 and an unfilled bit 1205 provides information indicative of presence or absence of other features (and the state of other bits) that may or may not be present in representation 1200. In particular, the combination of the absence of a directed 3D-simplex and the presence of a directed 2D-simplex indicates that at least one edge is absent from either:

a) the possible directed 2D-simplex formed by nodes 1615, 1620, 1610 or
b) the possible directed 2D-simplex formed by nodes 1620, 1605, 1610.

Thus, the state of a bit that represents the presence or absence of either of these possible simplices is not independent of the state of bits 1205, 1293.

Although these examples have been discussed in terms of a features with different numbers of nodes and a hierarchical relationship, this is not necessarily the case. For example, a representation 1200 that includes a collection of bits that corresponds only to, e.g., the presence or absence of 3D-simplices is possible.

Using individual bits to represent the presence or absence of features in a graph yields certain properties. For example, the encoding of information is fault tolerant and provides "graceful degradation" of the encoded information. In particular, the loss of a particular bit (or group of bits) may increase the uncertainty as to the presence or absence of a feature. However, estimates of the likelihood that a feature is present or absent will still be possible from the other bits that indicate the presence or absence of adjacent features.

Likewise, as the number of bits increases, certainty as to the presence or absence of a feature increases.

As another example, as discussed above, the ordering or arrangement of bits is irrelevant to isomorphic reconstruction of the graph that is represented by the bit. All that is required is a known correspondence between the bits and particular nodes/structures in the graph.

In some implementations, the patterns of activity in a neural network can be encoded in a representation 1200 (FIGS. 12, 13, and 14). In general, the patterns of activity in a neural network are a result of a number of characteristics of the neural network such as, e.g., the structural connections between nodes of the neural network, the weights between nodes, as well as a whole host of possible other parameters. For example, in some implementations, the neural network could have been trained prior to the encoding of the patterns of activity in representation 1200.

However, regardless of whether the neural network untrained or trained, for a given input, the responsive pattern of activity can be thought of a "representation" or an "abstraction" of that input within the neural network. Thus, although representation 1200 can appear to be a straightforward-appearing collection of (in some cases, binary) digits, each of the digits can encode the relationship or correspondence between a particular input and relevant activity in the neural network.

FIGS. 17, 18, 19, 20 are schematic illustrations of the use of representations of the occurrence of topological structures in the activity in a neural network in four different classification systems 1700, 1800, 1900, 2000. Classification systems 1700, 1800 each classify representations of the patterns of activity in a neural network as part of the classification of input. Classification systems 1900, 2000 each classify approximations of representations of the patterns of activity in a neural network as part of the classification of input. In classification systems 1700, 1800, the patterns of activity that are represented occur in and are read from a source neural network device 1705 that is part of the classification system 1700, 1800. In contrast, in classification systems 1900, 2000, the patterns of activity that are approximately represented occur in a source neural network device that is not part of the classification system 1700, 1800. Nevertheless, the approximation of the representation of those patterns of activity are read from an approximator 1905 that is part of classification systems 1900, 2000.

Figure 17:
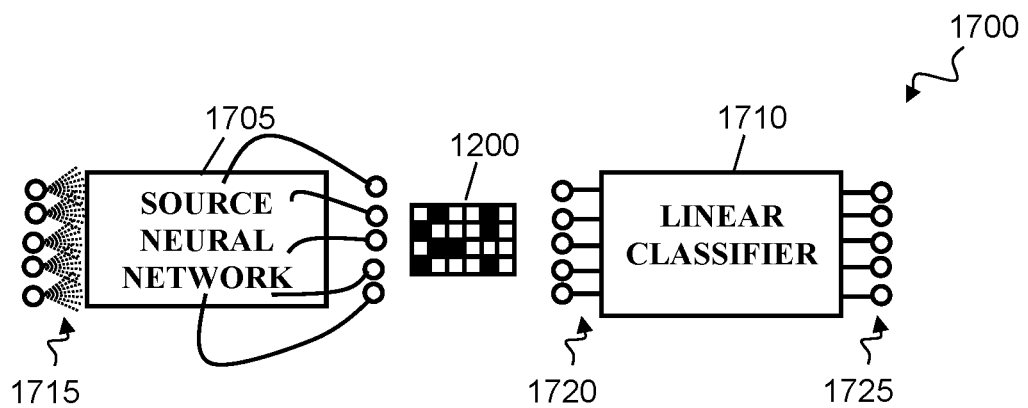
FIGS. 17, 18, 19, 20 are schematic illustrations of the use of representations of the occurrence of topological structures in the activity in a neural network in four different classification systems.

In additional detail, turning to FIG. 17, classification system 1700 includes a source neural network 1705 and a linear classifier 1710. Source neural network 1705 is a neural network device that is configured to receive an input and present representations of the occurrence of topological structures in the activity within source neural network 1705. In the illustrated implementation, source neural network 1705 includes an input layer 1715 that receives the input. However, this is not necessarily the case. For example, in some implementation, some or all of the input can be injected into different layers and/or edges or nodes throughout source neural network 1705.

Source neural network 1705 can be any of variety of different types of neural network. In general, source neural network 1705 is a recurrent neural network such as, e.g., a recurrent neural network that is modelled on a biological system. In some cases, source neural network 1705 can model a degree of the morphological, chemical, and other characteristics of a biological system. In general, source neural network 1705 is implemented on one or more computing devices with a relatively high level of computational performance, e.g., a supercomputer. In such cases, classification system 1700 will generally be a dispersed system in which a remote classifier 1710 communicates with source neural network 1705, e.g., via a data communications network.

In some implementations, source neural network 1705 can be untrained and the activity that is represented can be the innate activity of source neural network 1705. In other implementations, source neural network 1705 can be trained and the activity that is represented can embody this training.

The representations read from source neural network 1705 can be representations such as representation 1200 (FIGS. 12, 13, 14). The representations can be read from source neural network 1705 in a number of ways. For example, in the illustrated example, source neural network 1705 includes "reader nodes" that read patterns of activity between other nodes within source neural network 1705. In other implementations, the activity within source neural network 1705 are read by a data processing component of that is programmed to monitor source neural network 1705 for relatively highly-ordered patterns of activity. In still other implementations, source neural network 1705 can include an output layer from which representation 1200 can be read, e.g., when source neural network 1705 is implemented as a feed-forward neural network.

Linear classifier 1710 is a device that classifies an object—namely, representations of the patterns of activity in source neural network 1705—based on a linear combination of the object's characteristics. Linear classifier 1710 includes an input 1720 and an output 1725. Input 1720 is coupled to receive representations of the patterns of activity in source neural network 1705. In other words, the representations of the patterns of activity in source neural network 1705 is a feature vector that represents the characteristics of the input into source neural network 1705 that are used by linear classifier 1710 to classify that input. Linear classifier 1710 can receive the representations of the patterns of activity in source neural network 1705 in a variety of ways. For example, the representations of the patterns of activity can be received as discrete events or as a continuous stream over a real time or non-real time communication channel.

Output 1725 is coupled to output the classification result from linear classifier 1710. In the illustrated implementation, output 1725 is schematically illustrated as a parallel port with multiple channels. This is not necessarily the case. For example, output 1725 can output classification result over a serial port or a port with combined parallel and serial capabilities.

In some implementations, linear classifier 1710 can be implemented on one or more computing devices with relatively limited computational performance. For example, linear classifier 1710 can be implemented on a personal computer or a mobile computing device such as a smart phone or tablet.

Figure 18:
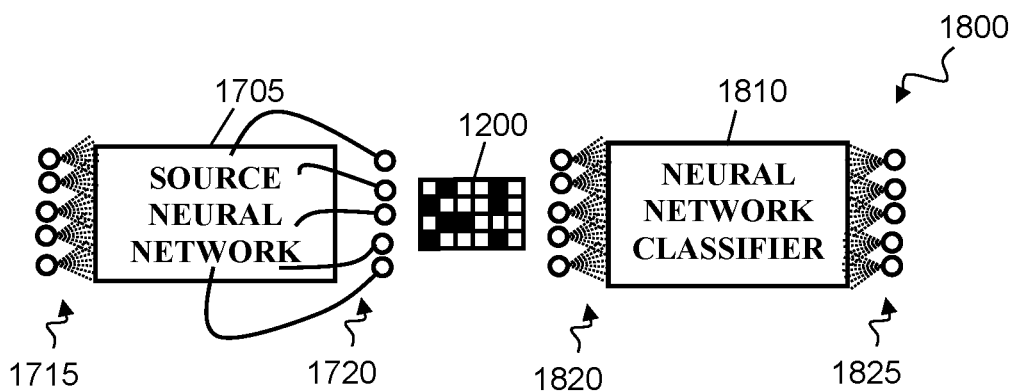

In FIG. 18, classification system 1800 includes source neural network 1705 and a neural network classifier 1810. Neural network classifier 1810 is a neural network device classifies an object—namely, representations of the patterns of activity in source neural network 1705—based on a non-linear combination of the object's characteristics. In the illustrated implementation, neural network classifier 1810 is a feedforward network that includes an input layer 1820 and an output layer 1825. As with linear classifier 1710, neural network classifier 1810 can receive the representations of the patterns of activity in source neural network 1705 in a variety of ways. For example, the representations of the patterns of activity can be received as discrete events or as a continuous stream over a real time or non-real time communication channel.

In some implementations, neural network classifier 1810 can perform inferences on one or more computing devices with relatively limited computational performance. For example, neural network classifier 1810 can be implemented on a personal computer or a mobile computing device such as a smart phone or tablet, e.g., in a Neural Processing Unit of such a device. Like classification system 1700, classification system 1800 will generally be a dispersed system in which a remote neural network classifier 1810 communicates with source neural network 1705, e.g., via a data communications network.

In some implementations, neural network classifier 1810 can be, e.g., a deep neural network such as a convolutional neural network that includes convolutional layers, pooling layers, and fully-connected layers. Convolutional layers can generate feature maps, e.g., using linear convolutional filters and/or nonlinear activation functions. Pooling layers reduce the number of parameters and control overfitting. The computations performed by the different layers in image classifier 1820 can be defined in different ways in different implementations of image classifier 1820.

Figure 19:
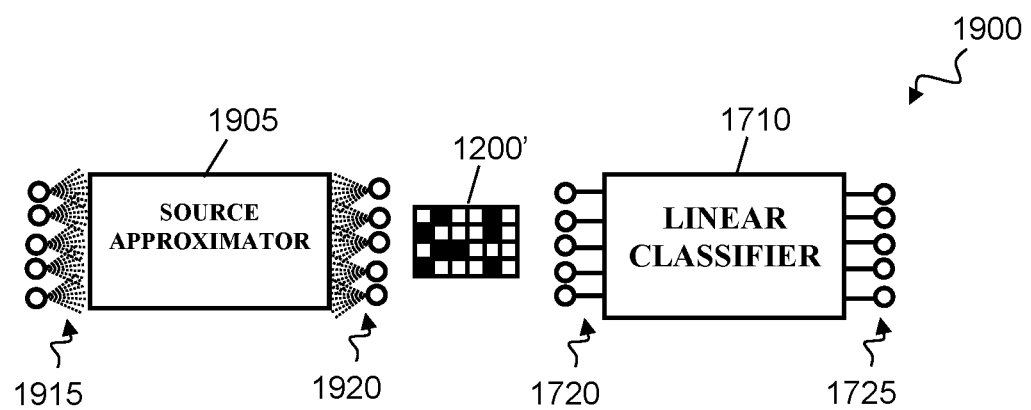
Figure 20:
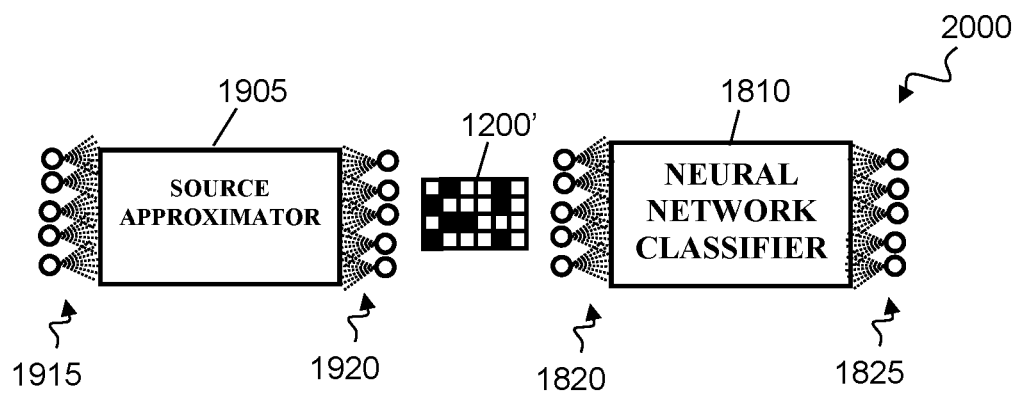

In FIG. 19, classification system 1900 includes source approximator 1905 and a linear classifier 1710. As discussed further below, source approximator 1905 is a relatively simple neural network that is trained to receive input—either at an input layer 1915 or elsewhere—and output a vector that approximates a representation of topological structures that arise in the patterns of activity in a relatively more complex neural network. For example, source approximator 1905 can be trained to approximate a recurrent source neural network such as, e.g., a recurrent neural network that is modelled on a biological system and includes a degree of the morphological, chemical, and other characteristics of a biological system. In the illustrated implementation, source approximator 1905 includes an input layer 1915 and an output layer 1920. Input layer 1915 is couplable to receive the input data. Output layer 1920 is coupled to output an approximation of a representation of the activity within a neural network device for receipt by input 1720 of linear classifier. For example, output layer 1920 can output an approximation 1200' of representation 1200 (FIGS. 12, 13, 14). As an aside, the representation 1200 schematically illustrated in FIGS. 17, 18 and the approximation 1200' of representation 1200 schematically illustrated in FIGS. 19, 20 are identical. This is for the sake of convenience only. In general, approximation 1200' will differ from representation 1200 in at least some ways. Despite those differences, linear classifier 1710 can classify approximation 1200'.

In general, source approximator 1905 can perform inferences on one or more computing devices with relatively limited computational performance. For example, source approximator 1905 can be implemented on a personal computer or a mobile computing device such as a smart phone or tablet, e.g., in a Neural Processing Unit of such a device. In general and in contrast with classification systems 1700, 1800, classification system 1900 will generally be housed in a single housing, e.g., with source approximator 1905 and linear classifier 1710 implemented on either the same data processing devices or on data processing devices coupled by a hardwired connection.

In FIG. 20, classification system 2000 includes source approximator 1905 and a neural network classifier 1810.

Output layer 1920 of source approximator 1905 is coupled to output an approximation 1200' of a representation of the activity within a neural network device for receipt by input 1820 of neural network classifier 1810. Despite any differences between approximation 1200' and representation 1200, neural network classifier 1810 can classify approximation 1200'. In general and like classification system 1900, classification system 1900 will generally be housed in a single housing, e.g., with source approximator 1905 and neural network classifier 1810 implemented on either the same data processing devices or on data processing devices coupled by a hardwired connection.

Figure 21:
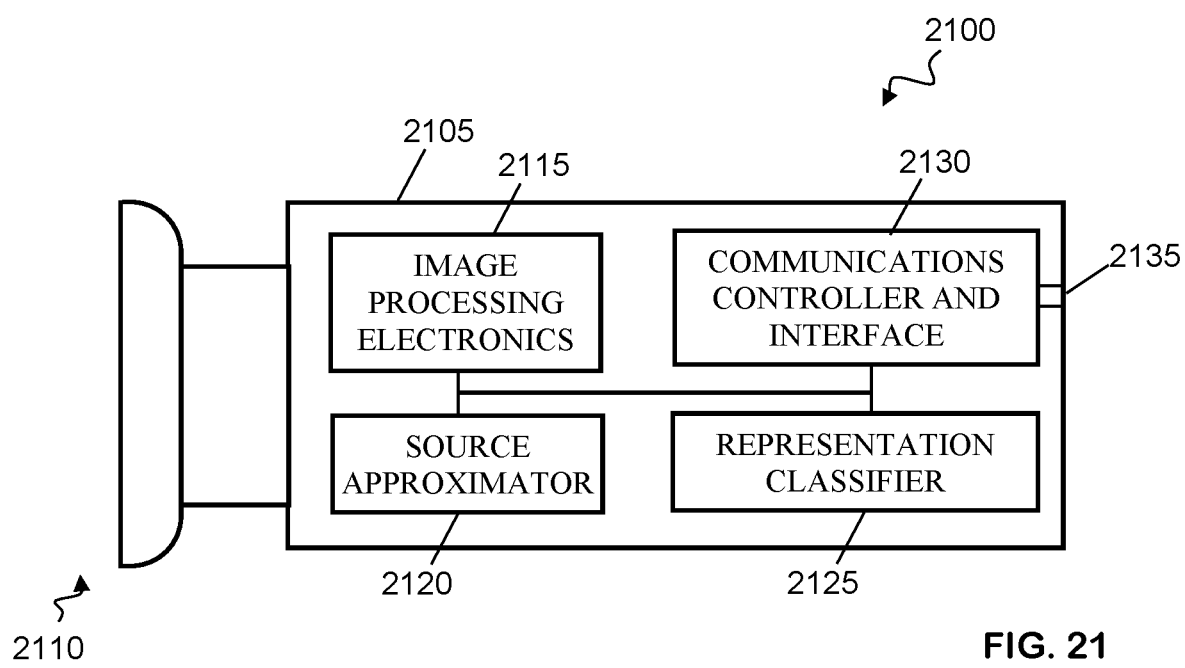
FIGS. 21, 22 are schematic illustration of edge devices that include a local artificial neural network that can be trained using representations of the occurrence of topological structures corresponding to activity in a source neural network.

FIG. 21 is a schematic illustration of an edge device 2100 that includes a local artificial neural network that can be trained using representations of the occurrence of topological structures corresponding to activity in a source neural network. In this context, a local artificial neural network can be, e.g., an artificial neural network that is executed entirely on one or more local processors that do not require a communications network to exchange data. In general, the local processors will be connected by hardwire connections. In some instances, the local processors can be housed in a single housing, such as a single personal computer or a single handheld, mobile device. In some instances, the local processors can be under the control of and accessible by a single individual or a limited number of individuals. In effect, by using a representation of the occurrence of topological structures in a more complex source neural network to train (e.g., using a supervised learning or reinforcement learning technique) a simpler and/or less highly trained but more exclusive second neural network, even individuals with limited computing resources and limited numbers of training samples can train a neural network as desired. Storage requirements and computational complexity during training are reduced and resources like battery lifespan are spared.

In the illustrated implementation, edge device 2100 is schematically illustrated as a security-camera device that includes an optical imaging system 2110, image processing electronics 2115, a source approximator 2120, a representation classifier 2125, and a communications controller and interface 2130.

Optical imaging system 2110 can include, e.g., one or more lenses (or even a pinhole) and a CCD device. Image processing electronics 2115 can read the output of optical imaging system 2110 and in general can perform basic image processing functions. Communications controller and interface 2130 is a device that is configured to control the flow of information to and from device 2100. As discussed further below, among the operations that communications controller and interface 2130 can perform are the transmission of images of interest to other devices and the receipt of training information from other devices. Communications controller and interface 2130 can thus include both a data transmitter and a receiver that can communicate over, e.g., a data port 2135. Data port 2135 can be a wired port, a wireless port, an optical port, or the like.

Source approximator 2120 is relatively simple neural network that is trained to output a vector that approximates a representation of topological structures that arise in the patterns of activity in a relatively more complex neural network. For example, source approximator 2120 can be trained to approximate a recurrent source neural network such as, e.g., a recurrent neural network that is modelled on a biological system and includes a degree of the morphological, chemical, and other characteristics of a biological system.

Representation classifier 2125 is either a linear classifier or a neural network classifier that is coupled to receive an approximation of a representation of the patterns of activity in a source neural network from source approximator 2120 and output a classification result. Representation classifier 2125 can be, e.g., a deep neural network such as a convolutional neural network that includes convolutional layers, pooling layers, and fully-connected layers. Convolutional layers can generate feature maps, e.g., using linear convolutional filters and/or nonlinear activation functions. Pooling layers reduce the number of parameters and control overfitting. The computations performed by the different layers in representation classifier 2125 can be defined in different ways in different implementations of representation classifier 2125.

In some implementations, in operation, optical imaging system 2110 can generate raw digital images. Image processing electronics 2115 can read the raw images and will generally perform at least some basic image processing functions. Source approximator 2120 can receive images from image processing electronics 2115 and perform inference operations to output a vector that approximates a representation of topological structures that arise in the patterns of activity in a relatively more complex neural network. This approximation vector is input into representation classifier 2125 which determines whether the approximation vector satisfies one or more sets of classification criteria. Examples include facial recognition and other machine vision operations. In the event that representation classifier 2125 determines that the approximation vector satisfies a set of classification criteria, representation classifier 2125 can instruct communications controller and interface 2130 to transmit information regarding the images. For example, communications controller and interface 2130 can transmit the image itself, the classification, and/or other information regarding the images.

At times, it may be desirable to change the classification process. In these cases, communications controller and interface 2130 can receive a training set. In some implementations, the training set can include raw or processed image data and representations of topological structures that arise in the patterns of activity in a relatively more complex neural network. Such a training set can be used to retrain source approximator 2120, e.g., using a supervised learning or reinforcement learning technique. In particular, the representations are used as the target answer vectors and represent the desired result of source approximator 2120 processing the raw or processed image data.

In other implementations, the training set can include representations of topological structures that arise in the patterns of activity in a relatively more complex neural network and the desired classification of those representations of topological structures. Such a training set can be used to retrain a neural network representation classifier 2125, e.g., using a supervised learning or reinforcement learning technique. In particular, the desired classification are used as the target answer vectors and represent the desired result of representation classifier 2125 processing the representations of topological structures.

Regardless of whether source approximator 2120 or representation classifier 2125 is retrained, inference operations at device 2100 can be facilely adapted to changing circumstances and objectives without large sets of training data and time- and computing power-intensive iterative training.

Figure 22:
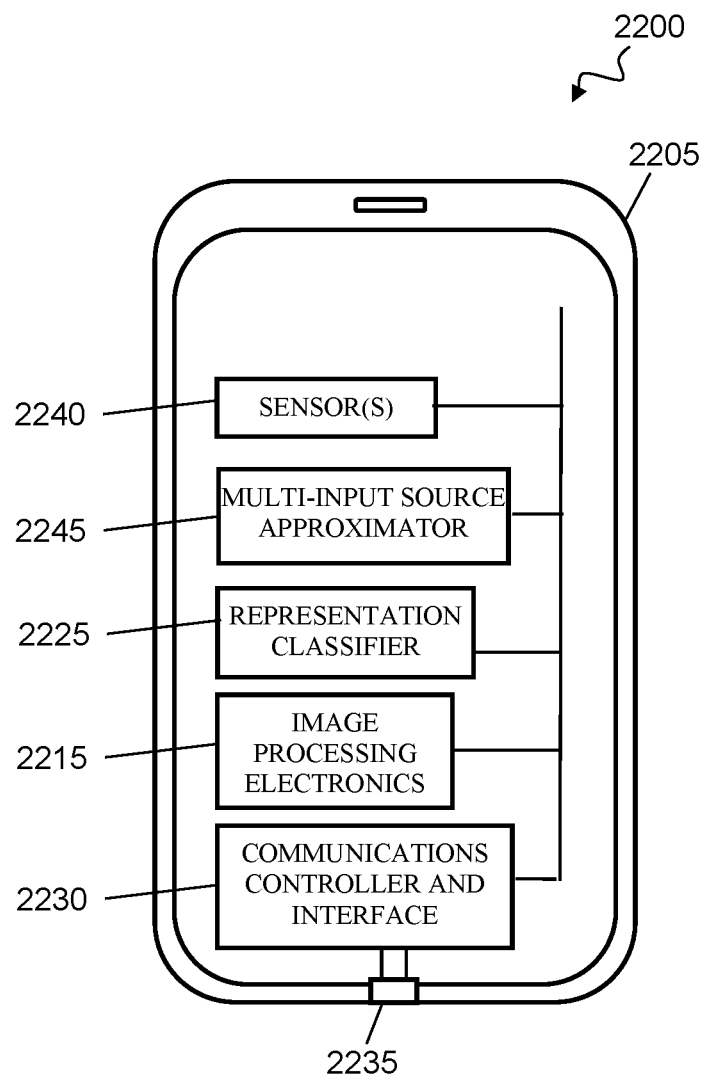

FIG. 22 is a schematic illustration of a second edge device 2200 that includes a local artificial neural network that can be trained using representations of the occurrence of topological structures corresponding to activity in a source neural network. In the illustrated implementation, second edge device 2200 is schematically illustrated as a mobile computing device such as smart phone or a tablet. Device 2200 includes an optical imaging system (e.g., on the backside of device 2200, not shown), image processing electronics 2215, a representation classifier 2225, a communications controller and interface 2230, and a data port 2235. These components can have characteristics and perform actions that correspond to those of optical imaging system 2110, image processing electronics 2115, representation classifier 2125, communications controller and interface 2130, and data port 2135 in device 2100 (FIG. 21).

The illustrated implementation of device 2200 additionally includes one or more additional sensors 2240 and a multi-input source approximator 2245. Sensor(s) 2240 can sense one of more characteristics of the environment surrounding device 2200 or of device 2200 itself. For example, in some implementations, sensor 2240 can be an accelerometer that senses the acceleration to which device 2200 is subject. As another example, in some implementations, sensor 2240 can be an acoustic sensor such as a microphone that senses noise in the environment of device 2200. Still further examples of sensor 2240 include chemical sensors (e.g., "artificial noses" and the like), humidity sensors, radiation sensors, and the like. In some cases, sensor 2240 is coupled to processing electronics that can read the output of sensor 2240 (or other information such as, e.g., a contact list or map) and perform basic processing functions. Different implementations of sensor 2240 can thus have different "modalities" in that the physical sensed physical parameter changes from sensor to sensor.

Multi-input source approximator 2245 is a relatively simple neural network that is trained to output a vector that approximates a representation of topological structures that arise in the patterns of activity in a relatively more complex neural network. For example, multi-input source approximator 2245 can be trained to approximate a recurrent source neural network such as, e.g., a recurrent neural network that is modelled on a biological system and includes a degree of the morphological, chemical, and other characteristics of a biological system.

Unlike source approximator 2120, multi-input source approximator 2245 is coupled to receive raw or processed sensor data from multiple sensors and return an approximation of a representation of topological structures that arise in the patterns of activity in a relatively more complex neural network based on that data. For example, multi-input source approximator 2245 can receive processed image data from image processing electronics 2215 as well as, e.g., acoustic, acceleration, chemical, or other data from one or more sensors 2240. Multi-input source approximator 2245 can be, e.g., a deep neural network such as a convolutional neural network that includes convolutional layers, pooling layers, and fully-connected layers. The computations performed by the different layers in multi-input source approximator 2245 can be dedicated to a single type of sensor data or to sensor data of multiple modalities.

Regardless of the particular organization of multi-input source approximator 2245, multi-input source approximator 2245 is to return the approximation based on raw or processed sensor data from multiple sensors. For example, processed image data from image processing electronics 2215 and acoustic data from a microphone sensor 2240 can be used by multi-input source approximator 2245 to approximate a representation of topological structures that would arise in the patterns of activity in a relatively more complex neural network that received the same data.

At times, it may be desirable to change the classification process at device 2200. In these cases, communications controller and interface 2230 can receive a training set. In some implementations, the training set can include raw or processed image, sounds, chemical or other data and representations of topological structures that arise in the patterns of activity in a relatively more complex neural network. Such a training set can be used to retrain multi-input source approximator 2245, e.g., using a supervised learning or reinforcement learning technique. In particular, the representations are used as the target answer vectors and represent the desired result of multi-input source approximator 2245 processing the raw or processed image or sensor data.

In other implementations, the training set can include representations of topological structures that arise in the patterns of activity in a relatively more complex neural network and the desired classification of those representations of topological structures. Such a training set can be used to retrain a neural network representation classifier 2225, e.g., using a supervised learning or reinforcement learning technique. In particular, the desired classification are used as the target answer vectors and represent the desired result of representation classifier 2225 processing the representations of topological structures.

Regardless of whether multi-input source approximator 2245 or representation classifier 2225 is retrained, inference operations at device 2200 can be facilely adapted to changing circumstances and objectives without large sets of training data and time- and computing power-intensive iterative training.

Figure 23:
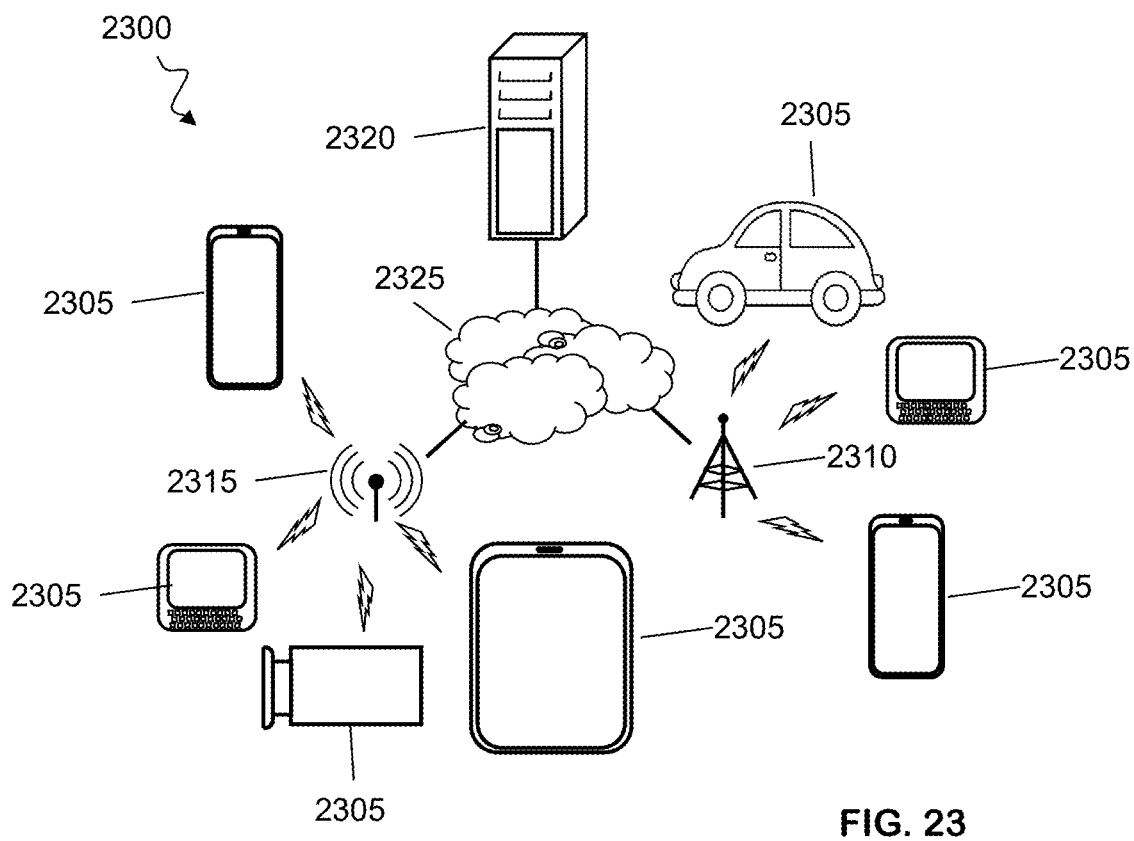
FIG. 23 is a schematic representation of a system in which local neural networks can be trained using representations of the occurrence of topological structures corresponding to activity in a source neural network.

FIG. 23 is a schematic representation of a system 2300 in which local neural networks can be trained using representations of the occurrence of topological structures corresponding to activity in a source neural network. The target neural networks are implemented on relatively simple, less expensive data processing systems whereas the source neural network can implemented on a relatively complex, more expensive data processing system.

System 2300 includes a variety of devices 2305 with local neural networks, a telephone base station 2310, a wireless access point 2315, a server system 2320, and one or more data communications networks 2325.

Local neural networks devices 2305 are devices that are configured to process data using computationally-less-intensive target neural networks. As illustrated, local neural networks devices 2305 can be implemented as mobile computing devices, cameras, automobiles, or any of a legion of other appliances, fixtures, and mobile components, as well as different makes and models of devices within each category. Different local neural networks devices 2305 can belong to different owners. In some implementations, access to the data processing functionality of local neural networks devices 2305 will generally be restricted to these owners and/or the owner's designates.

Local neural networks devices 2305 can each include one or more source approximators that are trained to output a vector that approximates a representation of topological structures that arise in the patterns of activity in a relatively more complex neural network. For example, the relatively more complex neural network can be a recurrent source neural network such as, e.g., a recurrent neural network that is modelled on a biological system and includes a degree of the morphological, chemical, and other characteristics of a biological system.

In some implementations, in addition to processing data using source approximators, local neural networks devices 2305 can also be programmed to re-train the source approximators using representations of topological structures that arise in the patterns of activity in a relatively more complex neural network as the target answer vectors. For example, local neural networks devices 2305 can be programmed to perform one or more iterative training techniques (e.g., gradient descent or stochastic gradient descent). In other implementations, the source approximators in local neural networks devices 2305 are trainable by, e.g., a dedicated training system or by a training system that is installed on a personal computer that can interact with the local neural networks devices 2305 to train source approximators.

Each local neural networks device 2305 includes one or more wireless or wired data communication components. In the illustrated implementation, each local neural networks device 2305 includes at least one wireless data communication components such as a mobile phone transceiver, a wireless transceiver, or both. The mobile phone transceivers are able to exchange data with phone base station 2310. The wireless transceivers are able to exchange data with a wireless access point 2315. Each local neural networks device 2305 may also be able to exchange data with peer mobile computing devices.

Phone base station 2310 and wireless access point 2315 are connected for data communication with one or more data communication networks 2325 and can exchange information with a server system 2320 over the network(s). Local neural networks devices 2305 are thus generally also in data communication with server system 2320. However, this is not necessarily the case. For example, in implementations where local neural networks devices 2305 are trained by other data processing devices, local neural networks devices 2305 need only be in data communication with these other data processing devices at least once.

Server system 2320 is a system of one or more data processing devices that is programmed to perform data processing activities in accordance with one or more sets of machine-readable instructions. The activities can include serving training sets to training systems for mobile computing devices 2305. As discussed above, the training systems can be internal to mobile local neural networks devices 2305 themselves or on one or more other data processing devices. The training sets can include representations of the occurrence of topological structures corresponding to activity in a source neural network and corresponding input data.

In some implementations, server system 2320 also includes the source neural network. However, this is not necessarily the case and server system 2320 may receive the training sets from yet another system of data processing device(s) that implement the source neural network.

In operations, after server system 2320 receives a training set (from a source neural network that is found at server system 2320 itself or elsewhere), server system 2320 can serve the training set to trainers that train mobile computing devices 2305. The source approximators in target local neural networks devices 2305 can be trained using the training set so that the target neural networks approximate the operations of the source neural network.

FIGS. 24, 25, 26, 27 are schematic illustrations of the use of representations of the occurrence of topological structures in the activity in a neural network in four different systems 2400, 2500, 2600, 2700. Systems 2400, 2500, 2600, 2700 can be configured to perform any of a number of different operations. For example, systems 2400, 2500, 2600, 2700 can perform object localization operations, object detection operations, object segmentation operations, object detection operations, prediction operations, action selection operations, or the like.

Object localization operations locate an object within an image. For example, a bounding box can be constructed around an object. In some cases, object localization can be combined with object recognition, in which the localized object is labeled with an appropriate designation.

Object detection operations classify image pixels as either belonging to a particular class (e.g., belonging to an object interest) or not. In general, object detection is performed by grouping pixels and forming bounding boxes around the pixel groups. The bounding box should be a tight fit around the object.

Object segmentation generally assigns class labels to each image pixel. Thus, rather than a bounding box, object segmentation proceeds on a pixel-by-pixel basis and generally requires that only a single label be assigned to each pixel.

Prediction operations seek to draw conclusions that are outside the range of a observed data. Although prediction operations can seek to forecast future occurrences (e.g., based on information about the past and current state), prediction operations can also seek to draw conclusions about the past and current state based on incomplete information on those states.

Action selection operations seek to choose an action based on a set of conditions. Action selection operations have traditionally be broken down into different approaches such a symbol-based systems (classical planning), distributed solutions, and reactive or dynamic planning.

Classification systems 2400, 2500 each perform a desired operation on representations of the patterns of activity in a neural network. Systems 2600, 2700 each perform a desired operation on approximations of representations of the patterns of activity in a neural network. In systems 2400, 2500, the patterns of activity that are represented occur in and are read from a source neural network device 1705 that is part of the system 2400, 2500. In contrast, in systems 2400, 2500, the patterns of activity that are approximately represented occur in a source neural network device that is not part of the system 2400, 2500. Nevertheless, the approximation of the representation of those patterns of activity are read from an approximator 1905 that is part of systems 2400, 2500.

Figure 24:
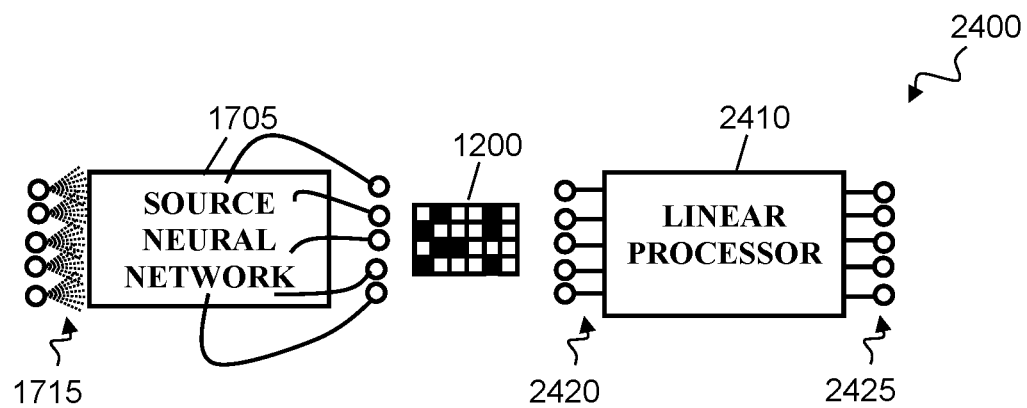
FIGS. 24, 25, 26, 27 are schematic illustrations of the use of representations of the occurrence of topological structures in the activity in a neural network in four different systems.

In additional detail, turning to FIG. 24, system 2400 includes a source neural network 1705 and a linear processor 2410. Linear processor 2410 is a device that performs operations based on a linear combination of the characteristics of representations of the patterns of activity in a neural network (or approximations of such representations). The operations can be, e.g., object localization operations, object detection operations, object segmentation operations, object detection operations, prediction operations, action selection operations, or the like.

Linear processor 2410 includes an input 2420 and an output 2425. Input 2420 is coupled to receive representations of the patterns of activity in source neural network 1705. Linear processor 2410 can receive the representations of the patterns of activity in source neural network 1705 in a variety of ways. For example, the representations of the patterns of activity can be received as discrete events or as a continuous stream over a real time or non-real time communication channel. Output 2525 is coupled to output the processing result from linear processor 2410. In some implementations, linear processor 2410 can be implemented on one or more computing devices with relatively limited computational performance. For example, linear processor 2410 can be implemented on a personal computer or a mobile computing device such as a smart phone or tablet.

Turning to FIG. 24, system 2400 includes a source neural network 1705 and a linear processor 2410. Linear processor 2410 is a device that performs operations based on a linear combination of the characteristics of representations of the patterns of activity in a neural network (or approximations of such representations). The operations can be, e.g., object localization operations, object detection operations, object segmentation operations, prediction operations, action selection operations, or the like.

Linear processor 2410 includes an input 2420 and an output 2425. Input 2420 is coupled to receive representations of the patterns of activity in source neural network 1705. Linear processor 2410 can receive the representations of the patterns of activity in source neural network 1705 in a variety of ways. For example, the representations of the patterns of activity can be received as discrete events or as a continuous stream over a real time or non-real time communication channel. Output 2525 is coupled to output the processing result from linear processor 2410. In some implementations, linear processor 2410 can be implemented on one or more computing devices with relatively limited computational performance. For example, linear processor 2410 can be implemented on a personal computer or a mobile computing device such as a smart phone or tablet.

Figure 25:
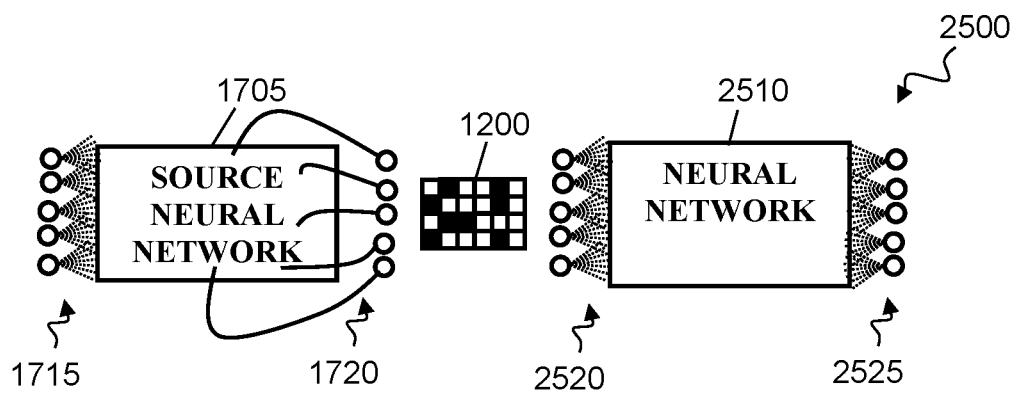

In FIG. 25, classification system 2500 includes source neural network 1705 and a neural network 2510. Neural network 2510 is a neural network device that is configured to perform operations based on a non-linear combination of the characteristics of representations of the patterns of activity in a neural network (or approximations of such representations). The operations can be, e.g., object localization operations, object detection operations, object segmentation operations, prediction operations, action selection operations, or the like. In the illustrated implementation, neural network 2510 is a feedforward network that includes an input layer 2520 and an output layer 2525. As with linear processor 2410, neural network 2510 can receive the representations of the patterns of activity in source neural network 1705 in a variety of ways.

In some implementations, neural network 2510 can perform inferences on one or more computing devices with relatively limited computational performance. For example, neural network 2510 can be implemented on a personal computer or a mobile computing device such as a smart phone or tablet, e.g., in a Neural Processing Unit of such a device. Like system 2400, system 2500 will generally be a dispersed system in which a remote neural network 2510 communicates with source neural network 1705, e.g., via a data communications network. In some implementations, neural network 2510 can be, e.g., a deep neural network such as a convolutional neural network.

Figure 26:
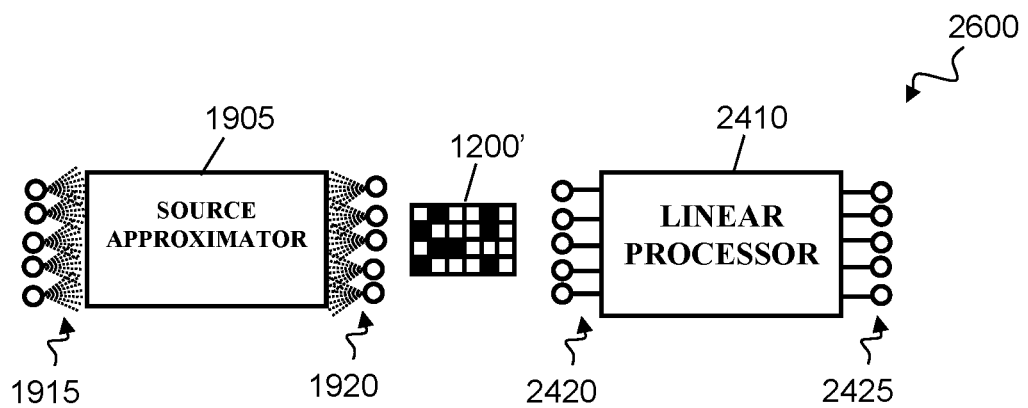

In FIG. 26, system 2600 includes source approximator 1905 and a linear processor 2410. Despite any differences between approximation 1200' representation 1200, processor 2410 can still perform operations on approximation 1200'.

Figure 27:
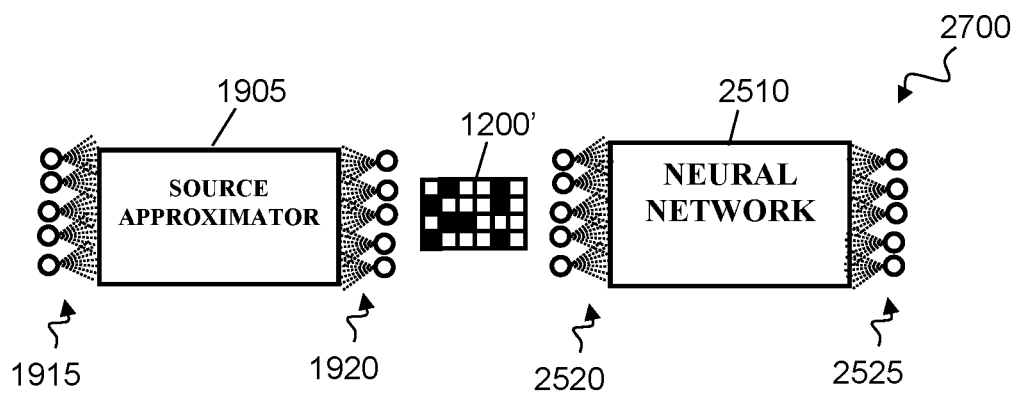

In FIG. 27, system 2700 includes source approximator 1905 and a neural network 2510. Despite any differences between approximation 1200' and representation 1200, neural network 2510 can still perform operations on approximation 1200'.

In some implementations, systems 2600, 2700 can be implemented on an edge device, such as, e.g., edge devices 2100, 2200 (FIGS. 21, 22). In some implementations, systems 2600, 2700 can be implemented as part of a system in which local neural networks can be trained using representations of the occurrence of topological structures corresponding to activity in a source neural network, such as system 2300 (FIG. 23).

Figure 28:
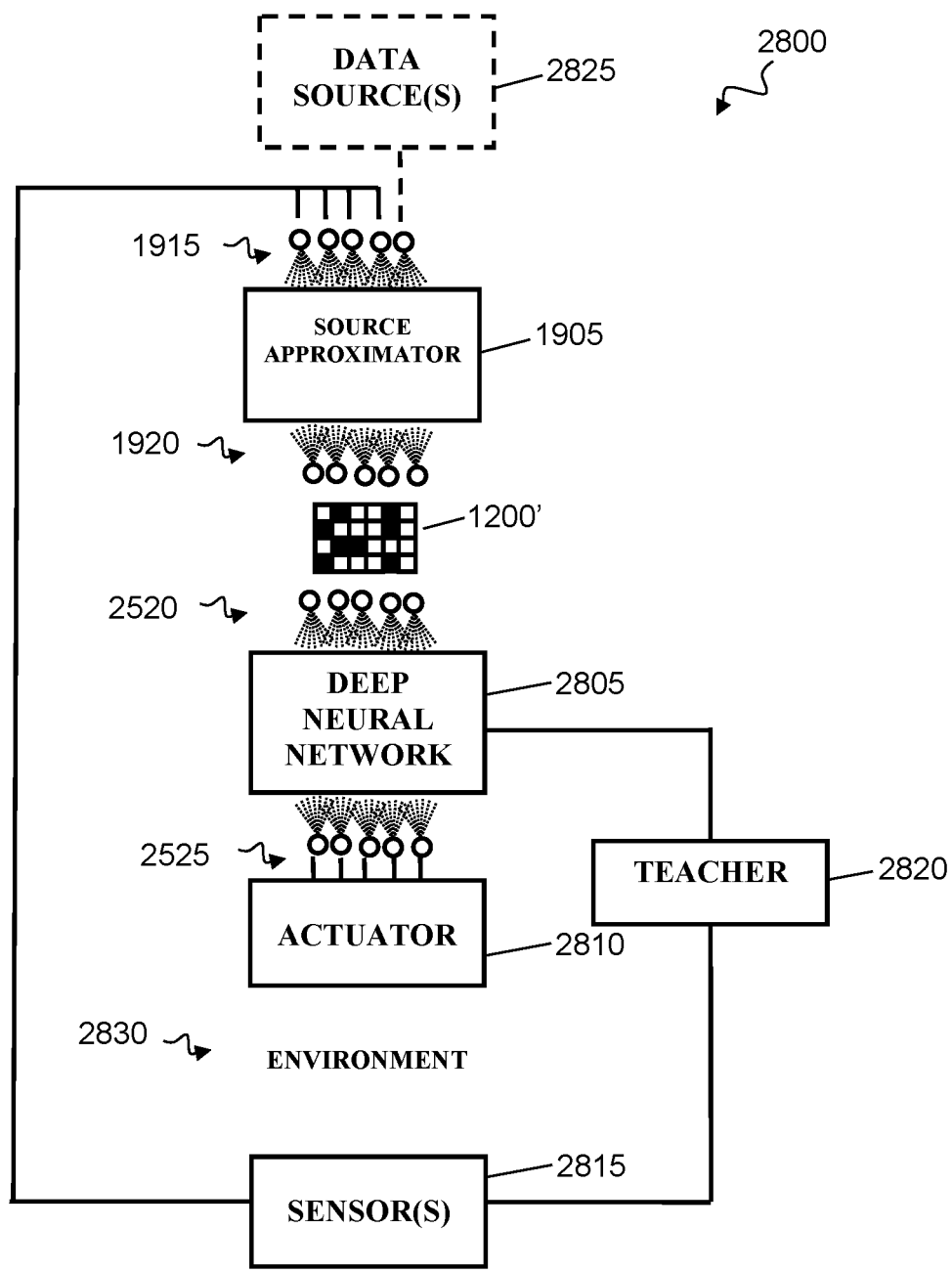
FIG. 28 is a schematic illustration of a system 0 that includes an artificial neural network that can be trained using representations of the occurrence of topological structures corresponding to activity in a source neural network.

FIG. 28 is a schematic illustration of a reinforcement learning system 2800 that includes an artificial neural network that can be trained using representations of the occurrence of topological structures corresponding to activity in a source neural network. Reinforcement learning is a type of machine learning in which an artificial neural network learns from feedback regarding the consequences of actions taken in response to the artificial neural network's decisions. A reinforcement learning system moves from one state in the environment to another by performing actions and receiving information characterizing the new state and a reward and/or regret that characterizes the success (or lack of success) of the action. Reinforcement learning seek to maximize the total reward (or minimize the regret) through a learning process.

In the illustrated implementation, the artificial neural network in reinforcement learning system 2800 is a deep neural network 2805 (or other deep learning architecture) that is trained using a reinforcement learning approach. In some implementations, deep neural network 2805 can be a local artificial neural network (such as neural network 2510 (FIGS. 25, 27), and implemented locally on, e.g., an automobile, a plane, a robot, or other device. However, this is not necessarily the case and in other implementations, deep neural network 2805 can be implemented on a system of networked devices.

In addition to a source approximator 1905 and deep neural network 2805, reinforcement learning system 2800 includes an actuator 2810, one or more sensors 2815, and a teacher module 2820. In some implementations, reinforcement learning system 2800 also includes one or more sources 2825 of additional data.

Actuator 2810 is a device that controls a mechanism or a system that interacts with an environment 2830. In some implementations, actuator 2810 controls a physical mechanism or system (e.g., the steering of an automobile or the positioning of a robot). In other implementations, actuator 2810 can control a virtual mechanism or system (e.g., a virtual game board or an investment portfolio). Thus, environment 2830 may also be physical or virtual.

Sensor(s) 2815 are devices that measure characteristics of the environment 2830. At least some of the measurements with characterize interactions between the controlled mechanism or system and other aspects of the environment 2830. For example, when actuator 2810 steers an automobile, sensor(s) 2815 may measure one or more of the speed, direction, and acceleration of the automobile, the proximity of the automobile to other features, and the response of other features to the automobile. As another example, when actuator 2810 controls an investment portfolio, sensor(s) 2815 may measure the value and risk associated with the portfolio.

In general, both source approximator 1905 and teacher module 2820 are coupled to receive at least some of the measurements made by sensor(s) 2815. For example, source approximator 1905 can receive measurement data at input layer 1915 and output an approximation 1200' of a representation of topological structures that arise in the patterns of activity in a source neural network.

Teacher module 2820 is a device that is configured to interpret the measurements received from sensor(s) 2815 and provide a reward and/or a regret to deep neural network

2805. Rewards are positive and indicate successful control of the mechanism or system. Regrets are negative and indicate unsuccessful or less than optimal control. In general, teacher module 2820 also provides a characterization of the measurements along with the reward/regret for reinforcement learning. In general, the characterization of the measurements is an approximation of a representation of topological structures that arise in the patterns of activity in a source neural network (such as approximation 1200'). For example, teacher module 2820 may read approximations 1200' output from source approximator 1905 and pair the read approximations 1200' with corresponding reward/regret values.

In many implementations, reinforcement learning does not occur in system 2800 in real time or during active control of actuator 2810 by deep neural network 2805. Rather, training feedback can be collected by teacher module 2820 and used for reinforcement training when deep neural network 2805 is not actively instructing actuator 2810. For example, in some implementations, teacher module 2820 can be remote from deep neural network 2805 and only in intermittent data communication with deep neural network 2805. Regardless of whether reinforcement learning is intermittent or continuous, deep neural network 2805 can be evolved, e.g., to optimize reward and/or reduce regret using the information received from teacher module 2820.

In some implementations, system 2800 also includes one or more sources 2825 of additional data. Source approximator 1905 can also receive data from data sources 2825 at input layer 1915. In these instances, approximation 1200' will result from processing both sensor data and the data from data sources 2825.

In some implementations, the data collected by one reinforcement learning system 2800 can be used for training or reinforcement learning of other systems, including other reinforcement learning systems. For example, the characterization of the measurements along with the reward/regret values can be provided by teacher module 2820 to a data exchange system that collects such data from a variety of reinforcement learning systems and redistributes it among them. Further, as discussed above, the characterization of the measurements can be an approximation of a representation of topological structures that arise in the patterns of activity in a source neural network, such as approximation 1200'.

The particular operations that are performed by reinforcement learning system 2800 will of course depend on the particular operational context. For example, in contexts where source approximator 1905, deep neural network 2805, actuator 2810, and sensors 2815 are part of an automobile, deep neural network 2805 can perform object localization and/or detection operations while steering the automobile.

In implementations where the data collected by reinforcement learning system 2800 is used for training or reinforcement learning of other systems, reward/regret values and approximations 1200' that characterize the state of the environment when object localizations and/or detection operations were performed can be provided to the data exchange system. The data exchange system can then distribute the reward/regret values and approximations 1200' to other reinforcement learning systems 2800 associated with other vehicles for reinforcement learning at those other vehicles. For example, reinforcement learning can be used to improve object localization and/or detection operations at a second vehicle using the reward/regret values and approximations 1200'.

However, the operations that are learned at other vehicles need not be identical to the operations that are performed by deep neural network 2805. For example, reward/regret values that are based on travel time and approximations 1200' that result from the input of sensor data characterizing, e.g., an unexpectedly wet road at a location identified by a GPS data source 2825 can be can be used for route planning operations at another vehicle.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments have been described. Nevertheless, it will be understood that various modifications may be made. For example, although representation 1200 is a binary representation in which each bit individually represents the presence or absence of a feature in a graph, other representations of information are possible. For example, a vector or matrix of multi-valued, non-binary digits can be used to represent, e.g., the presence or absence of features and possibly other characteristics of those features. An example of such a characteristic is the weight of edges with the activity that constitutes the features.

Accordingly, other embodiments are within the scope of the following claims.

The invention claimed is:

1. A computer-implemented method comprising:
    training a functional state of a recurrent artificial neural network that includes two thousand nodes or more to propagate an input according to a learned signal flow within the recurrent artificial neural network until processing of the input reaches a predefined end and the recurrent artificial neural network returns to a state in which only background or no signal transmission activity occurs, the training comprising:
        structuring the recurrent artificial neural network to obtain a trained recurrent artificial neural network, the structuring comprising:
            reading a plurality of digits output from the recurrent artificial neural network, wherein each digit represents whether or not activity within a particular group of nodes in the recurrent artificial neural network comports with a respective pattern of activity; and
            evolving a structure of the recurrent artificial neural network, wherein evolving the structure of the recurrent artificial neural network comprises:
                characterizing a complexity of each pattern of signal transmission activity in the structure, wherein the complexity is measured based on simplex counts or Betti numbers of the pattern, using the characterization as an indication of whether the structure has optimized a reward, and iteratively evolving the structure if the reward has not been optimized;

processing the input by the trained recurrent artificial neural network, the input comprising a stream of video or audio data;

monitoring complexities of patterns of signal transmission activity that occur between three or more nodes in the trained recurrent artificial neural network in response to the processing of the input, the monitoring comprising, during the processing of the input:

outputting, by the trained recurrent artificial neural network, a second plurality of digits, wherein a value of each digit in the second plurality of digits represents whether or not signal transmission activity that occurs between the three or more nodes in the trained recurrent artificial neural network in response to the processing of the input comports with a respective pattern of signal transmission activity, regardless of a location at which the respective pattern of signal transmission activity occurs in the trained recurrent artificial neural network, wherein the second plurality of digits enables an isomorphic topological reconstruction of a graph of the trained recurrent artificial neural network;

determining the complexity of each pattern of signal transmission activity;

identifying a time at which an object or sound is recognized in the stream of video or audio data, comprising identifying, based on the complexity of each pattern of signal transmission activity, a distinguishable level of complexity of the signal transmission activity, wherein the distinguishable level of complexity comprises an upward deviation, downward deviation, or change of complexity from a predetermined threshold level of complexity;

outputting, at the identified time and before the trained recurrent artificial neural network completes the processing of the input to reach the predefined end and return to the state in which only background or no signal transmission activity occurs, the patterns of signal transmission activity that have the distinguishable level of complexity; and transmitting, encrypting, or storing the output patterns of signal transmission activity that have the distinguishable level of complexity; and allowing the trained recurrent artificial neural network to return to the state in which only background or no signal transmission activity occurs.

2. The method of claim 1, further comprising determining whether or not each group of nodes comports with the respective pattern of signal transmission activity by identifying clique patterns of signal transmission activity of the trained recurrent artificial neural network.

3. The method of claim 2, wherein the method further comprises defining a plurality of windows of time during which the signal transmission activity of the trained recurrent artificial neural network is responsive to the input into the trained recurrent artificial neural network, wherein each digit represents whether or not the signal transmission activity within the group of nodes comports with a respective clique pattern of signal transmission activity during a respective window of the plurality of windows.

4. The method of claim 3, wherein the method further comprises identifying a first window of time within the plurality of windows of time based on an increased likelihood of the clique patterns being identified during the first window of time when compared to other windows of the plurality of windows of time.

5. The method of claim 1, wherein each of the respective patterns of signal transmission activity encloses a cavity.

6. The method of claim 2, wherein identifying cliques comprises discarding or ignoring cliques that are present in other cliques.

7. The method of claim 1, wherein each of the digits is output from a reader node coupled to a collection of nodes in the trained recurrent artificial neural network, wherein the reader nodes indicate if signal transmission activity of the nodes in the collection comports with a particular pattern of signal transmission activity.

8. The method of claim 1, further comprising transmitting or storing a quantity of the digits, wherein transmitting or storing a quantity of the digits comprises:

transmitting or storing digits associated with patterns of signal transmission activity having a complexity higher than the predetermined threshold level; and discarding or ignoring digits associated with patterns of signal transmission activity having a complexity lower than the predetermined threshold level.

9. The method of claim 1, wherein times at which the patterns of signal transmission activity that have the distinguishable level of complexity occur provide a classification as to whether data in the data stream at the times satisfies object or sound recognition criteria.

10. A data transmitter or data storage device comprising an encoder comprising one or more computers operable to perform operations, the operations comprising:

training a functional state of a recurrent artificial neural network that includes two thousand nodes or more to propagate an input according to a learned signal flow within the recurrent artificial neural network until processing of the input reaches a predefined end and the recurrent artificial neural network returns to a state in which only background or no signal transmission activity occurs, the training comprising:

structuring the recurrent artificial neural network to obtain a trained recurrent artificial neural network, the structuring comprising:

reading a plurality of digits output from the recurrent artificial neural network, wherein each digit represents whether or not activity within a particular group of nodes in the recurrent artificial neural network comports with a respective pattern of activity; and evolving a structure of the recurrent artificial neural network, wherein evolving the structure of the recurrent artificial neural network comprises:

characterizing a complexity of each pattern of signal transmission activity in the structure, wherein the complexity is measured based on simplex counts or Betti numbers of the pattern, using the characterization as an indication of whether the structure has optimized a reward, and iteratively evolving the structure if the reward has not been optimized;

encoding a result of processing of an input by the trained recurrent artificial neural network, the input comprising a stream of video or audio data, wherein encoding the result of processing comprises:

processing the input by the trained recurrent artificial neural network;

monitoring complexities of patterns of signal transmission activity that occur between three or more nodes in the trained recurrent artificial neural network in response to the processing of the input, the monitoring comprising, during the processing of the input:

outputting, by the trained recurrent artificial neural network, a second plurality of digits from the trained recurrent artificial neural network, wherein a value of each digit in the second plurality of digits represents whether or not signal transmission activity that occurs between the three or more nodes in the trained recurrent artificial neural network in response to the processing of the input comports with a respective pattern of signal transmission activity, regardless of a location at which the respective pattern of signal transmission activity occurs in the trained recurrent artificial neural network, wherein the second plurality of digits enables an isomorphic topological reconstruction of a graph of the trained recurrent artificial neural network, determining the complexity of each pattern of signal transmission activity;

identifying a time at which an object or sound is recognized in the stream of video or audio data, comprising identifying, based on the complexity of each pattern of signal transmission activity, a distinguishable level of complexity of the signal transmission activity, wherein the distinguishable level of signal transmission activity comprises an upward deviation, downward deviation, or change of complexity from a predetermined threshold level of complexity;

outputting, at the identified time and before the trained recurrent artificial neural network completes the processing of the input to reach the predefined end and return to the state in which only background or no signal transmission activity occurs, the result of processing of the input, the result comprising the patterns of signal transmission activity that have the distinguishable level of complexity; and transmitting, encrypting, or storing the output patterns of signal transmission activity that have the distinguishable level of complexity; and allowing the trained recurrent artificial neural network to return to the state in which only background or no signal transmission activity occurs.

11. The encoder of claim 10, wherein the operations further comprise determining whether or not each group of nodes comports with the respective pattern of signal transmission activity by identifying clique patterns of signal transmission activity of the trained recurrent artificial neural network.

12. The encoder of claim 11, wherein the operations further comprise defining a plurality of windows of time during which the signal transmission activity of the trained recurrent artificial neural network is responsive to the input into the trained recurrent artificial neural network, wherein each digit represents whether or not signal transmission activity within the group of nodes comports with a respective clique pattern of signal transmission activity during a respective window of the plurality of windows.

13. The encoder of claim 12, wherein the operations further comprise identifying a first window of time within the plurality of windows of time based on an increased likelihood of the clique patterns being identified during the first window of time when compared to other windows of the plurality of windows of time.

14. The encoder of claim 10, wherein the respective patterns of signal transmission activity enclose cavities.

15. The encoder of claim 10, wherein each of the digits is output from a reader node coupled to a collection of nodes in the trained recurrent artificial neural network, wherein the reader nodes indicate if signal transmission activity of the nodes in the collection comports with a particular pattern of signal transmission activity.

16. The encoder of claim 10, further comprising transmitting or storing a quantity of the digits, wherein transmitting or storing a quantity of the digits comprises:

transmitting or storing digits associated with patterns of signal transmission activity having a complexity higher than the predetermined threshold level; and discarding or ignoring digits associated with patterns of signal transmission activity having a complexity lower than the predetermined threshold level.

17. The encoder of claim 10, wherein the encoder is a video encoder.

18. The encoder of claim 10, wherein times at which the patterns of signal transmission activity that have the distinguishable level of complexity occur provide a classification as to whether data in the data stream at the times satisfies object or sound recognition criteria.

* * * * *